US012159535B1

(12) United States Patent
Motamedi et al.

(10) Patent No.: US 12,159,535 B1
(45) Date of Patent: Dec. 3, 2024

(54) FLEET AND ASSET MANAGEMENT AND INTERFACES THEREOF ASSOCIATED WITH EDGE COMPUTING DEPLOYMENTS

(71) Applicant: Armada Systems Inc., Greebrae, CA (US)

(72) Inventors: Arash Motamedi, Greebrae, CA (US); Chris Vasquez, Greebrae, CA (US); Grant Gordon, Greebrae, CA (US); Dan Wright, Greebrae, CA (US); Pragyana K Mishra, Seattle, WA (US); Anish Swaminathan, Greebrae, CA (US); Janardhan Prabhakara, Greebrae, CA (US)

(73) Assignee: Armada Systems Inc., Greebrae, CA (US)

( * ) Notice: Subject to any disclaimer, the term of this patent is extended or adjusted under 35 U.S.C. 154(b) by 0 days.

(21) Appl. No.: 18/434,615

(22) Filed: Feb. 6, 2024

Related U.S. Application Data

(63) Continuation of application No. 18/493,684, filed on Oct. 24, 2023, now Pat. No. 11,935,416.

(51) Int. Cl.
*G08G 1/00* (2006.01)
*G07C 5/00* (2006.01)
*G08G 1/13* (2006.01)

(52) U.S. Cl.
CPC .............. *G08G 1/20* (2013.01); *G07C 5/008* (2013.01); *G08G 1/13* (2013.01)

(58) Field of Classification Search
CPC ............. G08G 1/20; G08G 1/13; G07C 5/008
See application file for complete search history.

(56) References Cited

U.S. PATENT DOCUMENTS 11,145,208 B1  10/2021  Nanda et al.
11,201,939 B1  12/2021  Mokashi et al.
(Continued)

FOREIGN PATENT DOCUMENTS

CN    112685069 A    4/2021
EP    3737003 A1    11/2020
(Continued)

OTHER PUBLICATIONS

Sharma, Divyasheel, et al. "Enabling Inference and Training of Deep Learning Models for AI Applications on IoT Edge Devices", Atrificial Intelligence-based Internet of THings Systems: 267-283. (Year: 2022).

(Continued)

*Primary Examiner* — Michael V Kerrigan
(74) *Attorney, Agent, or Firm* — Polsinelli PC

(57) ABSTRACT

A process can include obtaining a plurality of data points each associated with a respective edge device of a fleet of edge devices, each respective edge device associated with an edge site location or edge device asset group. The plurality of data points are stored to a fleet map data catalog and a filtering selection for viewing a filtered subset of the fleet map data catalog is received, indicating a selected geographic view area and selected edge device types from a plurality of edge device types. Data points corresponding to the filtered subset are obtained from the fleet map data catalog using the filtering selection. A fleet map GUI view is generated using the data points corresponding to the filtered subset, the fleet map GUI view comprising a converged geographic map of the selected geographic view area, with data points are rendered at corresponding locations within the converged geographic map.

20 Claims, 20 Drawing Sheets

(56) References Cited

U.S. PATENT DOCUMENTS

| | | |
|---|---|---|
| 11,238,849 B1 | 2/2022 | Mimassi |
| 11,405,801 B1 | 8/2022 | Qureshi et al. |
| 11,410,423 B1 | 8/2022 | Naslavsky et al. |
| 11,695,632 B1 | 7/2023 | Zoualffaghari et al. |
| 11,741,760 B1 | 8/2023 | Dubin et al. |
| 11,876,858 B1 | 1/2024 | Nair et al. |
| 11,907,093 B1 | 2/2024 | Nair et al. |
| 2005/0156715 A1 | 7/2005 | Zou et al. |
| 2009/0079555 A1 | 3/2009 | Aguirre De Career et al. |
| 2009/0249215 A1 | 10/2009 | Paek |
| 2012/0123951 A1 | 5/2012 | Hyatt et al. |
| 2015/0120749 A1 | 4/2015 | Phanishayee et al. |
| 2016/0093119 A1 | 3/2016 | Ahn et al. |
| 2016/0117059 A1 | 4/2016 | Folken et al. |
| 2016/0266739 A1 | 9/2016 | Folken et al. |
| 2017/0285623 A1 | 10/2017 | Figoli et al. |
| 2018/0025304 A1 | 1/2018 | Fisher et al. |
| 2018/0032915 A1 | 2/2018 | Nagaraju et al. |
| 2018/0082152 A1 | 3/2018 | Katz et al. |
| 2018/0341720 A1 | 11/2018 | Bhatia et al. |
| 2019/0156246 A1 | 5/2019 | Kuo et al. |
| 2019/0212754 A1 | 7/2019 | Smith |
| 2019/0258747 A1 | 8/2019 | Millev |
| 2019/0370686 A1 | 12/2019 | Pezzillo et al. |
| 2020/0027033 A1 | 1/2020 | Garg et al. |
| 2020/0112612 A1 | 4/2020 | Chandaria |
| 2020/0136994 A1 | 4/2020 | Doshi et al. |
| 2020/0153623 A1 | 5/2020 | Asanghanwa et al. |
| 2020/0160207 A1 | 5/2020 | Song et al. |
| 2020/0267053 A1 | 8/2020 | Zheng et al. |
| 2020/0286020 A1 | 9/2020 | Kobayashi et al. |
| 2020/0349852 A1 | 11/2020 | DiCosola |
| 2020/0374974 A1 | 11/2020 | Sun et al. |
| 2020/0379805 A1 | 12/2020 | Porter et al. |
| 2020/0401891 A1 | 12/2020 | Zu et al. |
| 2021/0108937 A1 | 4/2021 | Fox et al. |
| 2021/0112441 A1 | 4/2021 | Sabella et al. |
| 2021/0117859 A1 | 4/2021 | Rogers et al. |
| 2021/0124478 A1* | 4/2021 | Reese ................ G06F 3/0482 |
| 2021/0136869 A1 | 5/2021 | Radmand et al. |
| 2021/0243232 A1 | 8/2021 | Verma et al. |
| 2021/0266225 A1 | 8/2021 | Kozhaya et al. |
| 2021/0304418 A1 | 9/2021 | Soon-Shiong |
| 2021/0360070 A1 | 11/2021 | Cella et al. |
| 2021/0392049 A1 | 12/2021 | Jeuk et al. |
| 2022/0015269 A1 | 1/2022 | Xu et al. |
| 2022/0019422 A1 | 1/2022 | Anderson |
| 2022/0035878 A1 | 2/2022 | Sarah et al. |
| 2022/0060455 A1 | 2/2022 | Rosenstein et al. |
| 2022/0121556 A1 | 4/2022 | Guim Bernat et al. |
| 2022/0150125 A1 | 5/2022 | Kumar et al. |
| 2022/0197304 A1 | 6/2022 | Cochran et al. |
| 2022/0345518 A1 | 10/2022 | Sgobba et al. |
| 2022/0353732 A1 | 11/2022 | Filippou et al. |
| 2022/0360957 A1 | 11/2022 | Seawall et al. |
| 2022/0383859 A1* | 12/2022 | Mimassi ................ G10L 15/16 |
| 2022/0405157 A1 | 12/2022 | Bender |
| 2022/0410750 A1 | 12/2022 | Mangal et al. |
| 2023/0021216 A1 | 1/2023 | Shilawat et al. |
| 2023/0028338 A1 | 1/2023 | Samuelsson et al. |
| 2023/0044620 A1 | 2/2023 | Shochat et al. |
| 2023/0064472 A1 | 3/2023 | Endel et al. |
| 2023/0066765 A1 | 3/2023 | Thomas et al. |
| 2023/0101308 A1 | 3/2023 | Amano |
| 2023/0141055 A1 | 5/2023 | Kim et al. |
| 2023/0147814 A1 | 5/2023 | Carver et al. |
| 2023/0164033 A1 | 5/2023 | Lee et al. |
| 2023/0171235 A1 | 6/2023 | Chhibber et al. |
| 2023/0205606 A1 | 6/2023 | Palermo et al. |
| 2023/0205994 A1 | 6/2023 | Wei et al. |
| 2023/0208510 A1 | 6/2023 | Palermo et al. |
| 2023/0244470 A1 | 8/2023 | Shimon et al. |
| 2023/0280059 A1 | 9/2023 | Khan et al. |
| 2023/0300195 A1 | 9/2023 | Sharma et al. |
| 2023/0316927 A1 | 10/2023 | Kumavat et al. |
| 2023/0325725 A1 | 10/2023 | Lester et al. |
| 2023/0359600 A1 | 11/2023 | Donthireddy et al. |
| 2023/0360679 A1 | 11/2023 | Sharma et al. |
| 2023/0368281 A1 | 11/2023 | Kobel et al. |
| 2023/0368637 A1 | 11/2023 | Ngala-Ngala et al. |

FOREIGN PATENT DOCUMENTS

| | | |
|---|---|---|
| WO | 02/07330 A2 | 1/2002 |
| WO | 2020/006160 A1 | 1/2020 |

OTHER PUBLICATIONS

Abbas, Khizar, et al. "Network slice lifesycle management for 5g mobile networks: An intent-based networking approach." IEEE Access 9: 80128-80146. (Year: 2021).

Hsu, Tz-Heng, Zhi-Hao Wang, & Aaron Raymond See, "A cloud-edge-smart IoT architecture for speeding up the deployment of neural network models wih transfer learning techniques." Electronics 11.14: 2255. (Year: 2002).

Huang, Lei, "Armada: A Robust Latency-Sensitive Edge Cloud in Heterogeneous Edge-Dense Environments" Jul. 2021.

Huang, Lei, "Armada: A Robust Latency-Sensitive Edge Cloud in Heterogeneous Edge-Dense Environments" Nov. 23, 2021.

Wang, Hao, et al.; "Optimizing federated learning on non-iid data with reinforcement learning." IEEE Infocom 2020—IEEE Conference in Computer Communications. IEEE (Year: 2020).

Wang, Nan, et al., "Enorm: A framework for edge node resource management." IEEE transactions on services computing 13.6: 1086-1099. (Year: 2017).

Xu, Wenyuan, et al. "Accelerating federated learning for lot iot in big data analytics with pruning, quantization and elective updating." IEEE Access 9: 38457-38466. (Year: 2021).

Huang, Lei, et al. "Towards Elasticity in Heterogeneours Edge-dense Environemtns." 2022 IEEE 42nd International Conference on Distributed Computing Systems (ICDCS). IEEE. (Year: 2022).

Deng Ruoqi et al. "Ultra-Dense LEO Satellite Based Formation Flying"; IEE Transactions on Communications; vol. 69, No. 5; May 2021; pp. 3091-3105.

Orescanin Marko, et al. "Federated Fine-Tuning Performance od Edge Devices"; 2021 20th IEEE International Conference on Machine Learning and Applications (ICMLA); IEE; Year: 2021.

Notification of Transmittal of the International Search Report & The Written Opinion of the International Search Authority; mailed Jul. 8, 2024; PCT/US2024/014091.

\* cited by examiner

FIG. 13

FLEET AND ASSET MANAGEMENT AND INTERFACES THEREOF ASSOCIATED WITH EDGE COMPUTING DEPLOYMENTS

CROSS-REFERENCE TO RELATED APPLICATIONS

The present application is a continuation of U.S. application Ser. No. 18/493,684, filed Oct. 24, 2023, contents of which are hereby incorporated by reference as if set forth fully herein.

TECHNICAL FIELD

The present disclosure pertains to edge computing, and more specifically pertains to systems and techniques for fleet and asset management and interfaces thereof associated with a plurality of edge-deployed assets and/or containerized data center units.

BACKGROUND

Edge computing is a distributed computing paradigm that can be used to decentralize data processing and other computational operations by bringing compute capability and data storage closer to the edge (e.g., the location where the compute and/or data storage is needed, often at the "edge" of a network such as the internet). Edge computing systems are often provided in the same location where input data is generated and/or in the same location where an output result of the computational operations is needed. The use of edge computing systems can reduce latency and bandwidth usage, as data is ingested and processed locally at the edge and rather than being transmitted to a more centralized location for processing.

In many existing cloud computing architectures, data generated at endpoints (e.g., mobile devices, Internet of Things (IoT) sensors, robots, industrial automation systems, security cameras, etc., among various other edge devices and sensors) is transmitted to centralized data centers for processing. The processed results are then transmitted from the centralized data centers to the endpoints requesting the processed results. The centralized processing approach may present challenges for growing use cases, such as for real-time applications and/or artificial intelligence (AI) and machine learning (ML) workloads. For instance, centralized processing models and conventional cloud computing architectures can face constraints in the areas of latency, availability, bandwidth usage, data privacy, network security, and the capacity to process large volumes of data in a timely manner.

In the context of edge computing, the "edge" refers to the edge of the network, close to the endpoint devices and the sources of data. In an edge computing architecture, computation and data storage are distributed across a network of edge nodes that are near the endpoint devices and sources of data. The edge nodes can be configured to perform various tasks relating to data processing, storage, analysis, etc. Based on using the edge nodes to process data locally, the amount of data that is transferred from the edge to the cloud (or other centralized data center) can be significantly reduced. Accordingly, the use of edge computing has become increasingly popular for implementing a diverse range of AI and ML applications, as well as for serving other use cases that demand real-time processing, minimal latency, high availability, and high reliability. In general, such applications and use cases may rely on high-bandwidth sensors that have the ability to generate data at massive rates (e.g., on the order of 50 Gbit/sec or 22 TB/hr).

BRIEF SUMMARY

In some examples, systems and techniques are described for implementing fleet management (e.g., a fleet of edge compute units) and/or asset management (e.g., connected sensors and other assets at the edge) and interfaces thereof for high-performance edge computing, including edge computing for machine learning (ML) and/or artificial intelligence (AI) deployments and/or workloads.

According to at least one illustrative example, a method is provided, the method comprising: obtaining a plurality of data points each associated with a respective edge device included in a fleet of a plurality of edge devices, each respective edge device associated with one or more of a corresponding edge site location or a corresponding edge device asset group; storing at least a portion of the plurality of data points to a fleet map data catalog associated with generating one or more fleet map graphical user interface (GUI) views; receiving one or more user inputs indicative of a filtering selection for viewing a filtered subset of the fleet map data catalog, wherein the filtering selection indicates a selected geographic view area and indicates one or more selected edge device types from a plurality of edge device types; obtaining, from the fleet map data catalog and based on the one or more user inputs indicative of the filtering selection, data points corresponding to the filtered subset; generating a fleet map GUI view using the data points corresponding to the filtered subset, wherein the fleet map GUI view comprises a converged geographic map of the selected geographic view area, and wherein the data points are rendered at corresponding locations within the converged geographic map; and outputting the fleet map GUI view for display to a user associated with the fleet of edge devices.

In another illustrative example, an apparatus is provided, where the apparatus comprises at least one memory and at least one processor coupled to the at least one memory, the at least one processor configured to: obtain a plurality of data points each associated with a respective edge device included in a fleet of a plurality of edge devices, each respective edge device associated with one or more of a corresponding edge site location or a corresponding edge device asset group; store at least a portion of the plurality of data points to a fleet map data catalog associated with generating one or more fleet map graphical user interface (GUI) views; receive one or more user inputs indicative of a filtering selection for viewing a filtered subset of the fleet map data catalog, wherein the filtering selection indicates a selected geographic view area and indicates one or more selected edge device types from a plurality of edge device types; obtain, from the fleet map data catalog and based on the one or more user inputs indicative of the filtering selection, data points corresponding to the filtered subset; generate a fleet map GUI view using the data points corresponding to the filtered subset, wherein the fleet map GUI view comprises a converged geographic map of the selected geographic view area, and wherein the data points are rendered at corresponding locations within the converged geographic map; and output the fleet map GUI view for display to a user associated with the fleet of edge devices.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), robotic system (e.g., autonomous passenger vehicle, unmanned aircraft system (UAS), uncrewed ground vehicle (UGV), mobile robotic platform, uncrewed submersible, biped or multi-legged robot, cobot, industrial automation, articulated arm, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "connected device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on. An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The use of a same reference numbers in different drawings indicates similar or identical items or features. Understanding that these drawings depict only exemplary embodiments of the disclosure and are not therefore to be considered to be limiting of its scope, the principles herein are described and explained with additional specificity and detail through the use of the accompanying drawings in which:

Figure 13:
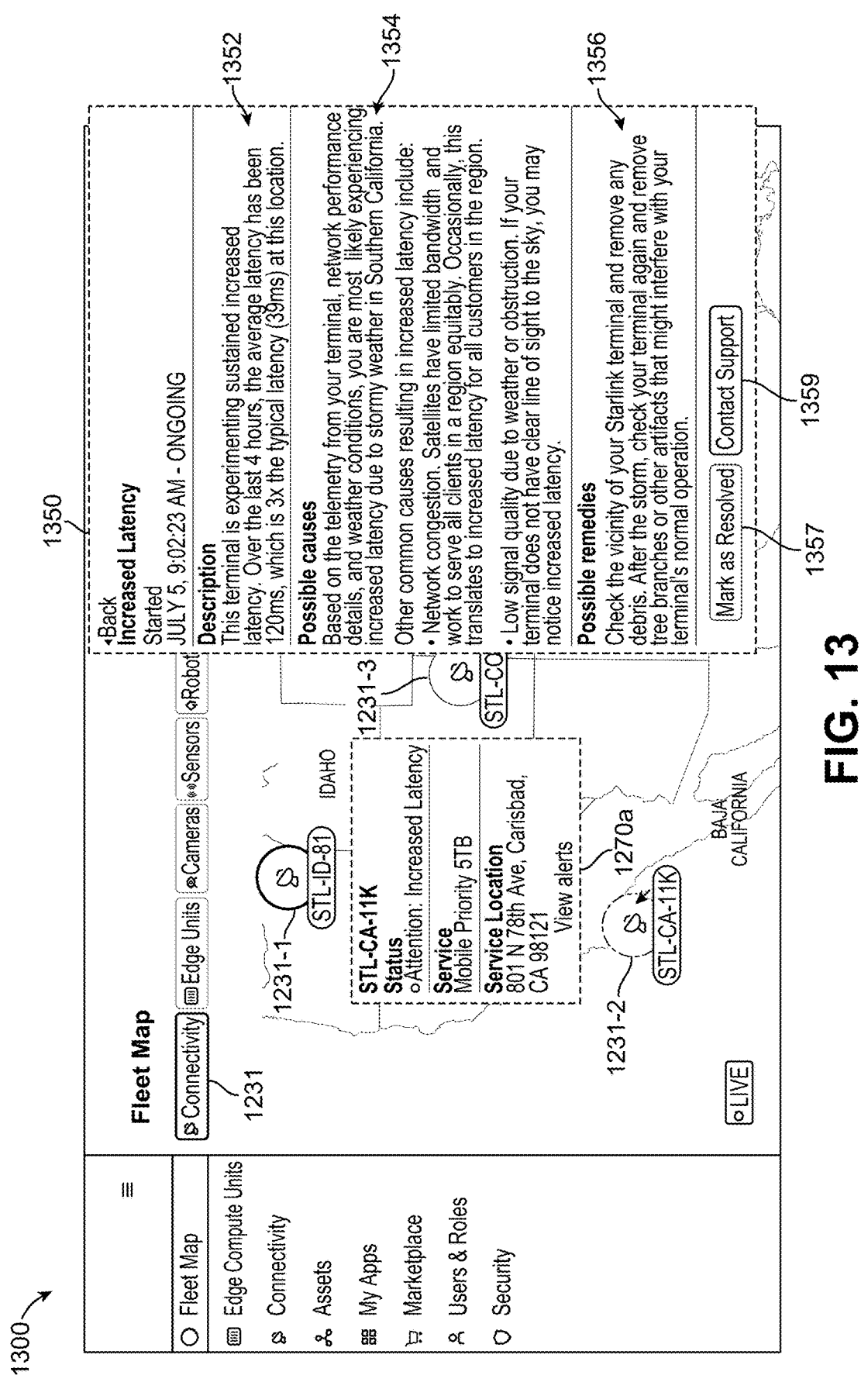

FIG. 13 is a diagram illustrating an example fleet map GUI including real-time alert information corresponding to an alert automatically generated using one or more deep-learning-based ML and/or AI detection agents, in accordance with some examples;

DETAILED DESCRIPTION

Figure 1:
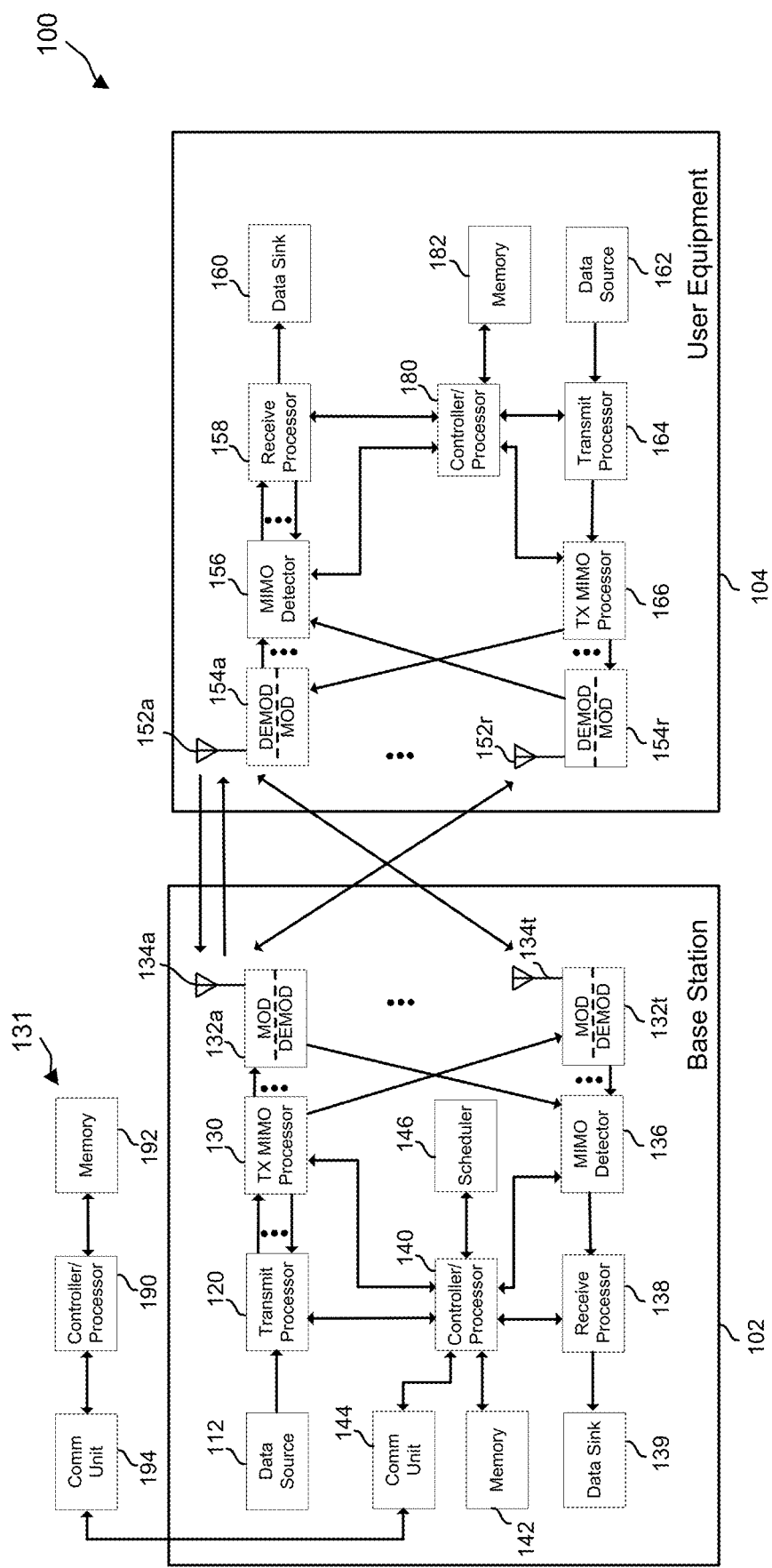
FIG. 1 depicts an example design of a base station and a user equipment (UE) for transmission and processing of signals exchanged between the UE and the base station, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Overview

Systems, apparatuses, methods (also referred to as processes), and computer-readable media (collectively referred to herein as "systems and techniques") are described herein for fleet and asset management, including interfaces thereof (e.g., user interfaces (UIs), graphical user interfaces (GUIs), etc.). For example, the systems and techniques can be used to provide a fleet map for the collection, aggregation, transfer, and/or analysis of data and other information obtained from a plurality of connected edge assets deployed across various sites or edge locations. As used herein, the term "fleet" can be used to refer to the plurality of connected edge assets that are deployed to the edge, associated with an edge deployment, or both. In some examples, the fleet map can be utilized with and/or integrated or otherwise combined with a fleet and asset management system used for the edge deployment. For instance, the fleet map can be used to provide a visual, geographic-based or geographic-referenced single-pane-of-glass representation of a user's (e.g., enterprise user, etc.) distributed assets and operations anywhere on the planet (e.g., land, sea, air, etc.). In some aspects, the fleet map can be associated with a fleet of connected edge assets that includes one or more containerized data center units. In some examples, a fleet of connected assets (e.g., connected edge assets) can include one or more containerized data center units (also referred to herein as "edge compute units", etc.), one or more connected sensors and/or other assets associated with a particular edge compute unit or edge site location (or both), and one or more communications terminals. For instance, the one or more communications terminals may include satellite terminals (e.g., satellite transceivers) configured to provide data network connectivity with an internet satellite constellation.

A fleet map interface (e.g., fleet map UI, fleet map GUI, etc.) can be a visual interface associated with the fleet and asset management systems and techniques described herein. The fleet map interface can be an informational visual interface used to display various types of information or collected data, either automatically or in response to a user preference, query, etc. The fleet map interface can also be an interactive visual interface that is used for both the display of information as well as to receive various user inputs, controls, configurations, commands, etc., at least some of which may be responsive to information that was or is displayed in the fleet map interactive visual interface.

As will be described in greater depth below, the presently disclosed fleet map can be used to implement a live (e.g., real-time or substantially real-time), dynamic, and flexible user interface that can be scaled up or down commensurate with both large and small fleets of connected assets at the edge. In general, the "fleet" of connected assets at the edge can vary in both composition and location, with the plurality of connected assets included in the fleet each generally associated with the same user (or same set of users and/or associated or inter-related entities, etc.). That is, in examples where multiple users or entities are registered with the fleet and asset management system(s) described herein, each registered user or entity may be associated with one or more uniquely corresponding fleets. In other words, while a "fleet" of connected assets may be used to refer to a plurality of connected assets that are associated with the fleet and asset management system, a "fleet" does not necessarily refer to the entirety of every individual connected asset that is associated with the fleet and asset management system—a first subset of the totality of connected assets may comprise a first fleet associated with a first user/entity; a second subset of the totality of connected assets may comprise a second fleet associated with a second user/entity; a third subset of the totality of connected assets may comprise a third fleet associated with the second user/entity (e.g., the same user/entity may be associated with multiple different fleets); a fourth subset of the totality of connected assets may comprise a fourth fleet associated with a third user/entity; etc.

In some aspects, the fleet and asset management and/or fleet map described herein can be utilized with a fleet of connected assets that includes one or more edge compute units. For instance, an edge compute unit can be a containerized data center unit configured to provide resilient and self-contained high-performance computing at the edge (e.g., edge computing). The edge compute units (e.g., containerized data center units) can be used to implement high-performance edge computing at or across one or more multiple edge locations. For instance, a containerized edge data center unit can be deployed individually within a fleet of other connected assets, with the remaining assets of the fleet either deployed to the same edge location as the containerized data center unit or otherwise configured for wired or wireless communication with the containerized data center unit. In another example, a containerized edge data center unit can be deployed as one of a plurality of containerized data center units included in a fleet.

Different ones of a plurality of edge compute units included in a fleet of connected assets (e.g., connected edge assets) can include different combinations of modular and/or configurable compute hardware units (e.g., CPUs, GPUs, TPUs, NPUs, accelerators, memory, storage, etc.) for implementing high-performance edge computing (e.g., implementing inference for one or more trained ML or AI models, etc.). In some cases, the edge compute unit can be a data center unit that is deployable to the edge. An edge compute unit (e.g., containerized data center or containerized compute unit) can be configured according to an intended use case and/or according to one or more deployment site location characteristics. For example, the edge compute unit can be a containerized data center having various hardware configurations (e.g., CPU-centric or GPU-centric compute hardware configuration; urban location or remote location configuration; private electrical/data network or utility electrical/data network connectivity configuration; etc.). The containerized edge compute unit can be deployed to a user-determined (e.g., enterprise-determined) site location. The enterprise site location may have varying levels of existing infrastructure availability, based upon which the containerized edge compute unit can be correspondingly configured. For example, the containerized edge compute unit can be configured based at least in part on the electrical infrastructure and data connectivity infrastructure availability at the enterprise site location. The containerized edge compute unit can be pre-configured (at the time of deployment to the enterprise site location) with hardware infrastructure, data connectivity, and critical environmental systems fully or partially integrated. In one illustrative example, the containerized edge compute unit can be pre-configured (e.g., pre-loaded) with a fleet management, knowledge bases, predetermined datasets and trained ML/AI models and application software stack for edge computing AI and ML workloads.

A containerized edge compute unit may be associated with a particular edge location (e.g., the physical site location or edge deployment location of the containerized edge compute unit) and a plurality of connected sensors and/or edge assets. The plurality of connected sensors and/or edge assets are associated with and communicatively coupled to the containerized edge compute unit. The plurality of connected sensors and/or edge assets may be located (e.g., collocated) with the containerized edge compute unit at the same particular edge location, or may be located remote from the containerized edge compute unit and/or the particular edge location. In some aspects, a containerized edge compute unit (deployed individually or as part of a fleet of multiple containerized edge compute units) can be used to provide local (e.g., edge) storage, inference, prediction, response, etc. using trained ML and/or AI models from a centralized or cloud distribution source, where the trained models are trained or fine-tuned remotely from the edge compute unit. For instance, a containerized edge compute unit can interface to ML/AI training clusters running in the cloud. The edge compute units can subsequently run or implement their respective trained models locally (e.g., onboard the edge compute unit), using as input the data obtained from local sensors or other endpoint assets associated with the edge compute unit.

In one illustrative example, the systems and techniques described herein can implement one or more fleet maps as part of a cloud-based global management console (or other cloud-based global management system) associated with the deployment of a fleet of connected edge assets that includes one or more containerized edge data center units and that includes a plurality of connected sensors and/or various other edge assets. As will be described in greater depth below, the presently disclosed fleet maps provide real-time, dynamic, and flexible user interface that allow enterprise users with large deployments of remote operations and assets to observe, manage and control these remote operations and assets from a single-pane-of-glass representation accessible through the cloud (e.g., the fleet map). In particular, the presently disclosed fleet maps can be used to observe, manage, and control, etc., one or more of an enterprise user's assets, resources, personnel, etc.; moreover, the fleet map can be used to gain immediate and actionable insights into the physical, operational, environmental, and/or security conditions and status of the globally-distributed assets and operations represented in one or more fleet map GUIs or other representations and depictions, etc.

The presently disclosed systems and techniques for providing one or more fleet maps for single-pane representation and control of a fleet of connected assets can be used to implement the fleet map in real-time (e.g., live). For instance, the fleet map can be configured to continuously update with data streaming from millions of different sources (e.g., including, but not limited to: Internet-of-Things (IoT) devices; Industrial IoT (IIoT) devices; sensors; cameras or other imaging devices; machines and equipment; ML or AI-generated inputs; ML or AI-augmented inputs; ML/AI and/or human-augmented inputs; data aggregation sources/layers; data batching sources/layers; data streaming sources/layers; data processing sources/layers; etc.)

The fleet map can be rendered and presented dynamically, such that a user of the fleet map interface (e.g., UI, GUI, etc.) can dynamically zoom in or out on different geographic regions of interest, can interact with map markers and/or overlay layers to gain additional insights into the status of assets, personnel, and/or operations, etc. The fleet map can be rendered and presented in a flexible manner that is based at least in part on one or more user-configured preferences (e.g., configured in advance) and/or one or more user-indicated preference (e.g., configured in substantially real-time via an input to the fleet map GUI, etc.). The user preference configuration of the fleet map can drive the adjustment of the presented fleet map content to be relevant to the user in real-time. Fleet map content and/or overlays, for example, can respond automatically to various different triggers, conditions, events or scenarios, etc. The fleet map content and overlays can be configured to provide information in various different levels of granularity, from individual asset-level details, to increasingly greater degrees of aggregation and summarization corresponding to groupings and/or relationships of or between (respectively) multiple connected assets within the fleet (e.g., multiple assets can be grouped under a representation of one machine, multiple machines can be grouped under a representation of one process, multiple processes can be grouped under a representation of one site, multiple sites can be grouped under a representation of a region, etc.).

Further details regarding the systems and techniques described herein will be discussed below with respect to the figures.

FIG. 1 shows a block diagram of a design of a base station 102 and a UE 104 that enable transmission and processing of signals exchanged between the UE and the base station, in accordance with some aspects of the present disclosure. Design 100 includes components of a base station 102 and a UE 104. In some examples, the architecture of base station 102 can be the same as or similar to an architecture used to implement a satellite constellation ground station (e.g., internet gateway for providing internet connectivity via a satellite constellation). In some examples, the architecture of base station 102 can be the same as or similar to an architecture used to implement a satellite of a satellite constellation and/or a network entity in communication with a satellite constellation (e.g., such as the satellite constellations and/or networks depicted in FIGS. 2 and 3).

As illustrated in FIG. 1, base station 102 may be equipped with T antennas 134a through 134t, and UE 104 may be equipped with R antennas 152a through 152r, where in general T≥1 and R≥1. At base station 102, a transmit processor 120 may receive data from a data source 112 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 120 may also process system information (e.g., for semi-static resource partitioning information (SRPI) and/or the like) and control information (e.g., CQI requests, grants, upper layer signaling, and/or the like) and provide overhead symbols and control symbols. Transmit processor 120 may also generate reference symbols for reference signals (e.g., the cell-specific reference signal (CRS)) and synchronization signals (e.g., the primary synchronization signal (PSS) and secondary synchronization signal (SSS))). A transmit (TX) multiple-input multiple-output (MIMO) processor 130 may perform spatial processing (e.g., precoding) on the data symbols, the control symbols, the overhead symbols, and/or the reference symbols, if applicable, and may provide T output symbol streams to T modulators (MODs) 132a through 132t. The modulators 132a through 132t are shown as a combined modulator-demodulator (MOD-DEMOD). In some cases, the modulators and demodulators can be separate components. Each modulator of the modulators 132a to 132t may process a respective output symbol stream, e.g., for an orthogonal frequency-division multiplexing (OFDM) scheme and/or the like, to obtain an output sample stream. Each modulator of the modulators 132a to 132t may further process (e.g., convert to analog, amplify, filter, and upconvert) the output sample stream to obtain a downlink signal. T downlink signals may be transmitted from modulators 132a to 132t via T antennas 134a through 134t, respectively. According to certain aspects described in more detail below, the synchronization signals can be generated with location encoding to convey additional information.

At UE 104, antennas 152a through 152r may receive the downlink signals from base station 102 and/or other base stations and may provide received signals to demodulators (DEMODs) 154a through 154r, respectively. The demodulators 154a through 154r are shown as a combined modulator-demodulator (MOD-DEMOD). In some cases, the modulators and demodulators can be separate components. Each demodulator of the demodulators 154a through 154r may condition (e.g., filter, amplify, downconvert, and digitize) a received signal to obtain input samples. Each demodulator of the demodulators 154a through 154r may further process the input samples (e.g., for OFDM and/or the like) to obtain received symbols. A MIMO detector 156 may obtain received symbols from all R demodulators 154a through 154r, perform MIMO detection on the received symbols if applicable, and provide detected symbols. A receive processor 158 may process (e.g., demodulate and decode) the detected symbols, provide decoded data for UE 104 to a data sink 160, and provide decoded control information and system information to a controller/processor 180. A channel processor may determine reference signal received power (RSRP), received signal strength indicator (RSSI), reference signal received quality (RSRQ), channel quality indicator (CQI), and/or the like.

On the uplink, at UE 104, a transmit processor 164 may receive and process data from a data source 162 and control information (e.g., for reports comprising RSRP, RSSI, RSRQ, CQI, and/or the like) from controller/processor 180. Transmit processor 164 may also generate reference symbols for one or more reference signals (e.g., based at least in part on a beta value or a set of beta values associated with the one or more reference signals). The symbols from transmit processor 164 may be precoded by a TX-MIMO processor 166 if application, further processed by modulators 154a through 154r (e.g., for DFT-s-OFDM, CP-OFDM, and/or the like), and transmitted to base station 102. At base station 102, the uplink signals from UE 104 and other UEs may be received by antennas 134a through 134t, processed by demodulators 132a through 132t, detected by a MIMO detector 136 if applicable, and further processed by a receive processor 138 to obtain decoded data and control information sent by UE 104. Receive processor 138 may provide the decoded data to a data sink 139 and the decoded control information to controller (e.g., processor) 140. Base station 102 may include communication unit 144 and communicate to a network controller 131 via communication unit 144. Network controller 131 may include communication unit 194, controller/processor 190, and memory 192. In some aspects, one or more components of UE 104 may be included in a housing. Memories 142 and 182 may store data and program codes for the base station 102 and the UE 104, respectively. A scheduler 146 may schedule UEs for data transmission on the downlink, uplink, and/or sidelink.

Data Network Connectivity Using Satellite Constellations

As noted previously, low-orbit satellite constellation systems have been rapidly developed and deployed to provide wireless communications and data network connectivity. A fleet of discrete satellites (also referred to as "birds") can be arranged as a global satellite constellation that provides at least periodic or intermittent coverage to a large portion of the Earth's surface. In many cases, at least certain areas of the Earth's service may have continuous or near-continuous coverage from at least one bird of the satellite constellation. For instance, a global satellite constellation can be formed based on a stable (and therefore predictable) space geometric configuration, in which the fleet of birds maintain fixed space-time relationships with one another. A satellite constellation be used to provide data network connectivity to ground-based devices and/or other terrestrial receivers. For example, a satellite constellation can be integrated with or otherwise provide connectivity to one or more terrestrial (e.g., on-ground) data networks, such as the internet, a 4G/LTE network, and/or a 5G/NR network, among various others. In one illustrative example, a satellite internet constellation system can include a plurality of discrete satellites arranged in a low-earth orbit and used to provide data network connectivity to the internet.

To implement an internet satellite constellation, the discrete satellites can be used as space-based communication nodes that couple terrestrial devices to terrestrial internet gateways. The terrestrial internet gateways may also be referred to as ground stations, and are used to provide connectivity to the internet backbone. For instance, a given satellite can provide a first communication link to a terrestrial device and a second communication link to a ground station that is connected to an internet service provider (ISP). The terrestrial device can transmit data and/or data requests to the satellite over the first communication link, with the satellite subsequently forwarding the transmission to the ground station internet gateway (from which point onward the transmission from the device is handled as a normal internet transmission). The terrestrial device can receive data and/or requests using the reverse process, in which the satellite receives a transmission from the ground station internet gateway via the second communication link and then forwards the transmission to the terrestrial device using the first communication link.

Although an internet satellite constellation includes a fleet of discrete satellites, in some cases terrestrial devices connected with a satellite may communicate with a ground station/internet gateway that is also able to communicate with the same satellite. In other words, it is typically the case that the first and second communication links described above must be established with the same satellite of the satellite constellation. A user connecting to any particular satellite is therefore limited by the ground station/internet gateways that are visible to that particular satellite. For instance, a user connected to a satellite that is unable to establish a communication link with a ground station/internet gateway is therefore unable to connect to the internet— although the fleet of satellites is a global network in terms of spatial diversity and arrangement, the individual satellites function as standalone internet relay nodes unless an inter-satellite link capability is provided.

In some cases, inter-satellite links can allow point to point communications between the individual satellites included in a satellite constellation. For instance, data can travel at the speed of light from one satellite to another, resulting in a fully interconnected global mesh network that allows access to the internet as long as the terrestrial device can establish communication with at least one satellite of the satellite internet constellation. In one illustrative example, a satellite internet constellation can implement inter-satellite links as optical communication links. For example, optical space lasers can be used to implement optical intersatellite links (ISLs) between some (or all) of the individual birds of a satellite constellation. In this manner, the satellite internet constellation can be used to transmit data without the use of local ground stations, and may be seen to provide truly global coverage.

For instance, optical laser links between individual satellites in a satellite constellation can reduce long-distance latency by as much as 50%. Additionally, optical laser links (e.g., ISLs) can enable the more efficient sharing of capacity by utilizing the otherwise wasted satellite capacity over regions without ground station internet gateways. Moreover, optical laser links allow the satellite constellation to provide internet service (or other data network connectivity) to areas where ground stations are not present and/or are impossible to install.

To implement a satellite constellation, one or more satellites may be integrated with the terrestrial infrastructure of a wireless communication system. In general, satellites may refer to Low Earth Orbit (LEO) devices, Medium Earth Orbit (MEO) devices, Geostationary Earth Orbit (GEO) devices, and/or Highly Elliptical Orbit (HEO) devices. In some aspects, a satellite constellation can be included in or used to implement a non-terrestrial network (NTN). A non-terrestrial network (NTN) may refer to a network, or a segment of a network, that uses an airborne or spaceborne vehicle for transmission. For instance, spaceborne vehicles can refer to various ones of the satellites described above. An airborne vehicle may refer to High Altitude Platforms (HAPs) including Unmanned Aircraft Systems (UAS). An NTN may be configured to help to provide wireless communication in un-served or underserved areas to upgrade the performance of terrestrial networks. For example, a communication satellite (e.g., of a satellite constellation) may provide coverage to a larger geographic region than a terrestrial network base station. The NTN may also reinforce service reliability by providing service continuity for UEs or for moving platforms (e.g., passenger vehicles-aircraft, ships, high speed trains, buses). The NTN may also increase service availability, including critical communications. The NTN may also enable network scalability through the provision of efficient multicast/broadcast resources for data delivery towards the network edges or even directly to the user equipment.

Figure 2:
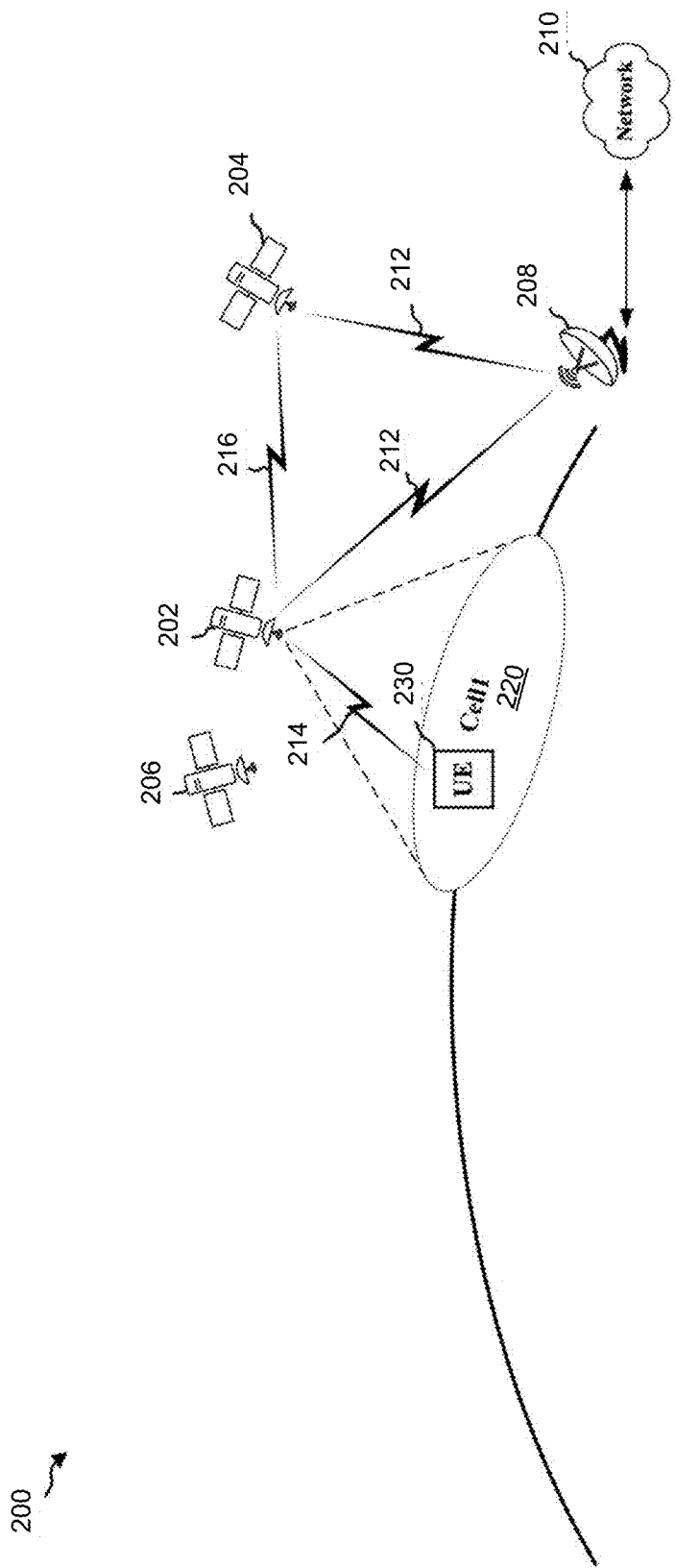
FIG. 2 is a diagram illustrating an example configuration of a Non-Terrestrial Network (NTN) for providing data network connectivity to terrestrial (ground-based) devices, in accordance with some examples.

FIG. 2 is a diagram illustrating an example configuration 200 of an NTN for providing data network connectivity to terrestrial (ground-based) devices. In one illustrative example, the NTN can be a satellite internet constellation, although various other NTNs and/or satellite constellation data network connectivity types may also be utilized without departing from the scope of the present disclosure. As used herein, the terms "NTN" and "satellite constellation" may be used interchangeably.

An NTN may refer to a network, or a segment of a network, that uses RF resources on-board an NTN platform. The NTN platform may refer to a spaceborne vehicle or an airborne vehicle. Spaceborne vehicles include communication satellites that may be classified based on their orbits. For example, a communication satellite may include a GEO device that appears stationary with respect to the Earth. As such, a single GEO device may provide coverage to a geographic coverage area. In other examples, a communication satellite may include a non-GEO device, such as an LEO device, an MEO device, or an HEO device. Non-GEO devices do not appear stationary with respect to the Earth. As such, a satellite constellation (e.g., one or more satellites) may be configured to provide coverage to the geographic coverage area. An airborne vehicle may refer to a system encompassing Tethered UAS (TUA), Lighter Than Air UAS (LTA), Heavier Than Air UAS (HTA) (e.g., in altitudes typically between 8 and 50 km including High Altitude Platforms (HAPs)).

A satellite constellation can include a plurality of satellites, such as the satellites 202, 204, and 206 depicted in FIG. 2. The plurality of satellites can include satellites that are the same as one another and/or can include satellites that are different from one another. A terrestrial gateway 208 can be used to provide data connectivity to a data network 210. For instance, the terrestrial gateway 208 can be a ground station (e.g., internet gateway) for providing data connectivity to the internet. Also depicted in FIG. 2 is a UE 230 located on the surface of the earth, within a cell coverage area of the first satellite 202. In some aspects, the UE 230 can include various devices capable of connecting to the NTN 200 and/or the satellite constellation thereof for wireless communication.

The gateway 208 may be included in one or more terrestrial gateways that are used to connect the NTN 200 and/or satellite constellation thereof to a public data network such as the internet. In some examples, the gateway 208 may support functions to forward a signal from the satellite constellation to a Uu interface, such as an NR-Uu interface. In other examples, the gateway 208 may provide a transport network layer node, and may support various transport protocols, such as those associated with providing an IP router functionality. A satellite radio interface (SRI) may provide IP trunk connections between the gateway 208 and various satellites (e.g., satellites 202-206) to transport NG or F1 interfaces, respectively.

Satellites within the satellite constellation that are within connection range of the gateway 208 (e.g., within line-of-sight of, etc.) may be fed by the gateway 208. The individual satellites of the satellite constellation can be deployed across a satellite-targeted coverage area, which can correspond to regional, continental, or even global coverage. The satellites of the satellite constellation may be served successively by one or more gateways at a time. The NTN 200 associated with the satellite constellation can be configured to provide service and feeder link continuity between the successive serving gateways 208 with time duration to perform mobility anchoring and handover.

In one illustrative example, the first satellite 202 may communicate with the data network 210 (e.g., the internet) through a feeder link 212 established between the first satellite 202 and the gateway 208. The feeder link 212 can be used to provide bidirectional communications between the first satellite 202 and the internet backbone coupled to or otherwise provided by gateway 208. The first satellite 202 can communicate with the UE 230 using a service link 214 established within the cell coverage (e.g., field-of-view) area of an NTN cell 220. The NTN cell 220 corresponds to the first satellite 202. In particular, the first satellite 202 and/or service link 214 can be used to communicate with different devices or UEs that are located within the corresponding NTN cell 220 of first satellite 202.

More generally, a feeder link (such as feeder link 212) may refer to a wireless link between a gateway and a particular satellite of a satellite constellation. A service link (such as service link 214) may refer to a wireless link between a UE and particular satellite of a satellite constellation. In some examples, one or more (or all) of the satellites of a satellite constellation can use one or more directional beams (e.g., beamforming) to communicate with the UE 230 via service link 214 and/or to communicate with the ground station/internet gateway 208 via feeder link 212. For instance, the first satellite 202 may use directional beams (beamforming) to communicate with UE 230 via service link 214 and/or to communicate with gateway 208 via feeder link 212. A beam may refer to a wireless communication beam generated by an antenna on-board a satellite.

In some examples, the UE 230 may communicate with the first satellite 202 via the service link 214, as described above. Rather than the first satellite 202 then using the feeder link 212 to forward the UE communications to internet gateway 208, the first satellite 202 may instead relay the communication to second satellite 204 through an inter-satellite link (ISL) 216. The second satellite 204 can subsequently communicate with the data network 210 (e.g., internet) through a feeder link 212 established between the second satellite 204 and the internet gateway 208. In some aspects, the ISL links can be provided between a constellation of satellites and may involve the use of transparent payloads on-board the satellites. The ISL link may operate in an RF frequency or an optical band. In one illustrative example, the ISL links between satellites of a satellite constellation can be implemented as optical laser links (e.g., using optical space laser transceivers provided on the satellites), as was noted previously above.

In the illustrated example of FIG. 2, the first satellite 202 may provide the NTN cell 220 with a first physical cell ID (PCI). In some examples, a constellation of satellites may provide coverage to the NTN cell 220. For example, the first satellite 202 may include a non-GEO device that does not appear stationary with respect to the Earth. For instance, the first satellite 202 can be a low-earth orbit (LEO) satellite included in a LEO satellite constellation for providing data network connectivity. As such, a satellite constellation (e.g., one or more satellites) may be configured to provide coverage to the NTN cell 220. For example, the first satellite 202, second satellite 204, and third satellite 206 may be part of a satellite constellation that provides coverage to the NTN cell 220.

In some examples, satellite constellation deployment may provide different services based on the type of payload onboard the satellite(s). The type of payload may determine whether the satellite acts as a relay node or a base station. For example, a transparent payload is associated with the satellite acting as a relay node, while a non-transparent payload is associated with the satellite acting as a base station. A transparent payload may implement frequency conversion and a radio frequency (RF) amplifier in both uplink (UL) and downlink (DL) directions and may correspond to an analog RF repeater. A transparent payload, for example, may receive UL signals from all served UEs and may redirect the combined signals DL to an earth station (e.g., internet gateway 208) without demodulating or decoding the signals. Similarly, a transparent payload may receive an UL signal from an earth station and redirect the signal DL to served UEs without demodulating or decoding the signal. However, the transparent payload may frequency convert received signals and may amplify and/or filter received signals before transmitting the signals.

A non-transparent payload may receive UL signals and demodulate or decode the UL signal before generating a DL signal. For instance, the first satellite 202 may receive UL signals from one or more served UEs (e.g., within the cell 220) and subsequently demodulate or decode the UL signals prior to generating one or more corresponding DL signals to the internet gateway 208. Similarly, the first satellite 202 may receive UL signals from the internet gateway 208 and subsequently demodulate or decode the UL signals prior to generating one or more corresponding DL signals to the served UEs within cell 220.

Satellite Internet Constellations

A satellite internet constellation is a fleet of satellite internet constellation satellites (also referred to as "birds") arranged in a low-earth orbit (LEO). Satellite internet constellations can be implemented based on the idea that, with a sufficiently large constellation, at any given time at least one satellite should be sufficiently close to communicate with both a user satellite dish and a satellite dish at an internet gateway. In such implementations, the internet gateway satellite dish is typically located in the same general vicinity (e.g., geographic area) as the user satellite dish because, as noted previously above, the same satellite is used to communicate with both the internet gateway and the user. Based on the same satellite communicating with both the user and the internet gateway, the satellite can be used to route (e.g., relay) internet traffic between the customer and the internet via the internet gateway.

Advantageously, users of such satellite internet constellations can connect to the internet without the requirement of having a physical connection to the internet gateway (although it is noted that the description herein may be applied equally to standalone satellite internet connectivity and/or satellite internet connectivity that is combined with other connectivity means such as WiFi/wireless, cellular, fiber optic and other wired connections, etc.) Satellite internet users are typically connected to an internet gateway via a series of intermediate connections (also referred to as hops). In many cases, the direct physical connections between internet users and internet gateways are provided via internet service providers (ISPs), for example over fiber optic cables or copper lines. Satellite internet constellations (and the associated satellite internet service thereof) can be valuable for users for whom direct physical connections to an internet gateway are unavailable or otherwise prohibitively expensive. For instance, in some cases, users in rural or low density areas may not have access to the internet and/or may not have access to high-speed (e.g., fiber) internet because the cost of a ground-based physical connection to a gateway cannot be amortized over a sufficiently large quantity of users to justify the expense (e.g., as physical internet infrastructure is often built out by ISPs with the expectation of recouping the buildout cost via monthly internet service fees charged to its customers).

Satellite internet constellations and the associated satellite internet service (also referred to as "satellite internet connectivity" or "satellite connectivity") can also be valuable as a backup or secondary communication link. For instance, satellite connectivity can be used to augment communications performed over a direct physical connections such as fiber, with a portion of communications routed over a fiber link and a portion of communications routed over a satellite connectivity link. The satellite connectivity link can be configured as a secondary link, a primary link, etc. The satellite connectivity link can additionally, or alternatively, be configured as a backup link for communications failover or fallback in case of a degradation or other interruption to a primary communication link (e.g., a primary finer link, etc.).

Satellite internet constellations can provide internet access to both users who are adequately served by conventional/existing physical ground-based internet connections and to users who are not adequately served (if served at all) by the existing physical ground-based internet connections. In some cases, geographic considerations beyond population density can also be an impediment to providing ground-based internet connectivity. For instance, island or archipelago geographies may be densely populated but have a landmass that is spread across numerous islands—in this case, it is logistically challenging and financially cumbersome to run fiber connections to all of the islands. Accordingly, geographic considerations can also act as a barrier to using conventional ground-based physical connections between users and internet gateways.

Figure 3:
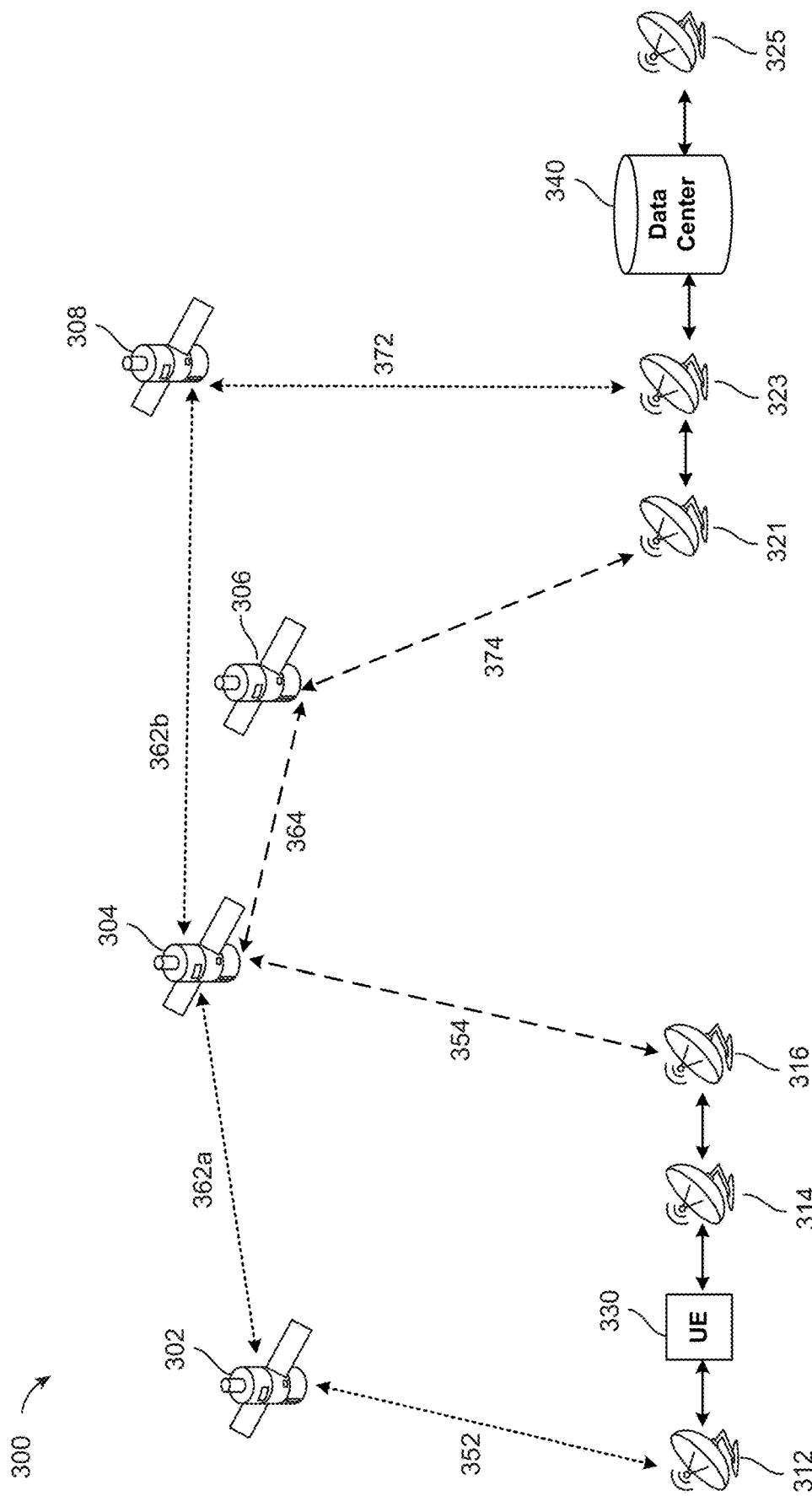
FIG. 3 is a diagram illustrating an example of a satellite internet constellation network that can be used to provide low latency satellite internet connectivity, in accordance with some examples.

FIG. 3 is a diagram illustrating an example of a satellite internet constellation network 300, which in some aspects can be used to provide low latency satellite internet connectivity to a plurality of users. The plurality of users can be associated with a corresponding plurality of UEs, such as the UE 330 depicted in FIG. 3. The UE(s) 330 can include various different computing devices and/or networking devices. In some embodiments, the UEs 330 can include any electronic device capable of connecting to a data network such as the internet.

The UE 330 can be associated with a plurality of client-side satellite internet constellation dishes, shown here as the satellite dishes 312, 314, and 316, although it is noted that a greater or lesser quantity of satellite dishes can be used without departing from the scope of the disclosure. In one illustrative example, the UE 330 and the satellite dishes 312, 314, 316 can be associated with one another based on a common or proximate geographic location, area, region, etc. In other words, it is contemplated that a plurality of client-side satellite internet constellation dishes can be deployed to serve (e.g., provide connectivity to the satellite internet constellation) various different geographic areas, with various granularities as desired. For example, a group of satellite dishes can be deployed in and around a city, a town, a region, etc. The groups of satellite dishes can also be deployed in rural areas (e.g., lower-density concentrations of users). Multiple satellite dishes may be connected the same Edge Compute Unit to offer redundancy and resilience against outage, high latency, or low bandwidth.

In some cases, one or more satellite dishes (and/or groups thereof) can be deployed in remote areas that are distant from population centers, and in particular, that are distant from various types of infrastructure (e.g., including but not limited to electrical/power connectivity, internet and/or communication networking, compute capacity, reach of skilled personnel, access to road transportation, etc.).

The client-side satellite dishes 312, 314, 316 can communicate with a satellite internet constellation, shown in FIG. 3 as including a first satellite 302, a second satellite 304, a third satellite 306, and a fourth satellite 304. However, it is noted that a greater quantity of satellites can be used to implement the satellite internet constellation, with FIG. 3 presenting a simplified example for purposes of clarity of explanation.

Similarly, a plurality of server-side satellite internet constellation dishes 321, 323, 325 can be provided in association with various different gateways, such as the gateway 340 depicted in FIG. 3. In some embodiments, the gateway 340 can be an internet gateway that provides connectivity to an internet backbone. In some aspects, the gateway 340 can be a data center or CDN that caches, hosts, stores, serves, or otherwise provides web content in response to receiving corresponding client requests for the content. It is again noted that a greater or lesser quantity of server-side satellite dishes can be utilized without departing from the scope of the present disclosure. As was described above with respect to the client-side satellite dishes 312, 314, 316, the server-side satellite dishes 321, 323, 325 can be associated to a respective data center 340 based on a common or proximate geographic location, area, region, etc. In one illustrative example, the server-side satellite dishes 321, 323, 325 can be located at varying levels of proximity to the respective data center 340. For instance, an inner layer of server-side satellite dishes can include the satellite dishes 323 and 325, which may be provided at the closest physical distance to the data center 340. An outer layer of server-side satellite dishes can include at least the satellite dish 321, which is located at a greater distance away from the data center 340 relative to the inner layer dishes 323 and 325. In some embodiments, the outer layer satellite dishes can be communicatively coupled to the inner layer satellite dishes via a wired and/or wireless connection. For example, the outer layer server-side satellite dish 321 can be communicatively coupled to the inner layer server-side satellite dish 323 via a wireless microwave relay connection (among various other wireless/ RF connections) and/or can be communicatively coupled to the inner layer server-side satellite dish 323 via a wired fiber connection.

By providing multiple different satellite dishes for communicating with the satellite internet constellation, at both the client-side associated with UE 330 and the server-side associated with datacenter 340, the systems and techniques described herein can increase the satellite constellation ground coverage area available to the UE 330 and to the datacenter 340. For instance, at the client-side associated with UE 330, the number of birds that are visible to or overhead the set of dishes 312, 314, 316 will almost always be greater than the number of birds that are visible to or otherwise overhead any individual one of the three client-side dishes 312, 314, 316. Similarly, at the server-side associated with datacenter 340, the number of birds that are visible to or otherwise overhead the set of the three dishes 321, 323, 325 will almost always be greater than the number of birds that are visible to or otherwise overhead any individual one of the three server-side dishes 321, 323, 325.

The interconnecting of the satellite dishes at each respective client location and at each respective server location, when combined with a satellite internet constellation implement optical space lasers or other ISLs, can enable more direct connectivity between the UE 330 and the datacenter 340. For instance, the UE 330 may use satellite dish 312 to communicate with satellite 302, via a service link 352. As illustrated, satellite 302 is out of range of the data center 340 (e.g., satellite 302 cannot establish a feeder link with any of the server-side dishes 321, 323, 325). In a conventional satellite internet constellation without ISLs, UE 330 would therefore be unable to use satellite 302 to obtain internet connectivity with data center 340 (based on the requirement in conventional satellite internet constellations that the same bird be used to connect the UE and an internet gateway).

Here, however, the UE 330 is able to establish internet connectivity with datacenter 340 via a first ISL 362a between satellite 302 and satellite 304, a second ISL 362b between satellite 304 and satellite 308, and a feeder link from satellite 308 to the server-side satellite dish 323. Notably, the UE 330 can establish internet connectivity with data center 340 via multiple different ISL-based paths through one different sets of birds of the satellite internet constellation. For instance, a first path from UE 330 to datacenter 340 is the combined path 352-362a-362b-372 described above. At least a second path from UE 330 to datacenter 340 may also be utilized. For example, the server-side dish 316 can communicate with satellite 304 via a service link 354, satellite 304 can communicate with satellite 306 via ISL 364, and satellite 306 can communicate with server-side dish 321 via feeder link 374.

Various other paths from the UE 330 to the datacenter 340 can also be utilized, with the two example paths of FIG. 3 provided for purposes of example and illustration, and not intended as limiting. For instance, the UE 330 can establish internet connectivity with datacenter 340 using a combination of: a particular service link selected from a plurality of available service links between one of the client-side dishes 312, 314, 316 to one of the birds of the constellation; one or more particular ISLs selected from a plurality of available ISLs between various combinations of two or more birds of the constellation; and a particular feeder link selected from a plurality of available feeder links between one of the birds of the constellation to one of the server-side dishes 321, 323, 325.

In some embodiments, the plurality of server-side satellite dishes (e.g., the dishes 321, 323, 325) can be located proximate to a datacenter, CDN, or other server-side proxy that serves internet content directly. In this example, the number of hops needed to provide internet connectivity to the UE 330 can be approximately equal to the 2+the number of ISLs in the path through the satellite constellation (e.g., 1× service link from UE 330 to the constellation, 1× feeder link from the constellation to the datacenter 340, and any ISLs taken between the service link satellite and the feeder link satellite).

In another example, the plurality of server-side satellite dishes (e.g., dishes 321, 323, 325) can be located proximate to a terrestrial internet gateway that connects via ground-based connections, such as fiber, to the corresponding datacenter, CDN, server-side proxy, etc., that hosts content requested by UE 330. For instance, one or more server-side satellite dishes can be provided proximate to multiple different terrestrial internet gateways. In this manner, the satellite internet constellation may, in some cases, analyze a client request from UE 330 to determine a particular terrestrial internet gateway that has the lowest latency to a proxy of the web server associated with the client request. Based on the analysis, the satellite internet constellation can determine one or more ISLs to route the client request to a bird that is overhead the identified gateway having the lowest latency to the proxy. In some examples, the satellite internet constellation can determine the lowest latency as the lowest latency from one of the terrestrial internet gateways to a proxy of the requested web server (e.g., without accounting for additional latency introduced by the number of ISLs or inter-satellite constellation hops needed to connect UE 330 to the lowest latency internet gateway). In other example, the satellite internet constellation can determine the lowest latency as being inclusive of both the latency through the ISL hops within the satellite constellation plus the latency through the one or more hops from a gateway to the proxy.

Notably, the systems and techniques described herein can be used to provide lower latency satellite internet by decoupling UE 330 from the limitation of only being able to connect to its local internet gateways. In some cases, the satellite internet constellation can receive signaling from one or more server-side proxies indicative of a current load, predicted load, etc., associated with each respective one of the server-side proxies. Based on the indicated load information for the proxies, the satellite internet constellation can more intelligently route internet traffic to gateways with proxies having sufficient capacity (and/or the most available capacity) to handle the traffic. For instance, the traffic-aware routing (e.g., load balancing) can be implemented in combination with the latency-based routing described above.

In some embodiments, the satellite internet constellation can be configured to inspect and/or analyze the contents of internet traffic from UE 330. For instance, if the satellite internet constellation can inspect the contents of client-side internet traffic, a web client (e.g., browser) and/or a satellite internet constellation client-side proxy can maintain a consistent/persistent secure connection with an appropriate gateway proxy, thereby reducing the number of roundtrips by approximately 60%. The roundtrip reduction of 60% may be in addition to the already reduced number of hops between the UE 330 and the datacenter 340.

EXAMPLE EMBODIMENTS

Systems, apparatuses, methods (also referred to as processes), and computer-readable media (collectively referred to herein as "systems and techniques") are described herein for fleet and asset management, and interfaces thereof, that may be associated with and used to manage and/or monitor a plurality of connected devices of a fleet of connected devices, which can include one or more containerized data center units and/or other edge compute units that can be used to provide resilient and self-contained high-performance computing at the edge (e.g., edge computing). The containerized data center apparatus can also be referred to herein as a "containerized data center unit," a "containerized edge data center," an "edge compute unit," etc.

The use of edge computing has become increasingly popular for implementing a diverse range of AI and ML applications, as well as for serving other use cases that demand real-time processing, minimal latency, high availability, and high reliability. For example, such applications and use cases may rely on high-bandwidth sensors that have the ability to generate data at massive rates (e.g., on the order of 50 Gbit/sec or 22 TB/hr), and may be unsuitable for deployments based on the conventional edge-cloud-edge data transport paradigm.

The systems and techniques described herein can be used to provide a visual, geographic-based, and/or geographic-referenced single-pane-of-glass representation of an entity's (e.g., enterprise user, etc.) distributed assets and operations anywhere on the planet (e.g., land, sea, air, etc.), with the ability to scale up or down to seamlessly and dynamically support both small and large deployments of connected assets, and accordingly, with the ability to scale seamlessly and dynamically to support the real-time presentation and monitoring of connected edge data even at the massive data rates on the order of 50+ Gbit/sec noted above.

The discussion below begins with a discussion of example contexts in which the fleet map and/or the systems and techniques described herein for fleet and asset management may be utilized. For example, the discussion provided with reference to FIGS. 4-7 relates to various example implementations for high-performance edge computing for machine learning (ML) and artificial intelligence (AI) workloads performed using one or more edge compute units (e.g., a fleet of edge compute units, or a fleet including edge compute units).

In particular, the description made with reference to FIGS. 4-7 is organized into sections corresponding to (1) Example AI and ML workloads at the edge; (2) Example connected edge and cloud implementations for AI and ML workloads; (3) Example software stack and services of an example edge AI/ML monitoring and management platform, including: (i) Global Management Console; (ii) Local Management Console; (iii) Application Repository/Marketplace; (iv) Software Defined Networking (SDN) Network Configuration Engine; (v) Lifecycle and Fleet Management Daemon; (vi) Telemetry and Monitoring Observer; and (vii) Satellite Internet Constellation Edge Connectivity Management.

Figure 8:
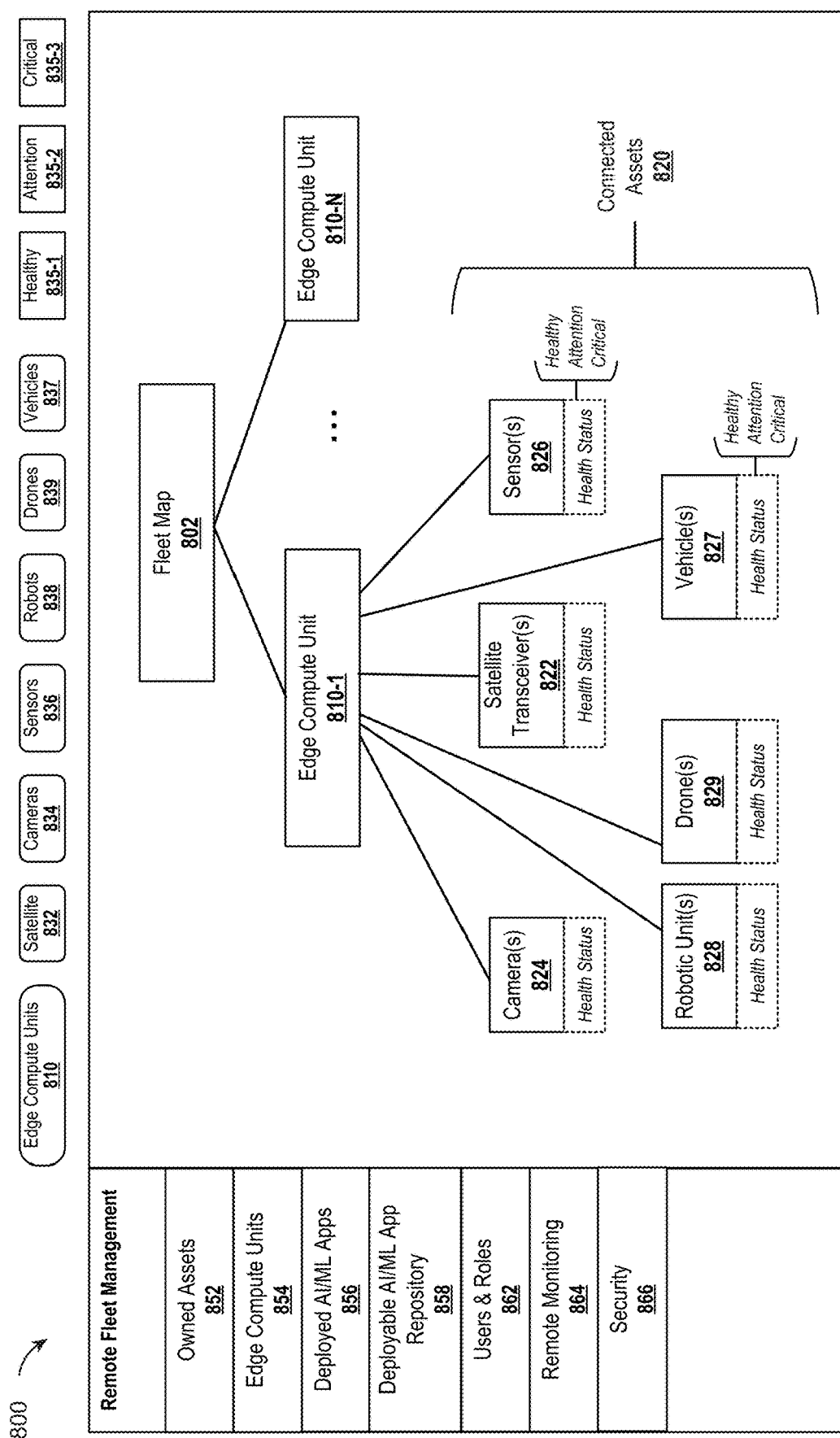
FIG. 8 is a diagram illustrating an example graphical user interface (GUI) of a global management console associated with asset management and telemetry observation for a fleet of edge compute units of an edge computing system for ML and/or AI workloads, in accordance with some examples.
Figure 9:
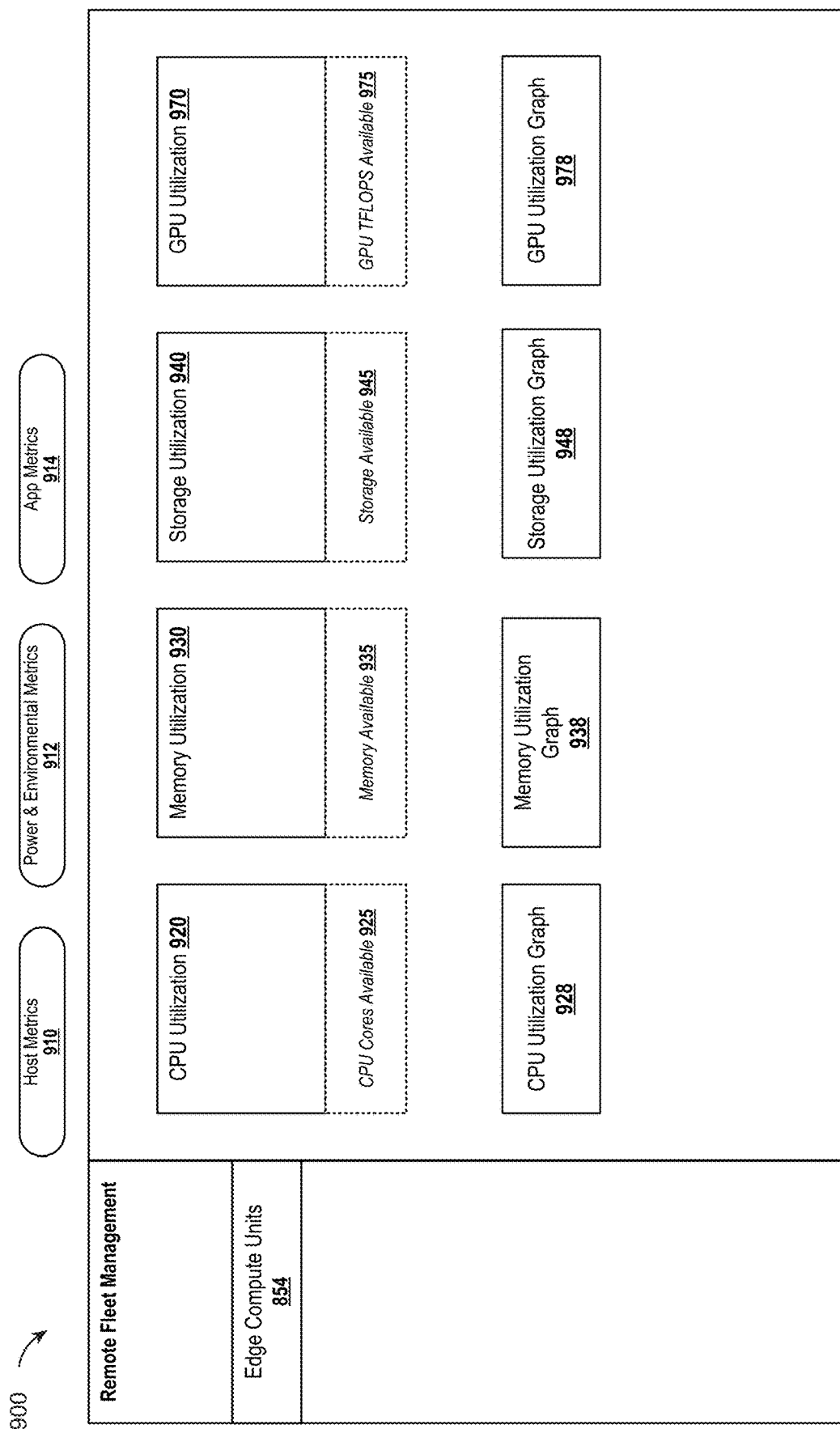
FIG. 9 is a diagram illustrating another example GUI of a global management console associated with asset management and telemetry observation for a fleet of edge compute units of an edge computing system for ML and/or AI workloads, in accordance with some examples.

Following is a discussion of FIGS. 8 and 9, which provide schematic or diagrammatic representations of an example management console and GUI thereof for an edge AI/ML monitoring and management platform. In some aspects, the management console GUI examples of FIG. 8 and/or FIG. 9 can be used to implement the fleet maps and/or fleet and asset management described herein. In one illustrative example, the presently disclosed fleet map and fleet map GUI can be implemented in a manner the same as or similar to that of FIGS. 8 and 9.

The disclosure turns next to a discussion of various example fleet map GUIs and related or associated functionalities, features, implementations, etc., made with respect to the examples illustrated in FIGS. 10A-14. In some aspects, the example fleet map GUIs of FIGS. 10A-14 may be implemented by the same fleet map engine and/or the same fleet and asset management system implemented by the systems and techniques described herein, as will be described in greater depth below.

Example Artificial Intelligence (AI) and Machine Learning (ML) Workloads at the Edge Various AI and ML applications (also referred to as workloads, workflows, tasks, etc.) can benefit from edge computing or otherwise being implemented at the edge. Edge computing can play an important role in providing a wide range of AI and ML applications, including (but not limited to) for use cases that utilize real-time processing, high reliability, high availability, and minimal latency-all of which are features of edge computing and the edge compute units described herein. For example, edge-deployed AI and ML applications may make heavy use of one or more high-bandwidth sensors (e.g., such as high-speed and/or HD cameras, stereo cameras, lidar cameras and/or sensor systems, accelerometers and other inertial sensor packages, fiber optic sensor, radar, ultrasonic sensors, etc.). Additionally, multi-modal sensor packages may include multiple sensors operating over multiple different modalities and/or sensor domains. These multi-modal sensor packages can generate and/or stream data at rates that can exceed 50 Gbit/s (e.g., 22 TB/hr).

Sensor data streams, either high-bandwidth or otherwise, can be provided to one or more AI or ML models that are configured (e.g., trained) to process such sensor data for purposes such as real-time decision making and analytics (among various other purposes). For instance, ML and AI models that may be associated with ingesting and/or processing massive or high-bandwidth data streams can include, but are not limited to, deep neural networks (DNNs), convolutional neural networks (CNNs), region-based CNNs (R-CNNs), recurrent neural networks (RNNs), long short-term memory (LSTM) networks, vision transformers (ViTs), variational autoencoders (VAEs), generative adversarial networks (GANs), autoencoders, transformers, bidirectional encoder representations from transformers (BERT), stable diffusion, attention mechanisms, and/or large language models (LLMs), etc.

Processing high-bandwidth and other large data streams with an AI or ML model can require significant computational power, in some cases on the order of thousands of teraflops (TFLOPS). One teraflop represents one million million ($10^{12}$) floating-point operations per second. As both the size and complexity of ML and AI models has increased, so too has the ability to deploy increasing numbers of increasingly high bandwidth sensors/sensor packages to generate the input data for inference using the ML and AI models. As such, there is an increasing need for systems and techniques that can be used to deploy and/or implement high-performance compute nodes (e.g., for running inference using trained AI or ML models) near the sources of sensor and other input data. As the number of interconnected sensors and the corresponding volume of generated data continue to increase, the significance of edge computing becomes increasingly critical. For example, it is observed that edge computing may act as an enabler for the evolution of intelligent applications and services (e.g., AI and/or ML models and workloads) that can be used to autonomously and continually learn, predict, and adapt using massive streams of unstructured data. For instance, by 2025, it is projected that the global data volume will reach 175 zettabytes (175 billion TB), with approximately 80% of this data being in an unstructured form.

Unstructured data and datasets have historically been underutilized—for example, it is estimated that on the order of 90% of unstructured datasets currently remain unanalyzed and unused. It is additionally noted that many of these unstructured datasets do not strictly require storage in their raw form, which may lack meaningful information. Nevertheless, many unstructured datasets exist, and can be challenging to integrate with existing computational workflows and/or pipelines, which are largely structured and designed for processing at least partially structured data. For example, even if all of the unstructured datasets were to be transferred to the cloud, conventional and existing cloud-based infrastructure is primarily configured to process data in batches-resulting in considerable time delays between data creation and the generation of corresponding insights or decisions based on the data.

In one illustrative example, a typical offshore drilling platform produces a substantial amount of data, ranging from 2-4 TB per day. Of this 2-4 TB of raw data generated each day, approximately 80% may remain unused (e.g., 1.6-3.2 TB/day). Even a solitary oil rig operating remotely in a northern environment can generate over 1 TB of data per day, and in this example, with less than 1% of that data being utilized for analytical and/or decision-making purposes. The challenges of generated data volume can become exponentially more difficult with the remoteness of the operating environment. In particular, the difficulty of managing and utilizing large volumes of generated sensor data can increase non-linearly with the separation distance from existing data networks and other communication infrastructure for uploading/transmitting the generated sensor data.

For instance, sensor data generated in remote operating environments often cannot be transmitted over conventional fiber optic or other physical/wired internet communication links, based in large part on the lack of such infrastructure in or near the remote operating environment. Consequently, sensor data generated in remote operating environments often must be transmitted over much slower (and often more expensive) wireless communication links, such as cellular and/or satellite communication links. A satellite communication link with a 25 Mbps upload speed will take approximately 90 hours (approximately four straight days) to transmit 1 TB of data—meaning that the example oil rig generating 1 TB/day will quickly bottleneck any data upload from the oil rig to a data center. The challenge becomes more profound, and increasingly untenable, as the amount of generated data increases. For instance, a large-scale refinery can easily generate in excess of 10 TB of raw data each day.

One common type of unstructured data that may be generated on a daily (or other regular) basis is video data captured by cameras local to an operating site. Video data captured by cameras often falls into the category of unstructured data because such video data comprises raw visual information without a pre-defined structure or format. The increased use and availability of high-resolution cameras for tasks such as video-based monitoring, scene understanding, and/or navigation applications, etc., has led to a surge in unstructured video data generation. For instance, a 4K camera capturing 30 frames-per-second (fps) generates 5.4 TB of uncompressed video data within a single hour.

Similar increases in raw data generation can be seen in the context of autonomous vehicles (AVs) that are each equipped with multiple cameras and sensor packages (e.g., lidar, radar, ultrasonic sensors, IMUs/INSs, GPS, etc.). The data generation rate of a single AV can reach or exceed 50 Gbit/sec. In the AV use case, a significant portion of this 50 Gbit/sec raw data generation can necessitate local and real-time processing in order to enable low-latency decision making for the navigation and control of the AV as the AV moves through its environment. Notably, even a single IP camera can make an appreciable contribution to the overall sensor data firehose described above-streaming at rates ranging from 0.01-1.20 Mbit/sec, a single IP camera can generate anywhere between 5-500 MB of data per hour.

Sensors such as IP cameras are often deployed in large quantities, and consequently these deployments of seemingly low bandwidth contributors can have significant impacts when considered as a whole. Consider the example of a stadium that equips IP cameras as part of an extensive security or monitoring system, with a total deployment count of 900 IP cameras. In just a single hour, the 900 IP camera security system can generate half a terabyte (0.5 TB) of video data alone. In the security and monitoring scenario, the IP camera video data needs to be processed in substantially real-time for purposes such as event logistics, threat detection, safety monitoring, etc. While it is possible for various forms of unstructured data (e.g., such as the IP camera video data) to be indexed and stored for later retrieval, the common use cases for such unstructured data are often themselves the primary driver of the need for substantially real-time processing and analytical capabilities.

Table 1, below, summarizes various example scenarios/use cases for AI and ML applications in the context of edge computing. Also presented in Table 1 are example requirements for respective sensing, bandwidth, compute, and storage corresponding to each example use case (although it is noted that the information of Table 1 is provided for purposes of illustration and example, and is not intended to be construed as limiting):

TABLE 1

Example use case scenarios and corresponding compute requirements and parameters for various AI and ML applications at the edge.

| Industry | Sensors | BW | Compute (AI/ML) Applications | Storage |
|---|---|---|---|---|
| Energy (offshore oil) | Fiber optic, cameras, pressure, temperature, flow, ultrasonic | 0.2-0.4 Gbit/s | 40-300 TOPS (drilling prod., fault det., drilling analytics, GIS/map, rig perf., etc.) | 2-4 TB/day |
| Energy (oil refinery) | Fiber optic pressure and strain sensors, valve, IR cameras, thermal and electrochemical | 0.5-1 Gbit/s | 40-300 TOPS (pred. analytics, equip. performance & monitoring, oil quality grading, etc.) | 5-10 TB/day |

TABLE 1-continued

Example use case scenarios and corresponding compute requirements and parameters for various AI and ML applications at the edge.

| Industry | Sensors | BW | Compute (AI/ML) Applications | Storage |
|---|---|---|---|---|
| Logistics, Agri. (AVs) | 5-10 cam., 4-6 radar, 2-4 lidar, 10-18 ultrasonic, GPS, INS/IMU, odo. | 2-50 Gbit/s | 150-800 TOPS (nav., RT obstacle detection, path planning, loc. & mapping/SLAM, etc.) | 1-22 TB/hour |
| Media & Ent. (security, VR) | 500-1200 IP cams. (pano., fisheye, IR/night vision, motion detection) | 0.6-1.4 Gbit/s | 80-400 TOPS (obj. detection & tracking, activity recognition, event classification, crowd analyses, etc.) | 270-630 GB/hour |
| Manufacturing (automated warehouse, robotics) | Cams., stereo & depth sensors, F/T sensors, position/angle sensing, odometry | 0.5-2 Gbit/s | 50-200 TOPS per workcell/robot (obj. detection, barcodes, pick & place, sort, inspect, manipulate, palletization/depalletization, etc.) | 0.25-1 TB/hour |
| Retail & Supply Chain (logistics, last mi., fulfillment) | POS, cameras, RFID, WiFi positioning, IPS | 0.5-2 Gbit/s | 30-80 TOPS (RT customer analytics, personalization & recommendation, inventory mgmt., and replenishment, shrinkage, etc.) | 0.1-0.5 TB/hour |
| Sustainability | Energy monitors, infrared cameras, temperature and current sensors, flow meters | 0.1-1 Gbit/s | 10-40 TOPS (energy usage monitoring & mgmt., dist. power gen. & storage, automated controls, predictive maintenance, etc.) | 0.5 TB/day |
| Healthcare | Wearable ECG and BP monitors, glucometers, biosensors, fitness trackers, cameras | 0.1-1 Gbit/s | 20-50 TOPS (RT health mon., personalized care, predictive health analytics, privacy, and security of healthcare apps) | 0.5 TB/day |

Table 2, below, summarizes various edge ML/AI applications that can be deployed in the context of various example industries. It is again noted that the information of Table 2, as with Table 1, is provided for purposes of illustration and example, and is not intended to be construed as limiting:

TABLE 2

Example edge ML/AI applications that can be deployed in the context of various example industries and industry use-case impacts.

| Industry | Example ML/AI Edge Applications | Industry Use-Case Impact |
|---|---|---|
| Energy (offshore oil) | Real-time monitoring and anomaly detection; predictive and prescriptive analytics; assistive visual inspection; GIS/mapping of drilling environments. | Maintain and increase drilling productivity; uninterrupted drilling due to preemptive maintenance; reduce time to map and discover oil and gas sites; assistive and guided repair, inspection, and QA. |
| Energy (oil refinery) | Pred. & prescriptive analytics; chemical process mon.; oil quality grading; refinery equip. inspection; pressure, temperature, & flow monitoring. | Oil & chemical quality control; increase productivity & reduce downtime; optimize refinery processes & efficiencies, flow control; detect leaks & gas conc.; safety & proactive maintenance schedules. |
| Logistics, Ag. (rail trans.) | Vis. inspect & detect defects (rail, loco., wheel); yard mon. & mgmt.; sched. fueling & maint., container tracking. | Auto. yard & terminal mgmt.; pred. maint.; capacity utilization; safety & security interventions; min. safety risks; visibility, reliability/predictability of transportation. |
| Manufacturing (aviation sys.) | Aero. sim., struct. stab. & vib. analysis, FEA, accl. life-cycle testing, digital twin modeling, high-res. struct. inspection. | Reduce defects; min. scrap & rework rates; lower lead times, compliance & safety cert.; quicker sim. & testing cycles; improve aero. modeling & val. vs wind-tunnel. |
| Manufacturing (warehouse autom., robo.) | Pick & place; bin/sort; (de)palletize; inv. ctrl & qual. assurance; obj. detect & manipulation; pkg. scan & inspect | Increase throughput, inbound and outbound efficiencies; lower defect rates and sidelines; 24/7 lights-out operation, savings in labor and variable costs. |

TABLE 2-continued

Example edge ML/AI applications that can be deployed in the context of various example industries and industry use-case impacts.

| Industry | Example ML/AI Edge Applications | Industry Use-Case Impact |
| --- | --- | --- |
| Media & Ent. (security cam.) | RT obj. detection & recognition; activity recognition; crowd monitoring; event classification; bio. & facial recognition. | Safety risks & incidents; streamline flow & min. wait & crowd; autom. check-in & walk-in-out tech.; incident vis. & forensics; costs & ins. prem.; incident-resp. time. |

As contemplated herein, the disclosed systems and techniques can be used to provide fleet and asset management for edge computing of various ML and/or AI workloads, including one or more (or all) of the examples presented above in Table 1. More generally, it is contemplated that the systems and techniques described herein can be used to provide edge compute units and management thereof configured for low latency, high availability, real-time processing, and local operation (e.g., edge operation) with minimal dependence on remote, cloud, or on-premises infrastructure. Described below are additional details of example ML and AI workloads that can be implemented at the edge according to the presently disclosed systems and techniques for fleet and asset management for edge computing of ML and AI workloads.

Example 1: Object Detection and Recognition

Object detection and recognition tasks can be performed using various ML and/or AI models, architectures, etc. Common object detection and recognition tasks can include, but are not limited to, tasks such as identifying objects, people, or specific events in video streams. Object detection and recognition tasks often require (and/or benefit from) real-time or near-real-time response. By performing the processing of the underlying input data for the object detection and recognition task (e.g., video or camera data, etc.) at the edge, the processing is performed closer to the data-generating source (e.g., cameras or other sensors), and the latency of the task can be significantly reduced. Advantageously, reducing the latency of object detection and recognition tasks can be seen to enable faster decision-making, for instance allowing for immediate actions and/or alerts to be triggered based on detected objects (e.g., such as in security systems, AVs, and/or industrial robot use cases, etc.).

Object detection and recognition tasks are typically performed based on analyzing large amounts of data, such as video streams or high-resolution images (e.g., with a single IP camera capable of generating 500 GB/hour, or more, as described previously above). Transferring object detection and recognition tasks from the cloud or other central location (e.g., on-premises location) to the edge can reduce the latency associated with receiving the object detection and recognition output at the edge, and can additionally reduce the bandwidth utilized for uplink and downlink communications at the edge. For instance, the use of edge computing allows for local video and image analysis, reducing the amount of data that needs to be transmitted and stored to a location that is remote from the edge (e.g., cloud, on-premises location/data center, etc.), and thereby optimizing bandwidth usage while reducing network and storage costs. Edge computing for object detection and recognition tasks can also be seen to decrease the conventional dependency on stable and high-bandwidth internet connections, cloud service availability, and potential latency issues associated with cloud-based processing. Moreover, transferring object detection and recognition tasks to being implemented and managed at the edge can also be seen to provide a system with increased autonomy and resilience, making such an edge computing system suitable for detection and tracking applications that require continuous functionality and uninterrupted performance, especially in remote or offline settings.

In one illustrative example, consider an object detection and recognition task that is performed based on raw video data comprising surveillance footage captured by one or more drones. In this example, it is desirable for vehicles within the drone surveillance footage to be detected and classified by type in real-time. For instance, the vehicle classification types can include 'car,' 'truck,' 'van,' 'bus,' 'autorickshaw,' etc., among various others. Once detected or otherwise identified by an input, a selected vehicle can be tracked across multiple video surveillance frames. This capability of object detection, recognition, and tracking can be extended to include a plurality of additional surveillance cameras in a geographic region (e.g., neighborhood, etc.), where the additional surveillance cameras can also be drone-based and/or can be non-drone based. For instance, the object detection, recognition, and tracking capabilities can be extended to additional surveillance cameras in the same neighborhood as the drone-based surveillance camera, including surveillance cameras mounted on fixed placements, pan-tilt head cameras, and/or moving platform cameras, etc.

It is important to note that significant portions of the total surveillance camera footage captured by the system may lack meaningful or relevant information-many hours of video surveillance footage can include long periods of inactivity, empty scenes, uneventful situations, etc., and may be collectively referred to as "empty frames" or "non-actionable footage." In many examples, only a small percentage of the total captured surveillance video footage (e.g., from 1% to 20%) may contain events or activities that are relevant to the intended surveillance objectives. In general, the percentage of raw data from surveillance cameras that contains meaningful or actionable information relevant to the current surveillance task or objective can depend on various factors, which can include (but are not limited to) the specific surveillance system, the camera placement, the scene dynamics, the surveillance purpose, goal, or objective, etc. In some aspects, one or more AI or ML models or algorithms can be trained to detect and identify specific objects, events, and/or anomalies, etc., in an input comprising captured surveillance footage. The use of trained AI or ML models for such object detection, recognition, and tracking tasks can reduce the need for manual review of the vast amounts of raw surveillance footage, and can enable the surveillance system to focus on extracting meaningful information and alerting operators (and/or triggering appropriate remediation actions) when relevant events are detected to occur in real-time. Any stored footage may additionally be indexed for efficient querying and retrieval.

Some object detection applications or use cases (e.g., such as critical surveillance systems, smart cameras, etc.) can involve capturing sensitive or private data. In some aspects, performing the corresponding processing at the edge can be seen to minimize the need to transmit this sensitive or private data to an external or remote cloud server, thereby reducing privacy concerns while also enhancing data security. In some cases, privacy preservation and local handling of sensitive data can be of particular import in scenarios where strict data regulations and/or privacy requirements must be met (an increasing occurrence in various regulatory regimes around the world today).

Example 2: Sensor Integration and Scene Understanding

In some aspects, the use of edge computing (e.g., also referred to herein as "edge computation") can enable the integration of multiple sensors (e.g., such as cameras, lidar, radar, ultrasonic arrays, stereo rigs, range scanners, accelerometers, gyroscopes, and other IoT devices, etc.) in a distributed edge-computing environment. By using one or more edge compute units to process the respective data from these various sensors at the edge, it becomes possible to analyze and combine data from multimodal data sources in real-time. In some cases, sensor integration enabled by edge computing can be seen to enhance the overall understanding (e.g., analytical understanding and/or human understanding based on review of the analytical results) of the scene, for instance based at least in part on the use of the edge computation sensor integration to provide a more comprehensive and accurate view of the surrounding environment at the edge.

For example, cameras can be used to provide high-resolution shape, color, and texture information for object detection and recognition tasks applied to objects such as pedestrians, vehicles, and motorcyclists. While the resolution of a typical camera is considerably higher than that of conventional lidar sensors/systems, the typical camera has a limited field of view (FOV) and cannot precisely estimate the distance between the camera and one or more objects within the camera's FOV. Image data from a typical camera also cannot usually be used to perform depth estimation or otherwise calculate depth information corresponding to an object without being combined with image data of the same object, as captured by one or more additional cameras. More generally, depth estimation performed based on one or more cameras can often have a significantly lower precision than depth estimation performed using lidar (which is a remote sensing technique that uses light in the form of a pulsed laser to measure depth samples). In addition, a camera is relatively sensitive to light changes, ambient lighting, and scene reflectance, etc.—artifacts having a less prominent or negligible impact on lidar imaging of the same scene. However, lidar sensors and systems can have difficulty recognizing color and classifying objects in comparison to camera-based sensors and systems.

In one illustrative example, by using sensor integration, an edge compute unit (and/or other edge computing device(s) configured for operation with the presently disclosed systems and techniques for fleet and asset management for AI/ML edge computing) can acquire complementary information and/or sensor data streams corresponding to a surrounding environment. For example, the edge compute unit can use sensor data with different characteristics to obtain a more complete or comprehensive characterization of the surrounding environment. Multiple sensor data streams (obtained from multiple different sensors) can also be used to overcome limitations of individual sensors (e.g., such as the limitations described in the example above with respect to lidar and camera) and to reduce the uncertainty of individual sensors. Accordingly, use cases such as those relating to autonomous vehicles (AVs), robotics, and/or industrial automation, etc., may benefit from real-time sensor integration for safety and reliability. In some cases, real-time sensor integration can enable rapid scene understanding, object detection, and/or object tracking (among various other applications) to be implemented at the edge, while further enabling timely and appropriate actions to be taken based on the multimodal sensor inputs.

In one illustrative example, multimodal sensor inputs and/or sensor integration and scene understanding can be implemented based on receiving respective data streams from cameras (e.g., visual light cameras) and from lidar systems. For instance, respective data streams from one or more cameras and one or more lidars can be integrated on a locomotive and/or associated railway infrastructure, and used to monitor the railway or track ahead of the locomotive as it moves along the railway. In some examples, deep learning-based sensor integration models (e.g., such as PointNet, PTA-Det, etc.) can be deployed at the edge to combine raw point cloud data (e.g., derived from lidar data stream(s)) with image-based visual features (e.g., derived from image data). For instance, the one or more deep learning-based sensor integration models can be implemented and/or deployed using one or more of the edge compute units described herein. Additionally, the one or more edge compute units (and the deep learning-based sensor integration models implemented thereon) can be monitored and managed using the presently disclosed systems and techniques for fleet and asset management for ML/AI edge computing.

In some cases, the one or more deep learning-based sensor integration models deployed at the edge can be configured or used to combine the raw point cloud data with image-based visual features in order to detect specific objects that are relevant to train track safety (e.g., such as fallen trees, rocks, unauthorized personnel on the tracks in the scene, etc.). By analyzing the combined data streams locally (e.g., using one or more edge compute units), these relevant objects can be identified in substantially real-time, and can be used to trigger alerts and/or to initiate appropriate actions to ensure track clearance ahead of the locomotive. Monitoring the condition of the tracks in real-time (e.g., using an edge compute unit in the same geographic area as a section of tracks, and/or using an edge compute unit onboard the locomotive traversing the tracks, etc.) can enable immediate detection of any obstructions, debris, or hazards that may be present on the tracks.

Sensor integration can also be used to provide additional information about the track conditions, including, but not limited to, measurements of height, depth, curvature and/or any abnormalities that may affect train safety. The edge-based implementation of the deep learning-based sensor integration models (and any other ML or AI models) allows for immediate remediation action to be taken, such as alerting the train operator, signaling maintenance crews, and/or triggering automated safety measures, etc. In remote or rural areas with limited network connectivity, sensor integration at the edge enables real-time train-track monitoring and identification of clear tracks in the scene ahead of the locomotive, even in the absence of a stable internet connection. In such examples, local processing and real-time scene analysis (e.g., implemented using the edge compute unit(s)) can be used to ensure continuous monitoring and safety measures, regardless of (e.g., independent of) network availability (or lack thereof).

In some cases, given an emergency-braked deceleration of 1.5 m/s2 (0.15 g), the braking distance of a locomotive is approximately 260 meters at 100 km/h (60 mph) and 580 meters at 150 km/h (90 mph). Currently available ultra-long-range solid-state lidars can be configured with the capability to scan objects up to 600 meters away. These lidars provide a resolution of up to 700 lines at frame rates ranging from 1 to 30 fps, offering an angular resolution of 0.01° and a precision of ±2 cm. Such ultra-long range solid-state lidars may be frequently utilized in rail projects for accurate ranging and long-distance detection. With multiple lasers or channels (e.g., in some cases ranging from 8 to 32), these lidars can generate over 2 million data points per second, corresponding to a data generation rate of 32 Mbit/sec (equivalent to 14.4 GB/hr without compression). The 3D scans obtained from one or more lidars can be processed and combined with high-resolution images and odometry at the edge (e.g., using one or more edge compute units). This enables the prompt identification of potential obstacles, damage, or dangers on the train tracks. By leveraging edge computing, these lidar scans can be swiftly analyzed and utilized for enhanced safety measures, without ever leaving the edge location where the lidar sensor system is located and where the lidar scans were obtained/generated.

Example 3: Facial Recognition and Biometric Identification

In another illustrative example, performing facial recognition and biometric identification at the edge can be used to enhance privacy and security, of both the processing task itself and relating to the underlying or constituent data provided as input and used to perform the processing task. For instance, when an edge compute unit is used to implement a facial recognition or biometric identification task (e.g., performs inference using one or more facial recognition or biometric identification ML or AI models), the underlying input data will remain on the edge compute unit and its local network. Accordingly, the facial recognition or biometric identification task can be performed without any need to transmit sensitive biometric data to external servers or cloud platforms. This reduces the risk of data breaches and unauthorized access to personal information, ensuring better privacy protection for individuals. By performing processing locally at the edge, only relevant information, and in particular, only relevant output information (e.g., such as extracted features or identification results) needs to be transmitted off of the local edge compute unit and associated local network. The edge computation approach can be seen to reduce bandwidth consumption, alleviate network congestion, and save on data transmission costs. Moreover, edge processing enables facial recognition and biometric identification systems to operate even in scenarios with limited or intermittent network connectivity. The processing algorithms and models are deployed directly on the edge devices, allowing for offline operation without relying on constant cloud connectivity. This ensures continuous functionality and uninterrupted identification capabilities, which can be particularly beneficial in remote or offline environments. In some cases, commonly employed biometric identification methods include facial, fingerprint, iris, voice, palmprint, retina, vein, signature recognition; gait analysis; body thermal signature; and/or DNA biometrics—each of which may be implemented fully or in part on a local edge compute unit.

For example, consider a railway tunnel that is monitored using one or more forward looking infrared (FLIR) cameras or FLIR devices. In this example, a FLIR camera can capture thermal images (e.g., as still frames or as frames of video data) that can be processed locally at the edge in real-time for detecting people or other foreign/unauthorized objects in the railway tunnel. The use of edge computation/edge analysis can also enable quick identification (e.g., substantially real-time identification) of individuals based on the individual's respective thermal signature and gait pattern, thereby distinguishing authorized personnel from those who should not be near the tracks. For instance, a FLIR camera image captured at time $t_1$ may include a single individual, who is tagged and identified as authorized personnel. The authorized individual can be identified and recognized at different time instances (e.g., a plurality of time instances, including at the time instance $t_1$) from their gait and thermal signature patterns. By processing the FLIR data locally at the edge, identification results can be generated without relying on cloud infrastructure or distant processing centers that must first receive the FLIR camera images or other sensitive data transmitted over a public network. In some examples, the reduction in latency achieved by implementing FLIR data processing at the edge (e.g., using an edge compute unit) can ensure faster responses and decision-making based on the thermal information captured by the FLIR cameras. The reduction in latency and associated benefits may be particularly important in applications where timely identification is crucial, such as physical access control, security surveillance, safety, and/or border control, etc.

Example 4: 3D-Mapping and Localization 3D-mapping (also referred to as 3D-reconstruction or 3D-modeling), is a process of creating a three-dimensional representation of a real-world object, scene, or environment. 3D-mapping can be performed based on capturing and processing data from multiple sources (e.g., such as depth sensors, cameras (e.g., structure-from-motion or stereo, etc.), lidar, structured-light scanners, and/or point clouds, etc.) to generate a detailed and accurate textured model of the physical world in three dimensions. The resulting 3D map or model can be used for various applications, including autonomous navigation, virtual reality (VR), augmented reality (AR), mixed reality (MR), gaming, architectural visualization, simulation, cultural heritage preservation, and more. Autonomous navigation (e.g., implemented and/or performed by an autonomous vehicle (AV)) often uses a technique called Simultaneous Localization and Mapping (SLAM) that enables the autonomous vehicle or robot to build a map of an unknown environment while simultaneously determining its own position within that environment. SLAM involves the estimation of both the vehicle's pose (e.g., position and orientation) and the map of the environment as the vehicle moves through the surrounding environment and gathers corresponding sensor data of one or more types. In some aspects, SLAM can be augmented with partial 3D models, fiducials/markers, GPS, and/or Inertial Navigation System (INS) data. A goal of SLAM is to enable autonomous systems to navigate and operate in dynamic or cluttered environments without relying on detailed 3D models.

SLAM algorithms typically consume large amounts of sensor data that need to be processed and transmitted. By performing SLAM computations on one or more edge compute units managed by the presently disclosed systems and techniques for fleet and asset management for AI/ML edge computing, only relevant information-such as pose estimates of multiple autonomous vehicles (AVs) or textured-mesh 3D models-needs to be transmitted to other devices or central servers. The edge computing implementation for SLAM (among other 3D-mapping and localization techniques, algorithms, models, etc.) can reduce the amount of data transmitted over the network, conserves bandwidth, and lowers the communication costs associated with SLAM application. By eliminating the need to transmit raw sensor data, which may contain sensitive information about the environment, SLAM processing is localized to the edge, thereby enhancing privacy and security, while also reducing the risk of unauthorized access or data breaches.

For instance, consider an example scenario in which an autonomous tractor (e.g., a type of AV and/or a type of robotic device) maps its surrounding environment while localizing itself within the same 3D-mapped environment. In other words, the autonomous tractor can simultaneously generate a 3D-mapping of its surrounding environment while also localizing itself within the currently generated 3D-mapping of the surrounding environment. In some aspects, multiple tractors and/or AVs can safely operate and collaborate in the same environment while a respective relative pose estimate/information is estimated and tracked by a local edge compute unit of the presently disclosed management and monitoring platform for AI/ML edge computation.

In such examples, performing SLAM computations on the local edge compute units can significantly reduce the latency between sensor data acquisition, processing, and output generation. This low latency enables faster updates of the localization and mapping information, thereby improving the overall performance of SLAM. Moreover, AVs can operate autonomously even in environments with limited or intermittent network connectivity. As such, the local edge compute units of the presently disclosed management and monitoring platform for AI/ML edge computation can continue to perform SLAM computations and update the localization and mapping information locally, ensuring uninterrupted operation and providing reliable localization and mapping even when offline.

In scenarios where the AVs and edge compute units are networked and connected to cloud infrastructure, some (or all) of the edge compute units can be configured to collaborate with the cloud for enhanced SLAM capabilities. For instance, some (or all) of the local edge compute units can perform local SLAM processing to provide real-time updates to the AVs/SLAM process, while the cloud can perform additional computations that are less time-sensitive or in need of real-time implementation (e.g., such as wide-area mapping, global optimization, and/or semantic understanding of the environment, etc.). This collaborative approach balances real-time requirements with more computationally intensive tasks, leveraging the strengths of both edge and cloud processing. As will be described in greater depth below, this collaborative cloud-edge computational approach can be implemented, mediated, managed, and/or monitored using the presently disclosed systems and techniques for an AI/ML edge computation platform.

Example 5: Natural Language Analysis and Synthesis

Natural language analysis and synthesis have recently benefited from the use of transformer-based machine learning models (also referred to simply as "transformers"), based largely on the ability of transformers to adapt and extend across multiple tasks-such as (in the context of natural language) interpreting commands, text summarization, response generation, and/or intent analysis, etc. Transformer-based models tend to be large, complex, and computationally intensive to implement due to their deep architecture and a high number of parameters. This can pose challenges for small edge devices with limited computational resources and storage capacity. In one illustrative example, the edge compute units associated with the presently disclosed AI/ML edge computation platform can be configured to offer sufficient memory, compute, and storage for deploying one (or multiple) transformers at the edge. Moreover, the GPU compute capacity provided on the edge compute units can be used to make model size-reduction techniques (e.g., such as model compression, quantization, and/or knowledge distillation, etc.) feasible for implementation and use in an edge deployment. Efficient inference is crucial for real-time or near-real-time responses. Techniques like model pruning, quantization, or specialized hardware accelerators can additionally be employed on the edge compute units described herein in order to speed up inference without sacrificing performance.

In some aspects, transformer-based models, being self-contained, can operate offline without requiring constant network access-thereby making many transformer-based models suitable for use or implementation in industrial environments where continuous connectivity cannot be guaranteed. Pretrained models (e.g., pretrained transformer models) can be fine-tuned on edge-specific data, allowing for domain adaptation and improved performance on specific tasks. In this example, the edge-specific data can be domain and/or application-specific data (e.g., data that is collected by the sensors associated with the same edge compute unit, in the same environment and configured for the same task, as will be associated with the inference performed by the pretrained transformer model running on the edge compute unit).

In some aspects, this approach can be seen to reduce the training time and resource requirements for natural language applications. Once trained and finetuned, transformer-based models may need periodic updates or adaptations to maintain their performance over time. The presently disclosed edge compute units (and AI/ML edge computation management platform thereof) can facilitate localized model updates or fine-tuning using edge-specific data. This allows the models to adapt to changing conditions or requirements without relying heavily on external servers or cloud infrastructure. The edge compute units and presently disclosed AI/ML edge computation platform can additionally enable continuous training, online and incremental learning of these models deployed at the edge, thereby keeping them up-to-date on the most recent and relevant sensor data collected at the edge or elsewhere.

Another unique capability enabled by the systems and techniques described herein is collaborative or distributed inference for language models (e.g., AI or ML language models). In some aspects, transformer-based models can be partitioned across various high-performance compute nodes or servers (e.g., some or all of which may be implemented as edge compute units, at same or different/distributed geographic sites or locations). The distributed high-performance compute nodes or servers can be configured to collectively perform inference by sharing intermediate results or model parameters amongst one another. This approach reduces an individual server's computation and memory requirements while maintaining the benefits of transformer-based models and increasing resilience.

In some examples, transformer-based models trained on large-scale datasets may often raise privacy concerns when trained and deployed in the cloud. Self-contained edge compute units offer the ability to store and process sensitive data, personally identifiable information (PII), and/or protected health information (PHI) of customers on premises (e.g., at the edge/on an edge compute unit), thus minimizing the need to transmit such data to external servers. Such an approach enhances privacy and security by keeping the data-such as text, images, videos, electronic health records, clinical notes, financial records, confidential information-within the local network of the edge compute unit(s). Government agencies, healthcare and financial institutions can use their own edge compute unit infrastructure to train and finetune their transformer-based Large Language Models (LLMs) and/or other Foundation Models (FMs). Subsequently, the trained and finetuned LLMs and FMs can be hosted on premises (e.g., using one or more edge compute units managed and monitored by the presently disclosed ML/AI edge computation management platform) behind a firewall to safeguard the knowledge encoded within the models' parameters.

Connected Edge and Cloud Implementations for AI and ML Workloads

AI and/or ML-based applications pose a set of challenges that can be uniquely addressed by edge computing. For instance, many AI and ML applications (e.g., AI and ML models) are data intensive and may need to be continually retrained to account for data drift. For instance, such AI/ML applications can require (or otherwise benefit from) monitoring of model degradation, regular training with new data and model parameters, etc. Consider one illustrative example in which an energy company that operates hundreds of oil drilling rigs around the globe generates terabytes of data from sensors and cameras provided on each rig. These streams of data can be aggregated to train models for purposes such as detecting process anomalies, increasing safety and reliability of operations, automated decision making, improving system performance and throughput, and/or updating maintenance schedules, etc. As will be described in greater depth below with respect to FIG. 4, one illustrative example of a design pattern for deploying and maintaining these AI/ML models using the presently disclosed edge compute units and AI/ML edge computation management platform can be based on using the edge compute units to perform local data capture, ingestion, and processing using trained ML/AI models, while using an on-cloud implementation to perform training (including re-training and/or finetuning) of the ML/AI models that will be implemented locally by the edge compute units.

Figure 4:
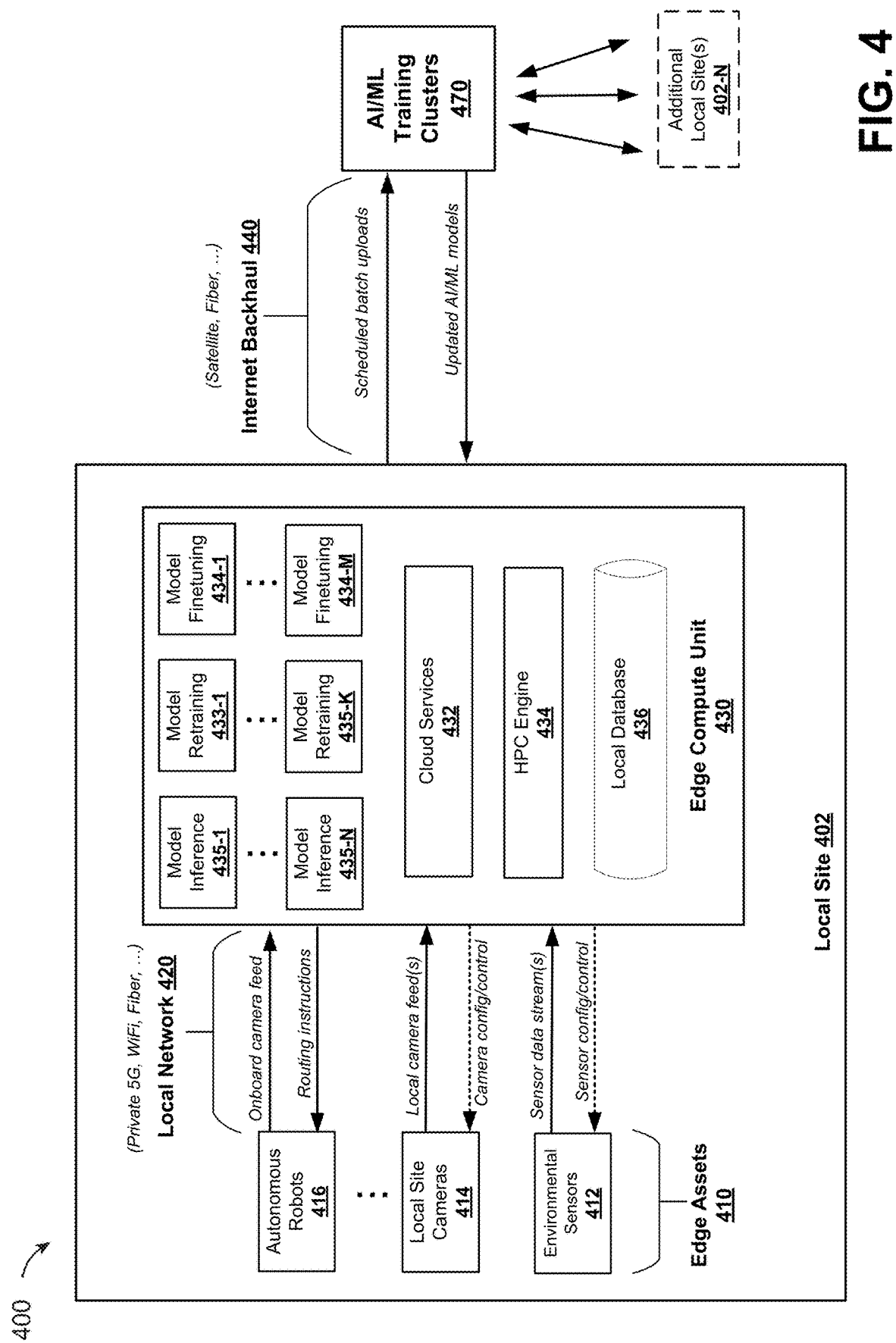
FIG. 4 is a diagram illustrating an example of an edge computing system for machine learning (ML) and/or artificial intelligence (AI) workloads, where the edge computing system includes one or more local sites each having one or more edge compute units, in accordance with some examples.

FIG. 4 is a diagram illustrating an example of an edge computing system 400 for machine learning (ML) and/or artificial intelligence (AI) workloads, where the edge computing system includes one or more local sites each having one or more edge compute units, in accordance with some examples. For example, a local site 402 can be one of a plurality of local sites associated with the edge computing system 400 and/or the presently disclosed AI/ML edge computation platform. For example, the plurality of local sites can include the local site 402 and some quantity N of additional local sites 402-N, each of which may be the same as or similar to the local site 402 described below with respect to FIG. 4. The local site 402 can be a geographic location associated with an enterprise or other use of the presently disclosed AI/ML edge computation platform. The local site 402 can also be an edge location in terms of data network connectivity (i.e., local site 402 is both a local geographic location of an enterprise user and is an edge location in the corresponding data network topography).

In the example of FIG. 4, the local site 402 includes one or more edge compute units 430. Each edge compute unit 430 can be configured as a containerized edge compute unit or data center for implementing sensor data generation or ingestion and inference for one or more trained ML/AI models provided on the edge compute unit 430. For instance, edge compute unit 430 can include computational hardware components configured to perform inference for one or more trained AI/ML models. As illustrated, a first portion of the edge compute unit 430 hardware resources can be associated with or used to implement inference for a first AI/ML model 435-1, . . . , and an N-th AI/ML model 435-N. In other words, the edge compute unit 430 can be configured with compute hardware and compute capacity for implementing inference using a plurality of different AI/ML models. Inference for the plurality of AI/ML models can be performed simultaneously or in parallel for multiple ones of the N AI/ML models 435-1, . . . 435-N. In some aspects, inference can be performed for a first subset of the N AI/ML models for a first portion of time, can be performed for a second subset of the N AI/ML models for a second portion of time, etc. The first and second subsets of the AI/ML models can be disjoint or overlapping.

In some embodiments, edge compute unit 430 can include computational hardware components that can be configured to perform training, retraining, finetuning, etc., for one or more trained AI/ML models. In some aspects, at least a portion of the computational hardware components of edge compute unit 430 used to implement the AI/ML model inference 435-1, . . . , 435-N can also be utilized to perform AI/ML model retraining 433-1, . . . , 433-K and/or to perform AI/ML model finetuning 434-1, . . . , 434-M. For example, computational hardware components (e.g., CPUs, GPUs, NPUs, hardware accelerators, etc.) included in the edge compute unit 430 may be configured to perform various combinations of model inference, model retraining, and/or model finetuning at the edge (e.g., at the local edge site 402). At least a portion of the K AI/ML models 433-1, . . . , 433-K associated with model retraining at the edge can be included in the N AI/ML models associated with model inference at the edge. Similarly, at least a portion of the M AI/ML models 434-1, . . . , 434-M associated with model finetuning at the edge can be included in the N AI/ML models associated with model inference at the edge.

In some embodiments, for a given pre-trained AI/ML model received at the edge compute unit 430 (e.g., received from the AI/ML training clusters 470 in the cloud), the edge compute unit 430 can be configured to perform one or more (or all) of model inference 435, model retraining 433, and/or model finetuning 434 at the edge. As illustrated in FIG. 4, retraining for a plurality of AI/ML models can be performed simultaneously or in parallel for multiple ones of the K AI/ML models 433-1, . . . , 435-K (which as noted above can be the same as or similar to the N AI/ML models 435-1, . . . , 435-N, or may be different; and/or can be the same as or similar to the M AI/ML models 434-1, . . . , 434-M, or may be different). In some aspects, retraining can be performed for a first subset of the K AI/ML models for a first portion of time, can be performed for a second subset of the K AI/ML models for a second portion of time, etc. The first and second subsets of the K AI/ML models can be disjoint or overlapping. Additionally, or alternatively, fine-tuning for a plurality of AI/ML models can be performed simultaneously or in parallel for multiple ones of the M AI/ML models 434-1, . . . , 434-M (which can be the same as, similar to, or disjoint from the N AI/ML models 435 and/or the K AI/ML models 433). In some aspects, finetuning can be performed for a first subset of the M AI/ML models for a first portion of time, can be performed for a second subset of the M AI/ML models for a second portion of time, etc. The first and second subsets of the M AI/ML models can be disjoint or overlapping.

Each edge compute unit 430 of the one or more edge compute units provided at each local site 402 of the plurality of local sites 402-N can additionally include cloud services 432, a high-performance compute (HPC) engine 434, and a local database 436. In some aspects, HPC engine 434 can be used to implement and/or manage inference associated with respective ones of the trained AI/ML models 435-1, . . . , 435-N provided on the edge compute unit 430. In one illustrative example, the edge compute unit 430 can receive the trained AI/ML models 435-1, . . . , 435-N from a centralized AI/ML training clusters engine 470. The AI/ML training clusters engine 470 can be used to perform training (e.g., pre-training) of AI/ML models that can later be deployed to the edge compute unit 430 for inference and/or other implementations at the edge. For instance, the AI/ML training clusters 470 can be implemented in the cloud, as a central data center or on-premises infrastructure for the local site(s) 420, etc. Data network connectivity between edge compute unit 430 and AI/ML training clusters 470 can be provided using one or more internet backhaul communication links 440. For instance, the internet backhaul 440 can be implemented as a fiber communication link (e.g., wired fiber optic connectivity from the local site 402/edge compute unit 430 to internet infrastructure that is connectable to the AI/ML training clusters 470; a direct or point-to-point wired fiber optic connectivity from the local site 402/edge compute unit 430 to the AI/ML training clusters 470; etc.).

The internet backhaul 440 may additionally, or alternatively, be implemented using one or more satellite communication links. For instance, internet backhaul 440 can be a wireless communication link between edge compute unit 430/local site 402 and a satellite of a satellite internet constellation (e.g., such as the satellite internet constellation depicted in FIG. 2 and/or FIG. 3, etc.). In some examples, internet backhaul link 440 can be the same as or similar to one or more of the satellite internet constellation links 214, 212, 216, of FIG. 2 (in which case the UE 230 of FIG. 2 can be the same as or similar to the edge compute unit 430 of FIG. 4 and network 210 of FIG. 2 can be the internet providing a connection to AI/ML training clusters 470 of FIG. 4).

In another illustrative example, the internet backhaul link 440 may be the same as or similar to one or more of the satellite internet constellation links 352, 362a, 362b, 364, 354, 374, 372, etc. of FIG. 3 and the satellite internet constellation 300. In such examples, the edge compute unit 430/local site 402 can be represented as being the same as or similar to the UE 330 of FIG. 3; the AI/ML training clusters 470 of FIG. 4 can be the same as or similar to the data center 340 of FIG. 3, connected to the UE 330 (e.g., edge compute unit 430) via the satellite internet constellation links (e.g., internet backhaul link 440). Continuing in the example above, where edge compute unit 430 of FIG. 4 is the same as or similar to UE 330 of FIG. 3, in some aspects, it is contemplated that the edge compute unit 430 can include (or otherwise be associated with) one or more satellite transceivers for implementing satellite connectivity to and/or from the edge compute unit 430. For instance, the edge compute unit 430 can be the same as or similar to UE 330 of FIG. 3, and may include, be communicatively coupled with, and/or otherwise associated with one or more of the satellite transceivers 312, 314, 316 of FIG. 3. In some aspects, the one or more satellite transceivers can be integrated in or coupled to a housing (e.g., container, where edge compute unit 430 is a containerized data center) of the edge compute unit 430 and used to provide satellite connectivity capable of implementing the internet backhaul link 440 of FIG. 4. In another example, the one or more satellite transceivers can additionally, or alternatively, be provided at the local site 402 where edge compute unit 430 is deployed.

In some aspects, the internet backhaul link 440 between edge compute unit 430 and AI/ML training clusters 470 can be used to provide uplink (e.g., from edge compute unit 430 to AI/ML training clusters 470) of scheduled batch uploads of information corresponding to one or more of the AI/ML models 435-1, . . . , 435-N implemented by the edge compute unit 430, corresponding to one or more features (intermediate or output) generated by the AI/ML models implemented by edge compute unit 430, and/or corresponding to one or more sensor data streams generated by edge assets 410 provided at local site 402 and associated with the edge compute unit 430, etc. The internet backhaul link 440 may additionally be used to provide downlink (e.g., from AI/ML training clusters 470 to edge compute unit 430) of updated, re-trained, fine-tuned, etc. AI/ML models. For instance, as will be described in greater depth below, the updated, re-trained, or fine-tuned AI/ML models transmitted over internet backhaul link 440 from AI/ML training clusters 470 to edge compute unit 430 can be updated, re-trained, or fine-tuned based on the scheduled batch upload data transmitted on the uplink from edge compute unit 430 to AI/ML training clusters 470. In some aspects, the updated AI/ML models transmitted from AI/ML training clusters 470 to edge compute unit 430 can be updated versions of the same AI/ML models 435-1, . . . , 435-N already implemented on the edge compute unit 430 (e.g., already stored in local database 436 for implementation on edge compute unit 430). In other examples, the updated AI/ML models transmitted from AI/ML training clusters 470 to edge compute unit 430 can include one or more new AI/ML models that are not currently (and/or were not previously) included in the set of AI/ML models 435-1, . . . , 435-N that are either implemented on edge compute unit 430 or stored in local database 436 for potential implementation on edge compute unit 430.

In some cases, the AI/ML distributed computation platform 400 can use the one or more edge compute units 430 provided at each local site 402 to perform local data capture and transmission. In particular, the locally captured data can be obtained from one or more local sensors and/or other edge assets 410 provided at the local site 402. For instance, in the example of FIG. 4, the local edge assets/sensors 402 can include, but are not limited to, one or more autonomous robots 416, one or more local site cameras 414, one or more environmental sensors 412, etc. The local sensors and edge assets 410 can communicate with the edge compute unit 430 via a local network 420 implemented at or for local site 402.

For instance, local network 420 can be used to provide one or more communication links between the edge compute unit 430 and respective ones of the edge assets 410. In one illustrative example, local network 420 can be implemented as a private LTE, 4G, 5G or other private cellular network; can be implemented as a public LTE, 4G, 5G or other public cellular network; can be implemented as a WiFi, Bluetooth, Zigbee; Z-wave; Long Range (LoRa), Sigfox, Narrowband-IoT (NB-IoT), LTE for Machines (LTE-M), IPV6 Thread, or other short-range wireless network; can be implemented as a local wired or fiber-optic network; etc. As illustrated in the example of FIG. 4, the edge compute unit 430 can receive different types of data from different ones of the edge assets/sensors 410 and can transmit different types of configurations/controls to different ones of the edge assets/sensors 410. For instance, the edge compute unit 430 can receive onboard camera feed and other sensor information (including SLAM sensor information) from the autonomous robots 416, and can transmit in response routing instructions to the autonomous robots 416. The routing instructions can be generated or otherwise determined based on processing the onboard camera feed data from the autonomous robots 416 using an appropriate one (or more) of the trained AI/ML models 435-1, . . . , 435-N implemented on the edge compute unit 430 and/or using the HPC engine 434 of the edge compute unit 430.

In another example, the edge compute unit 430 can receive local camera feed(s) information from the local site cameras 414 and can transmit in response camera configuration and/or control information to the local site cameras 414. In some cases, the edge compute unit 430 may receive the local camera feed(s) information from the local site cameras 414 and transmit nothing in response. For instance, the camera configuration and/or control information can be used to re-position or re-configure one or more image capture parameters of the local site cameras 414—if no re-positioning or image capture parameter reconfiguration is needed, the edge compute unit 430 may not transmit any camera configuration/control information in response. In some aspects, the camera configuration and/or control information can be generated or otherwise determined based on processing the local camera feed data from the local site cameras 414 using an appropriate one (or more) of the trained AI/ML models 435-1, . . . , 435-N implemented on the edge compute unit 430 and/or using the HPC engine 434 of the edge compute unit 430.

In another example, the edge compute unit 430 can receive environmental sensor data stream(s) information from the environmental sensors 412 and can transmit in response sensor configuration/control information to the environmental sensors 412. In some cases, the edge compute unit 430 may receive the sensor data streams information from the environmental sensors 412 and transmit nothing in response. For instance, the sensor configuration and/or control information can be used to adjust or re-configure one or more sensor data ingestion parameters of the environmental sensors 412—if no adjustment or re-configuration of the environmental sensors 412 is needed, the edge compute unit 430 may not transmit any sensor configuration/control information in response. In some aspects, the sensor configuration and/or control information can be generated or otherwise determined based on processing the local environmental sensor data streams from the environmental sensors 412 using an appropriate one (or more) of the trained AI/ML models 435-1, . . . , 435-N implemented on the edge compute unit 430 and/or using the HPC engine 434 of the edge compute unit 430.

In some examples, the systems and techniques described herein can be used to drive local storage, inference, prediction, and/or response, performed by an edge compute unit (e.g., edge compute unit 430) with minimal or no reliance on cloud communications or cloud offloading of the computational workload (e.g., to cloud or on-premises AI/ML training clusters 470). The edge compute unit 430 can additionally be used to locally perform tasks such as background/batch data cleaning, ETL, feature extraction, etc. The local edge compute unit 430 may perform inference and generate prediction or inference results locally, for instance using one or more of the trained (e.g., pre-trained) AI/ML models 435-1, . . . , 435-N received by edge compute unit 430 from AI/ML training clusters 470. The local edge compute unit 430 may perform further finetuning or instruction tuning of the pre-trained model to a specified task (e.g., corresponding to at least one of model finetuning 433-1, . . . , 433-M, as described previously above).

The prediction or inference results (and/or intermediate features, associated data, etc.) can be compressed and periodically uploaded by edge compute unit 430 to the cloud or other centralized location (e.g., an on-premises location or data center, such as AI/ML training clusters 470 etc.). In one illustrative example, the compressed prediction or inference results can be uploaded to the cloud via a satellite communication link, such as a communication link to a satellite internet constellation configured to provide wireless satellite connectivity between the edge compute unit and existing terrestrial internet infrastructure. For instance, the compressed prediction or inference results can be included in the scheduled batch uploads transmitted over internet backhaul link 440 from edge compute unit 430 to AI/ML training clusters 470. In some cases, the prediction or inference results can be utilized immediately at the edge compute unit 430, and may later be transmitted (in compressed form) to the cloud or centralized location (e.g., AI/ML training clusters 470). In some aspects, satellite connectivity can be used to provide periodic transmission or upload of compressed prediction or inference results, such as periodic transmission during high-bandwidth or low-cost availability hours of the satellite internet constellation. In some cases, some (or all) of the compressed prediction or inference results can be transmitted and/or re-transmitted using wired or wireless backhaul means where available, including fiber-optic connectivity for internet backhaul, etc.

Notably, the systems and techniques can implement the tasks and operations described above locally onboard one or more edge compute units 430, while offloading more computationally intensive and/or less time-sensitive tasks from the edge compute unit to the cloud AI/ML training clusters 470. For instance, the AI/ML training clusters 470 can be used to provide on-demand AI/ML model training and fine tuning, corresponding to the updated AI/ML models shown in FIG. 4 as being transmitted from AI/ML training clusters 470 to edge compute unit 430 via internet backhaul 440. In some aspects, the AI/ML training clusters 470 can implement thousands of GPUs or other high-performance compute hardware, capable of training or fine-tuning an AI/ML model using thousands of GPUs for extended periods of time (e.g., days, weeks, or longer, etc.). In some aspects, AI/ML training clusters 470 can additionally, or alternatively, be used to perform on-cloud model compression and optimization prior to transmitting data indicative of the trained AI/ML models 435-1, . . . , 435-N to the edge compute unit 430 for local implementation using the sensor data generated by the associated edge assets 410. In some embodiments, the edge compute unit 430 can be configured to perform a scheduled or periodic download of fresh (e.g., updated or new) AI/ML models from AI/ML training clusters 470 via the internet backhaul link 440 (e.g., the updated or new AI/ML models can be distributed from AI/ML training clusters 470 to edge compute unit 430 in a pull fashion). In other examples, the updated or new AI/ML models can be distributed from AI/ML training clusters 470 to edge compute unit 430 in a push fashion, wherein the AI/ML training clusters 470 transmit the updated or new models to the edge compute unit 430 via internet backhaul link 440 as soon as the updated or new AI/ML model becomes available at the AI/ML training clusters 470.

Training the AI/ML models 435-1, . . . , 435-N may require massive amounts of data and processing power, which can be more efficiently implemented at the AI/ML training clusters 470 (and shared across the plurality of local site 402-N edge compute units 430) rather than implementing individually at each of the local sites 402-N and corresponding edge compute unit(s) 430. In some aspects, the quality of an AI/ML model can be directly correlated with the size of the training and testing (e.g., validation) data used to perform the training. Furthermore, in many cases, training large AI/ML models requires running thousands of GPUs, ingesting hundreds of terabytes of data, and performing these processes over the course of several weeks. Accordingly, in many cases, large-scale ML/AI model training is suited best for cloud or on-premises infrastructure and sophisticated MLOps. For instance, the training dataset associated with training a large-scale AI/ML model can be on the order of hundreds of TB-tens of petabytes (PB), or even larger. Thousands of GPUs and hours to weeks of training time can be needed, with the resulting size of the uncompressed, trained model exceeding hundreds or thousands of GB.

ML or AI inference (e.g., inference using a trained ML or AI model), on the other hand, can be implemented using far fewer resources than training, and may performed efficiently at the edge (e.g., by edge compute unit(s) 430 associated with the local site(s) 402 or 402-N). Indeed, in many cases, edge inferencing will provide better latency than cloud inferencing, as input sensor data generated at the edge (e.g., using edge assets 410) does not need to transit over an internet backhaul link 440 to the cloud region (e.g., cloud region associated with AIU/ML training clusters 470) before inference can begin. Accordingly, it is contemplated herein that the trained AI/ML models 435-1, . . . , 435-N can be created and trained in the cloud (e.g., at AI/ML training clusters 470), and additionally can be optimized and compressed significantly, enabling the systems and techniques described herein to distribute the optimized, compressed, and trained AI/ML models 435-1, . . . , 435-N to the edge locations associated with local sites 402 and corresponding edge compute unit(s) 430 where the optimized, compressed, and trained AI/ML models will be implemented for inferencing at the edge using local sensor data from edge assets 410.

For instance, the edge compute unit 430 can use one or more of the trained AI/ML models 435-1, . . . , 435-N to perform edge inferencing based on input data comprising the locally/edge-generated sensor data streams obtained from the edge assets 410 provided at the same local site 402 as the edge compute unit 430. In some aspects, the input data set for edge inferencing performed by edge compute unit 430 can comprise the real-time data feed from edge assets/sensors 410, which can be between tens of Mbps to 10s of Gbps (or greater). The edge compute unit 430 can, in at least some embodiments, include 10s of GPUs for performing local inferencing using the trained AI/ML models 435-1, . . . , 435-N. By performing local inferencing at edge compute unit 430, an inference response time or latency on the order of milliseconds (ms) can be achieved, significantly outperforming the inference response time or latency achievable using cloud-based or on-premises remote inferencing solutions.

In some aspects, the systems and techniques can be configured to implement a continuous feedback loop between edge compute unit(s) 430 and the AI/ML training cluster(s) 470. For instance, the continuous feedback loop can be implemented based on using the edge compute unit(s) and associated edge assets/sensors 410 to capture data locally, perform inference locally, and respond (e.g., based on the inference) locally. The edge compute unit(s) 430 can be additionally used to compress and transmit features generated during inference from the source data and/or to compress and transmit inference results efficiently to the AI/ML training clusters 470 (among other cloud or on-premises locations). In the continuous feedback loop, training and fine-tuning can subsequently be performed in the cloud, for instance by AI/ML training clusters 470 and using the batch uploaded sensor data and/or features uploaded by the edge compute unit(s) 430 to AI/ML training clusters 470. Based on the training and fine-tuning performed in the cloud by the AI/ML training clusters 470, new or updated AI/ML models are distributed from the AI/ML training clusters 470 back to the edge (e.g., to the edge compute unit(s) 430 and local site(s) 402). This continuous feedback loop for training and fine-tuning of AI/ML models can be seen to optimize the usage of cloud, edge, and bandwidth resources. The same AI/ML model may be finetuned across multiple edge nodes to optimize the usage of available compute at the nodes and the cloud. For instance, an AI/ML model can be finetuned across a set of edge nodes comprising at least the edge compute unit 430 and one or more edge compute units included in the additional local sites 402-N. In some cases, the distributed finetuning of an AI/ML model across multiple edge nodes can be mediated, supervised, and/or controlled, etc., by the AI/ML training clusters engine 470 (e.g., or various other cloud entities). In some examples, the distributed finetuning of an AI/ML model across multiple edge nodes can be supervised and/or controlled, etc., by a selected one or more edge nodes of the set of edge nodes associated with the distributed finetuning of the model. In one illustrative example, distributed finetuning or retraining of an AI/ML model across multiple edge nodes can be orchestrated by a respective fleet management client 770 of FIG. 7 that is implemented at or by each of the multiple edge nodes.

Edge AI/ML Monitoring and Management Platform Software Stack and Services

Figure 5:
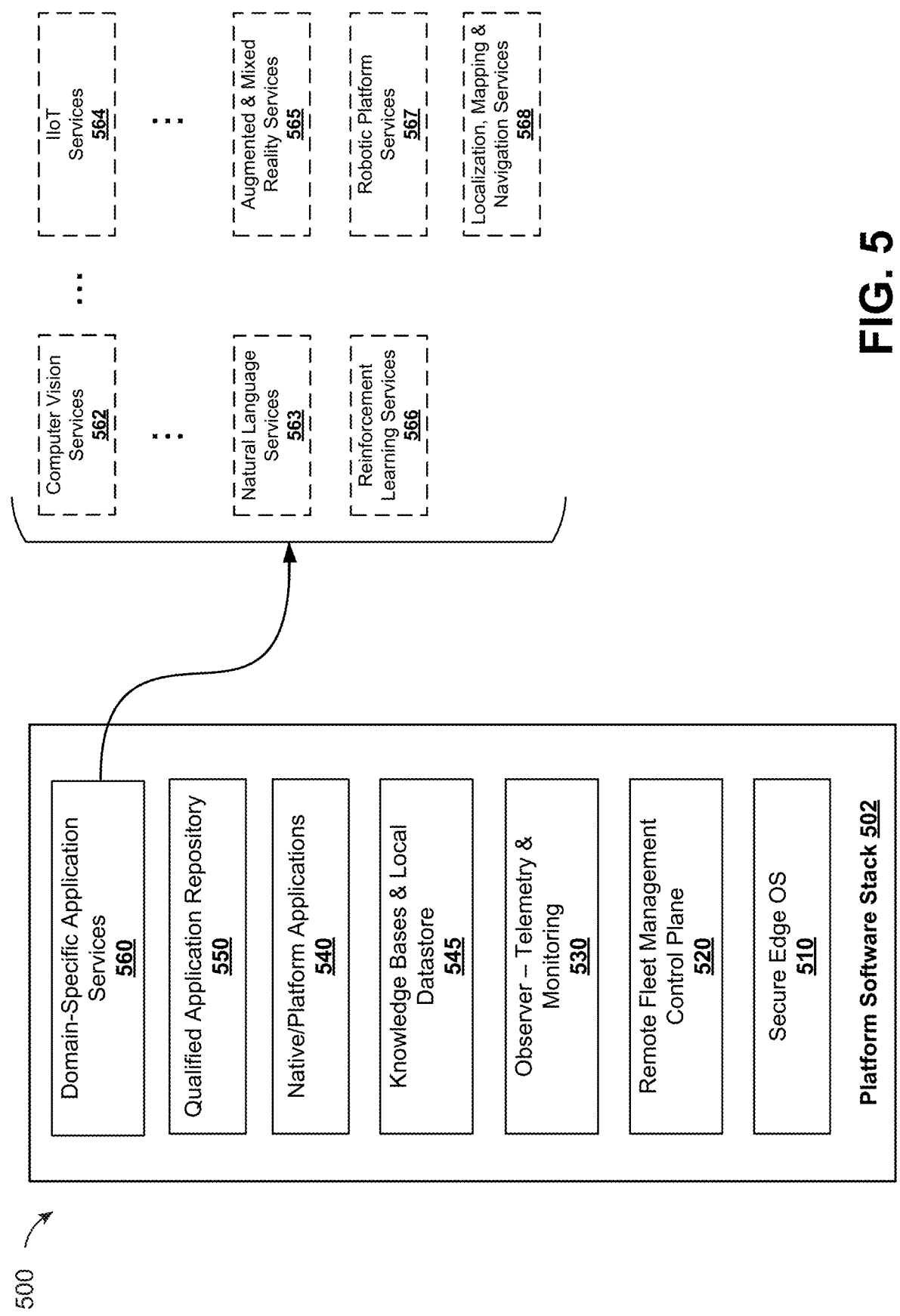
FIG. 5 is a diagram illustrating an example software stack associated with implementing an edge computing system for ML and/or AI workloads, in accordance with some examples.

FIG. 5 is a diagram illustrating an example software stack 500 associated with implementing an edge computing system for ML and/or AI workloads, in accordance with some examples. In particular, FIG. 5 depicts an example platform software stack 502 that can be used to provide single pane management of a fleet of deployed edge compute units, connected sensors and assets associated with an edge compute unit, and/or one or more AI/ML models that are pre-trained and deployed on an edge compute unit to process or otherwise analyze raw sensor data generated by the connected sensors and assets associated with the edge compute unit. As illustrated, the example platform software stack 502 can include domain-specific application services 560, such as the example computer vision services 562 and industrial internet of things (IIoT) services 564 that are depicted as specific examples of domain-specific application services. The example platform software stack 502 can additionally include a qualified application repository 550, which can be implemented as a repository of pre-trained and/or pre-configured AI and/or ML applications capable of running on the edge compute unit to perform specific tasks or computations using specific types of sensors and/or sensor data streams available to or otherwise associated with the edge computing device. In some aspects, the qualified application repository 550 can be implemented as an application marketplace for third-party AI and/or ML applications that can be deployed to the edge compute unit for providing particular or desired computational capabilities and workflows. In comparison to the domain-specific application services 560, it is contemplated that in at least some embodiments, the domain-specific application services 560 can be provided as first-party or platform-level AI and/or ML applications and associated services, while the qualified application repository 550 can be used to provide third-party or developer-level AI and/or ML applications and associated services for implementation on the edge compute unit.

In some aspects, the platform software stack 502 can further include native or platform applications 540. In some embodiments, the application repository 550 can be a cloud-based repository of qualified AI/ML applications for deployment on one or more edge compute units 430. For instance, the application repository 550 can be a cloud-based marketplace for the management of customer and platform ML/AI applications. In some cases, customer applications can be third-party/developer applications, and the platform applications may be the same as or similar to the native/platform applications 540 and/or the domain-specific application services 560.

The native/platform applications 540 can be differentiated from the domain-specific application services 560 on the basis that the native/platform applications 540 are provided in a manner the same as or similar to the third-party or developer level AI/ML applications 550, in that both the native/platform applications 540 and third-party AI/ML applications 550 can be configured to perform a specific sensor data processing or analysis task that may make use of or call one or more of the domain-specific application services 560. In other words, the domain-specific application services 560 can be implemented as modules, engines, APIs, etc., that are configured to perform specific tasks in a generic manner that is independent of the specific implementation or intended use case of one of the native/platform applications 540 or third-party/developer applications 560. For instance, FIG. 5 depicts the example domain-specific application services 560 in the form of computer vision services 562 and IIOT services 564. Various additional domain-specific application services 560 can be implemented or provided without departing from the scope of the present disclosure. For instance, the domain-specific application services 560 can include one or more of natural language services 563, reinforcement learning services 566, augmented and mixed reality services 565, robotic platform services 567, and/or localization, mapping, and navigation services 568, etc., among various other services. In one illustrative example, a domain-specific application service 560 (such as computer vision services 562) can be utilized by one or more native/platform applications 540 and can be utilized by one or more third-party/developer applications 550. For instance, the native/platform applications 540 can include a native/platform object recognition application that can be configured to perform object recognition of a specified object type or class within a specified or selected type of input data (e.g., human recognition in FLIR camera data). To implement the human recognition in FLIR data native/platform application 540, a corresponding native/platform application 540 can be provided that makes use of the computer vision services 562 to provide the recognition functionality. In other words, the native/platform application 540 can be built on top of or incorporating the computer vision services 562, with the native/platform application 540 performing tasks such as data ingestion, organization, pre-processing, etc., that are needed to convert the raw FLIR camera data into the expected or required input format for processing the FLIR camera data using the computer vision services 562.

A similar structure can be utilized for implementing the third-party/developer applications 550 to make use of the various domain-specific application services 560. In some aspects, a same or similar functionality can be provided by the third-party/developer applications 550 and the native/platform applications 540. In other examples, one or more functionalities and/or domain-specific application services 560 may be configured for use exclusively by one or more of the native/platform applications 540 (e.g., without the possibility of overlapping, same, or similar functionality by one of the third-party/developer applications 550). In some cases, the native/platform applications 540 can be implemented as Docker or Kubernetes Container environments that are deployable on or to the edge compute units. In some aspects, native/platform applications 540 may be made available and/or distributed using the same marketplace mechanism associated with distributing the third-party/developer applications (e.g., the qualified application repository 550 may, in some embodiments, include both first-party platform/native applications 540 and third-party/developer applications). In other examples, native/platform applications 540 may be pre-loaded or pre-configured on the edge compute unit(s) at the time of deployment, with only the third-party/developer applications 550 being configurable or loadable to the edge compute unit at a later time (e.g., via selection in the qualified application repository 550).

In some embodiments, the platform software stack 502 can additionally include one or more knowledge bases and/or local data storages 545, which may be associated with and utilized by one or more of the third-party AI/ML applications 550 and/or one or more of the native platform applications 540. For instance, some applications may require knowledge bases and databases 545 to be hosted locally for use by the applications. The knowledge bases and databases 545 can be used to store information corresponding to a particular task or analytical/data processing operation implemented by an application that uses the knowledge bases and databases 545. In some cases, the knowledge bases and databases 545 can be logically delineated or separated on the basis of the corresponding application(s) that make use of each of the knowledge bases and databases 545. In some cases, the knowledge bases and databases 545 can be combined for different applications. In some embodiments, the knowledge bases and databases 545 can be included in and/or otherwise associated with the local database 436 of FIG. 4. In some aspects, one or more of the knowledge bases and databases 545 can be implemented locally at the edge (e.g., at local edge site 402 of FIG. 4), can be implemented in the cloud (e.g., a cloud associated with AI/ML training clusters 470 of FIG. 4), and/or can be implemented as a combination of edge and cloud resources.

The knowledge bases and databases 545 may also be referred to herein as a "local datastore/knowledge base" and/or a "local datastore and knowledge base." In some aspects, the local datastore and knowledge base can include content and information obtained over a data network such as the internet. For instance, local datastore and knowledge base content and information can be populated, updated, delivered, etc., via the internet backhaul link 440 shown in FIG. 4 between the local edge site 402 and the cloud cluster(s) 470. In some embodiments, local datastore and knowledge base 545 can be served over a satellite internet constellation-based CDN (e.g., such as a satellite CDN described previously above with respect to FIG. 3). In some embodiments, local datastore and knowledge base(s) 545 can be implemented at the edge compute unit 430 of FIG. 4, as noted above. It is further noted that the local datastore and knowledge base(s) 545 can be implemented based on or corresponding to a respective edge compute unit service (e.g., a corresponding edge service for local datastore and knowledge base(s) 545 can be included in the edge compute unit services 605 of FIG. 6, described subsequently below).

In one illustrative example, the local datastore and knowledge base(s) 545 can include publicly available data network content (e.g., web content). Notably, the local datastore and knowledge base(s) 545 can further include domain or niche knowledge of processes, devices, assets, personnel, tasks, tools, activities, etc., that are pertinent to the local and global operations of a user (e.g., enterprise user) of the edge compute unit and associated platform system(s) of the present disclosure. In some aspects, this domain or niche knowledge represented within the local datastore and knowledge base(s) 545 can be broadly referred to as domain-specific information, task-specific information, operations-specific information, private, proprietary, or non-public information, etc. For instance, the local datastore and knowledge base(s) 545 can include domain or operations-specific data generated at the edge and ingested to one or more edge compute units 430 within the fleet of edge compute units of an enterprise user. This local domain or operation-specific edge-generated information may include, but is not limited to, information such as maintenance records, user reports, machine reports and logs, work summaries, activity reports, device/asset manuals, sensor specifications, etc.—some (or all) of which may be consumed at the edge by one or more AI/ML models. For instance, information and data from local datastore and knowledge base(s) 545 can be consumed at the edge during inference using one or more trained AI/ML models, during retraining of one or more pre-trained AI/ML models, and/or during finetuning of one or more pre-trained AI/ML models.

In some examples, the local datastore and knowledge base(s) 545 can include data that may be used for finetuning and/or instructing one or more AI/ML models for performing a specific task at the edge. For instance, the local datastore and knowledge base(s) 545 can include data for finetuning and/or instructing one or more of the AI/ML models 435-1, ..., 435-N of edge compute unit 430 of FIG. 4 for performing a specific inference task at the edge. Local datastore and knowledge base 545 data can be utilized for one or more of the model finetuning instances 434-1, ..., 434-M depicted for edge compute unit 430 in FIG. 4 and/or can be utilized for one or more of model retraining instances 433-1, ..., 433-K also depicted for edge compute unit 430 in FIG. 4.

In some aspects, the platform software stack 502 can further include a telemetry and monitoring engine 530 (also referred to herein as the "observer" or "observer engine"), a remote fleet management control plane 520, and a secure edge operating system (OS) 510. In some examples, one or more of the components of platform software stack 502 can be implemented in the cloud (e.g., remote from the edge, such as remote from the local site 402 and/or edge compute unit 430 of FIG. 4). Components of platform software stack 502 that are implemented in the cloud may be implemented with and/or collocated with the AI/ML training clusters 470 of FIG. 4, or may be separate from the AI/ML training clusters 470 of FIG. 4. In some cases, one or more of the components of platform software stack 502 can be implemented at the edge, for instance at local site 402 and/or on edge compute unit 430 of FIG. 4.

In one illustrative example, the domain-specific application services 560 can be implemented in the cloud, can be implemented at the edge, or can be implemented using a combination of cloud and edge deployments. For instance, domain-specific application services 560 may be provided locally on edge compute unit 430 of FIG. 4, particularly for instances where a given domain-specific application service 560 is used often by the edge compute unit 430 (e.g., is called or used by an application or AI/ML model running on the edge compute unit 430 of FIG. 4, such as a third-party/developer application from repository 550 and/or a native/platform application 540). In some examples, domain-specific application services 560 may be provided as cloud services that are reached from edge compute unit 430 via internet backhaul link 440. For instance, domain-specific application services 560 that are rarely or not yet used by edge compute unit 430 can remain as cloud services until a greater need emerges at some point in the future for the domain-specific application service 560 to be implemented locally at edge compute unit 430.

For instance, the process of installing a new AI/ML application or model to edge compute unit 430 (either in the form of a third-party application from repository 550 or in the form of a native/platform application 540) can include checking the application to be installed for dependencies on one or more domain-specific application services 560. A first portion of the dependencies for the to-be-installed application may already reside at the edge (e.g., may already be installed or available at edge compute unit 430) and no further action is needed. A second or remaining portion of the dependencies for the to-be-installed application may be new to the edge compute unit 430 of FIG. 4 (i.e., are not yet installed or available at the edge/at edge compute unit 430). In this case, installing a new AI/ML application to edge compute unit 430 can include obtaining and/or installing local edge copies or implementations of one or more domain-specific application services 560 that are needed or used by the to-be-installed application and were identified as not yet residing at the edge.

In some embodiments, the qualified application repository 550 (e.g., implemented as a marketplace of third-party AI/ML applications for edge compute unit 430) can reside in the cloud, with individual ones of the available AI/ML applications installed to edge compute units 430 based on an enterprise user selection of the AI/ML applications from the cloud-hosted qualified application repository 550. Similarly, native/platform applications 540 may reside in the cloud prior to installation on the edge compute unit 430. In some embodiments, some (or all) of the native/platform applications 540 can be pre-installed or pre-configured locally on the edge compute units, and may optionally be made also available in the cloud.

The observer engine 530 (e.g., telemetry and monitoring engine 530) can be implemented at the edge (e.g., on edge compute units 430) and/or can be implemented in the cloud. For instance, each edge compute unit 430 can run an instance of the observer engine 530 (or a portion thereof) locally, to capture telemetry and other critical environmental monitoring and observation data at the edge compute unit 430 and/or local site 402 associated with the edge compute unit 430. The telemetry and monitoring data from the local instance of observer engine 530 at each edge compute unit 430 can be transmitted to a corresponding observer engine instance 530 running in the cloud.

For example, the local observer engine 530 instance at edge compute unit 430 can upload host and satellite constellation level metrics to a global observer engine instance that is associated with the cloud-based remote fleet management control plane 520. The cloud-based remote fleet management control plane 520 can be used to provide a single pane of glass interface to the fleet of edge compute units 420 and local sites 402 (e.g., 402, . . . , 402-N), and can display the observer engine telemetry and monitoring data from various edge compute units 430 using a global management console (also referred to herein as a global management portal). For instance, the remote fleet management control plane 520 can include or provide one or more graphical user interfaces (GUIs) indicative of various telemetry and monitoring data obtained from the deployed edge compute units 430 and local sites 402 (e.g., such as the GUIs 800 and 900 of FIGS. 8 and 9, respectively, discussed in greater detail below).

The secure edge OS 510 can be installed on the edge compute units 430, and may be used to provide operating system functionality for implementing computation operations and other functionalities at the edge compute unit 430 itself. The secure edge OS 510 can additionally be used to provide an interface and communications between the edge compute unit 430 and the remaining portions of the platform software stack 502. For instance, the secure edge OS 510 can be configured to communicate with the cloud-based components of the platform software stack 502, including observer engine 530, remote fleet management control plane 520, domain-specific application services 560, qualified application repository 550, and/or platform applications 540.

Figure 6:
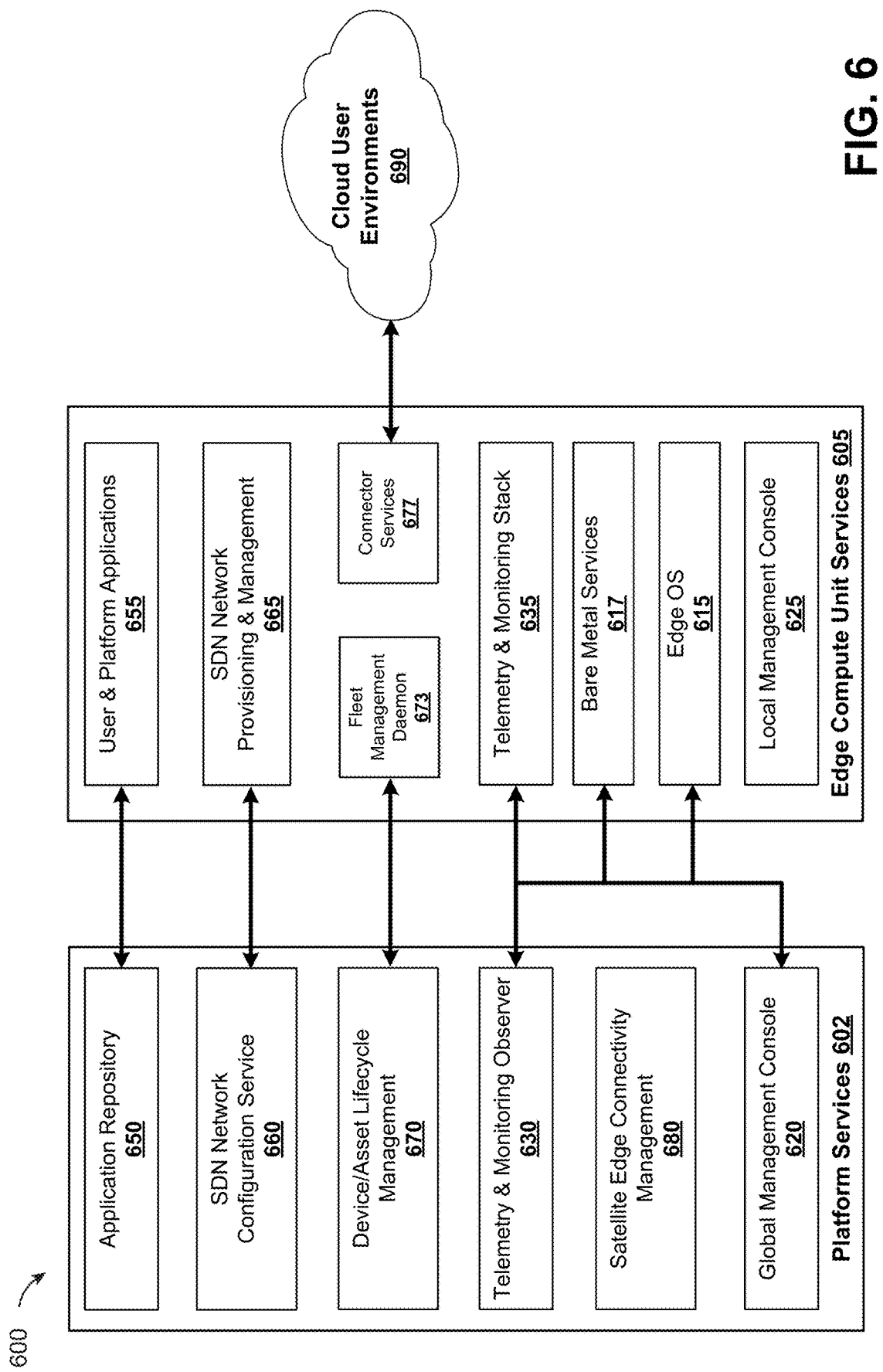
FIG. 6 is a diagram illustrating an example architecture for implementing global services and edge compute services of an edge computing system for ML and/or AI workloads, in accordance with some examples.

FIG. 6 is a diagram illustrating an example architecture 600 for implementing platform (e.g., global) services 602 and edge compute services 605 of an edge computing system for ML and/or AI workloads, in accordance with some examples. In some embodiments, the platform services 602 of FIG. 6 can be the same as or similar to the platform software stack 502 of FIG. 5. In some cases, the edge compute services 605 of FIG. 6 can be the same as or similar to one or more services implemented on or for the edge compute unit 430 of FIG. 4. For instance, then edge compute services 605 of FIG. 6 can be deployed to and/or utilized by an edge compute unit such as edge compute unit 430 of FIG. 4. In some aspects, the platform services 602 can include an application repository 650, which may be the same as or similar to the qualified application repository 550 of FIG. 5; a telemetry and monitoring observer engine 630, which may be the same as or similar to the telemetry and monitoring observer engine 530 of FIG. 5; and a global management console 620 that may be the same as or similar to the remote fleet management control plane 520 of FIG. 5. For instance, global management console 620 can be used to display one or more of the example GUIs 800 and 900 depicted in FIGS. 8 and 9, respectively. The platform services 602 can additionally include a Software-Defined Networking (SDN) network configuration service 660, a device/asset lifecycle management (DLM) engine 670, and a satellite edge connectivity management engine 680, each of which are described in turn below.

With respect to the edge compute unit services 605 of FIG. 6, as illustrated the edge compute unit services 605 can include user and platform applications 655, SDN network provisioning and management engine 665, a fleet management daemon 673, cloud connector services 677, a telemetry and monitoring stack 635, bare metal services 617, an edge OS 615, and a local management console 625. In some aspects, the user and platform applications 655 can be the same as or similar to (and/or can include) the trained AI/ML model inference instances 435-1, . . . , 435-N depicted in and described above with respect to the edge compute unit 430 of FIG. 4. The user and platform applications 655 of FIG. 6 can additionally be associated with one or more (or all) of the AI/ML model retraining instances 433-1, . . . , 435-K depicted within edge compute unit 430 of FIG. 4. In some aspects, the user and platform applications 655 of FIG. 6 can be additionally associated with one or more (or all) of the AI/ML mode finetuning instances 434-1, 434-M depicted within edge compute unit 430 of FIG. 4. In some cases, the SDN network provisioning and management engine 665 of the edge compute unit services 605 can correspond to the SDN network configuration service 660 of the platform services 602. In some embodiments, the fleet management daemon 673 can be associated with the cloud-based DLM engine 670 of the platform services 602. The edge-based telemetry and monitoring stack 635 can correspond to the cloud-based telemetry and monitoring observer engine 630 of the platform services 602. In some examples, the edge OS 615 can be the same as or similar to the secure edge OS 510 of FIG. 5.

In some embodiments, the edge compute unit services 605 can include one or more edge services associated with implementing, maintaining, updating, using, etc., local datastore and knowledge base information at and for an edge compute unit. For instance, the edge compute unit services 605 can include one or more edge services associated with implementing, maintaining, updating, using, etc., the local datastore and knowledge base(s) 545 depicted in FIG. 5 and described previously above. In some embodiments, one or more of the edge connector services 677 can be associated with implementing the local datastore and knowledge base(s) 545 of FIG. 5. In some aspects, one or more dedicated edge connector services (not shown) within the edge compute unit services 605 can be associated with implementing the local datastore and knowledge base(s) 545 of FIG. 5.

Global Management Console

In one illustrative example, the global management console 620 can provide users with single pane of glass access, insight, and/or management corresponding to each of the remaining modules of the platform services 602 and/or of the edge compute unit services 605. For instance, the global management console 620 can provide one or more GUIs corresponding to each of the platform services 602. For instance, the global management console 620 can be a cloud-hosted global management console configured to implement a comprehensive asset management portal.

In some embodiments, and as will be described in greater detail below, the global management console 620 can provide GUIs for monitoring, managing, configuring, interacting with, etc., one or more of: satellite internet constellation connectivity (e.g., based on information from the telemetry and monitoring observer engine 630 and/or satellite edge connectivity management engine 680 included in the platform services 602); host-level metrics (e.g., edge compute unit 430-level metrics) based on information from the telemetry and monitoring observer engine 630 included in the platform services 602 and/or the telemetry and monitoring stack 635 included in the edge compute unit services 605; support forms; management functions (e.g., pause/move satellite internet constellation connectivity service, change plans), login and administrative or user account management tasks; AI/ML marketplace and deployment functionality associated with cloud-based AI/ML application repository 650 and edge-deployed AI/ML user and platform applications 655; user management; notifications and alarms; etc.

As contemplated herein, the global management console 620 can provide a comprehensive and unified software solution designed to simplify and streamline the management of an enterprise customer's fleet of edge-deployed assets, including edge compute units 430 and/or other connected sensors and edge assets 410 deployed at a local edge site 402 in conjunction with one or more edge compute units 430. In one illustrative example, global management console 620 can be configured to provide a single intuitive interface with one or more GUIs corresponding to each of the platform services 602 and/or corresponding to one or more of the edge compute unit services 605. Using the global management console 620 and its corresponding GUIs, the systems and techniques described herein can be used to implement complete and superior remote visibility and control over all aspects of edge asset and edge compute device 430 operations.

For instance, the global management console 620 can be used to provide physical asset management with full oversight of the location, power, storage, data, and connectivity associated with a fleet of edge compute devices 430 and connected edge assets 410 of a local edge site 402. The physical asset management provided by global management console 620 can be used to achieve optimal resource allocation and performance at the edge. The platform services 602 can be used to monitor real-time energy consumption, data usage, utilized storage, and/or network connectivity (among various other parameters and data streams) to minimize downtime and maximize efficiency at the edge. For instance, FIG. 9 depicts an example GUI 900 that can be presented by the global management console 620 and used to monitor edge compute unit metrics (e.g., "Host Metrics") such as CPU utilization (current and historical), memory utilization (current and historical), storage utilization (current and historical), GPU or any high-performance compute (e.g., NPU, hardware accelerator, etc.) utilization (current and historical), as well as to provide visualizations of respective monitored edge compute unit metrics. In some cases, the global management console 620 and/or example monitoring GUI 900 can include GUI elements for setting, defining, and/or triggering alerts based on monitored parameters exceeding one or more thresholds or otherwise satisfying user or platform-specified rules and conditions (e.g., "Set Alert" in FIG. 9). In addition to the "Host Metrics" shown in the example GUI 900 of FIG. 9, the global management console 620 can provide physical asset management that includes visibility and insight into "Power and Environmental" telemetry and monitoring data, which may be obtained and monitored based on the cloud-based telemetry and monitoring observer 630 included in the platform services 602 and the edge-based telemetry and monitoring stack 635 included in the edge compute unit services 605 (both of which are described in greater detail below).

In some aspects, the global management console 620 can provide physical asset management that includes visibility and insight into "App Metrics," as depicted in the example monitoring GUI 900 of FIG. 9. The "App Metrics" can correspond to monitoring information for AI/MK workloads implemented at the edge, such as on an edge compute device 430. For instance, the "App Metrics" may correspond to one or more (or all) of the AI/ML inference workloads 435-1, . . . , 435-N depicted running on the edge compute unit 430 of FIG. 4. In some aspects, the global management console 620 can be used to provide application management for deployed AI/ML applications running on the edge compute unit 430. For instance, global management console 620 can provide application management for the deployed user and platform AI/ML applications 655 included in the edge compute unit services 605 running on edge compute unit 430. In some aspects, global management console 620 can provide application management for deployed AI/ML applications to simplify the deployment and management of the AI/ML applications with asset-aware resource provisioning. In such examples, enterprise users of the global management console 620 can easily deploy, update, and remove AI/ML applications on multiple assets (e.g., multiple edge compute units 430) at once. In some embodiments, application management via global management console 620 can be combined with or implemented in conjunction with the cloud-based application repository 650 that is used to install and manage some (or all) of the user and platform AI/ML applications 655 on the edge compute unit 430.

In some embodiments, the global management console 620 can be used to provide workload management for the deployed AI/ML applications running on the edge compute unit 430. For instance, global management console 620 can provide workload management for some (or all) of the deployed user and platform AI/ML applications 655 of FIG. 6, for some (or all) of the deployed AI/ML model inference instances 435-1, . . . , 435-N running on the edge compute unit 430 of FIG. 4, etc. In some cases, workload management can be implemented based on using the global management console 620 to manage AI/ML workloads deployed to one or more edge assets of an enterprise user (e.g., deployed to one or more edge compute units 430/local sites 402 of the enterprise user).

Workload management for AI/ML workloads can include, but is not limited to, automatic resource provisioning, sensor suite selection, job assignment, job cancellation features, etc. In some aspects, enterprise users of the global management console 620/platform services 602 can see which assets (e.g., edge compute units 430, or assets/compute components thereof) are currently available and capable of performing an AI/ML workload either now or at a scheduled time in the future. In some embodiments, workload management for AI/ML workloads on an edge compute device 430 can include scheduling the AI/ML workload for a future time when bandwidth, data, computation, and/or energy is projected or estimated to be more available, is projected or estimated to be cheaper, etc.

In still further example, the global management console 620 can be used to provide security and access control to enterprise users' local sites 402 and/or to the edge compute units 430 and/or connected edge assets 410 deployed to the respective local sites 402. For instance, the enterprise users may utilize global management console 620 to manage the physical, network, and software security associated with their edge assets, including (but not limited to), actions such as user creation, access permission configuration, and credential management, etc. The global management console 620 and security and access control features can be utilized to ensure that only authorized personnel of the enterprise user can access sensitive data and resources, while maintaining full audit trails at the edge compute units 430 and local sites 402 (as well as cloud user environments 690) for compliance purposes.

Local Management Console

In some cases, the local management console 625 can be an offline or offline-capable, local edge version or implementation of the global management console 620 of platform services 602. In some cases, the local management console 625 can be similar to an offline and/or local edge implementation of the remote fleet management control plane 520 of FIG. 5. For instance, the local management console 625 can be the same as or similar to the global management console 520, 620, with the constraint that the local management console 625 operates without reliance on connection to a remote network, data center, cloud, on-premises infrastructure, etc. For instance, in the context of the example of FIG. 4, the local management console 625 may operate within local site 402, using the available local network(s) 420 to communicate with and between edge compute unit 430 and the various edge assets 410, and without using communications over internet backhaul link 440 or to/from any cloud or on-premises data center locations.

For instance, the local management console 625 can be used to implement a customer local portal at the edge compute unit 430 and/or local site 402 depicted in FIG. 4. The local management console 625 can be an out of band management portal that acts as a local management portal in case of lost connectivity to the (cloud-based) global management console/portal 620. For instance, if the internet backhaul link 440 of FIG. 4 goes down or becomes unavailable, local management can still be performed for the edge compute unit 430 and connected local edge assets 410 using the local management console 625, which does not depend on cloud connectivity or the internet backhaul link 440 to operate. In some aspects, the local management console 625 can be included or implemented in the control plane of the edge compute unit 430/edge compute unit services 605. In some embodiments, the local management console 625 can provide a read-only view into HCl and satellite internet connectivity/constellation metrics that can be determined locally at the edge compute unit 430.

Application Repository Marketplace

In some examples, global management console 620 can provide a first GUI corresponding to application repository 650, which can be used to view available AI/ML applications that can be deployed to an edge compute unit (e.g., an edge compute unit 430 of FIG. 4 and/or other edge compute unit corresponding to the edge compute unit services 605 of FIG. 6). In some cases, the first GUI corresponding to application repository 650 can display a listing of only third-party/developer AI/ML applications. In some examples, the application repository 650 GUI presented by global management console 620 can display a listing of only first-party native/platform AI/ML applications, such as the native/platform applications 540 of FIG. 5. In some cases, the application repository 650 GUI can display a listing of one or more (or all) of the domain-specific application services 560 of FIG. 5, although in some cases the domain-specific application services 560 may be hidden or not listed in the application repository 650 GUI. In some aspects, the application repository 650 GUI can display a listing that combines one or more of the third-party/developer AI/ML applications, first-party native/platform AI/ML applications, and/or the domain-specific application services.

As illustrated in FIG. 6, the application repository 650 of platform services 602 can correspond to the user and platform applications 655 of the edge compute unit services 605. For instance, the user and platform applications 655 can comprise a selection or a subset of the complete listing of applications available in application repository 650, where the selection or subset of the AI/ML applications represents those AI/ML applications that an enterprise user has selected for installation or deployment on the edge compute unit 430. Installing or deploying an AI/ML application on the edge compute unit 430 can be based on including the AI/ML application in the user and platform applications 655 of the edge compute unit services 605. Installing or deploying an AI/ML application on the edge compute unit 430 may additionally include configuring or providing on the edge compute unit 430 (or at local edge site 402) one or more corresponding sensors, devices, and/or robotic assets, etc., associated with, used by, or required for the particular AI/ML application.

In some aspects, the edge compute unit services 605 can be connected to various sensors, external devices (e.g., displays, handhelds, personal devices, etc.), robotic assets, etc., that are provided or deployed at the edge (e.g., deployed in association with one or more edge compute units 430). For example, one or more edge services of the edge compute unit services 605 can be used to configure and manage connectivity to the sensors, external devices, robotic assets, etc., at the edge. In some examples, one or more edge services of the edge compute unit services 605 can be used to configure and manage the local network 420 connectivity shown in FIG. 4 between the edge compute unit 430 and the autonomous robotic assets 416, local site cameras 414, environmental sensors 412, etc. More generally, in some examples, the one or more edge services of the edge compute unit services 605 can be used to configure and manage connectivity to the edge assets 410 across one or more local edge sites 402 (e.g., including additional local site(s) 402-N) and/or across one or more edge compute units 430.

In some embodiments, the AI/ML applications that can be deployed on a given edge compute unit 430 can depend at least in part on the available compute, storage, and local connectivity capabilities or options at the edge compute unit. For instance, AI/ML applications can be associated with corresponding minimum required computational hardware or capabilities, minimum required storage capacity or availability, minimum required local data I/O or read/write speed, minimum required memory capacity, minimum required local connectivity, etc. In some embodiments, the application repository 650 can be indicative of minimum requirements or required edge configurations for implementing a particular AI/ML application that is made available via the application repository 650. In some aspects, the requirements or configurations for implementing a particular AI/ML application can apply to both the available hardware of the edge compute unit 430 as well as the available edge assets 410 for the edge compute unit 430. For instance, some AI/ML applications deployable from application repository 650 may require certain configurations or quantities of various types of sensors, external devices, and/or robotic assets, etc., among various other examples of connected or connectable edge assets 410. In some examples, an AI/ML application that can be deployed on edge compute unit 430 (e.g., that meets or exceeds corresponding minimum requirements or capabilities for the given AI/ML application) can be referred to as an AI/ML application qualified for deployment on the edge compute unit.

In one illustrative example, an AI/ML SLAM (simultaneous localization and mapping) application may be unable to be deployed to an edge compute unit (e.g., unable to be deployed into the user and platform applications 655) unless the edge compute unit has both the requisite local network (e.g., WiFi, 4G, 5G, etc.) connectivity and bandwidth and the appropriate camera hardware (e.g., at the necessary resolution, frame rate, field-of-view, lighting, etc.) connected to the edge compute unit over the local network. In another illustrative example, one or more (or all) of the respective AI/ML applications included in the plurality of AI/ML applications of the application repository 650 can include corresponding requirements or configurations associated with input data for the respective AI/ML application. For instance, the corresponding requirement(s) or configuration(s) information for deploying an AI/ML application from the application repository 650 to an edge compute unit 430 can be indicative of one or more types of input data required to run the AI/ML application. In some embodiments, the input data requirement(s) can be indicative of a data type(s) required by the AI/ML application, optionally or preferably used by the AI/ML application, etc. The input data requirement(s) may additionally, or alternatively, be indicative of data types that are not supported or used by the AI/ML application, etc. In one illustrative example, the different data type requirements or configurations for an AI/ML application of application repository 650 can correspond to one or more of a structured data type(s), semi-structured data type(s), and/or unstructured data type(s), etc. In some embodiments, different data type requirements or configurations for an AI/ML application of application repository 650 can correspond to one or more of a machine-generated data type(s), sensor-generated data type(s), user-generated data type(s), etc. The input data requirement(s) and/or configuration(s) can be included in a connected edge asset requirement of an AI/ML application deployable from application repository 650, and/or can be included in an edge compute device requirement of an AI/ML application deployable from application repository 650.

In one illustrative example, the platform applications represented in the software stack (e.g., included in the user and platform applications 655 deployed at the edge, included in the application repository 650 in the cloud, etc.) can be used to enable enterprise user's AI/ML workloads to be run on the edge compute units 430. For instance, the platform AI/ML applications can be based on a core orchestration layer of platform services 602/edge compute unit services 605 to account for redundancy and resiliency. In some embodiments, the platform AI/ML applications can utilize or be based on open-source distributed computing platforms for data processing, storage, and movement (e.g., Spark, MinIO, Kafka, etc.). In some aspects, the platform AI/ML applications can be fully managed applications, for instance in terms of tuning, updates, addressing of critical vulnerabilities, etc.

In some embodiments, the application repository 650 can include first-party/platform AI/ML applications and can include third-party/developer AI/ML applications. In some examples, first-party/platform AI/ML applications can be configured as a core suite of AI and ML applications, models, networks, etc., that are trained and selected to solve or otherwise address various unsolved and/or underserved enterprise user use cases in the edge computing space. In one illustrative example, the first-party/platform AI/ML applications can be deployed and managed through a cloud-based application marketplace (e.g., application repository 650). The first-party/platform AI/ML applications can be tuned and right-sized (e.g., scaled up or down, compressed, optimized, etc.) for the various hardware configurations available for the edge compute units 430, and can be designed or purpose-built to maximize resource utilize at the edge and when deployed on the edge compute units 430. For instance, the edge compute unit 430 can be associated with a plurality of pre-configured compute hardware options. Some (or all) of the first-party/platform AI/ML applications can be provided to the cloud-based application repository in a form or version optimally corresponding to various ones of the plurality of pre-configured compute hardware options available for implementing the edge compute unit. For instance, a first compute hardware configuration of the edge compute unit 430 may be more powerful (e.g., more GPUs, more powerful GPUs, more RAM, etc.) than a second compute hardware configuration of the edge compute unit 430 (e.g., fewer GPUs, less powerful GPUs, fewer available GPU cores, lower GPU data transfer speed, less RAM, etc.). Some (or all) of the pre-trained and pre-tuned first-party/platform AI/ML applications can have at least a first version optimized to run on the first compute hardware configuration of the edge compute unit 430 and a second (smaller and more lightweight) version optimized to run on the second compute hardware configuration of the edge compute unit 430, etc.

In some cases, application repository 650 can be implemented as a cloud-based marketplace for the management of customer and platform AI/ML applications (e.g., including the deployed user and platform applications 655 provided in the edge compute unit services 605). For instance, the application repository 650 (e.g., AI/ML application marketplace) can be used to provide fully managed applications that are subjected to a qualification and certification process prior to being on-boarded to the cloud-based application repository/marketplace 650 for deployment to various enterprise user local edge sites 402 and corresponding edge compute units 430. In some cases, the qualification and certification process for onboarding a third-party/developer ML/AI application to the marketplace can be performed to determine runtime fidelity and viability of the third-party ML/AI application for deployment on the edge compute units 430. In some embodiments, the application repository/marketplace 650 can be configured to provide one-click deployment and observability for the application lifecycle (e.g., from the cloud to the edge compute unit 430, and vice versa), obviating or reducing the need for cost and time intensive application and platform management as would conventionally be required.

In one illustrative example, application repository 650 can be used to deploy workloads into HCI through the global management console 620 (e.g., a corresponding GUI of the global management console 620 for the application repository/marketplace 650). For instance, one or more AI/ML applications can be selected from the application repository 650 (e.g., selected from a plurality of ML or AI applications included in the application repository 650) for installation or deployment onto one or more edge compute units 430, where the selection is made using global management console 620 and/or a GUI thereof. For instance, one or more AI/ML applications can be obtained from the application repository 650 and deployed to one or more edge compute units based on receiving a request indicative of the AI/ML applications that are to be deployed. The request can be received using global management console 620 and/or a GUI thereof. The request can be indicative of a selection of one or more ML applications qualified for deployment on a particular edge compute unit(s) (e.g., one or more ML applications having minimum requirements that are met or exceeded by the particular edge compute unit corresponding to the request).

In some embodiments, the request indicative of the selection of the one or more qualified ML or AI applications can be a user request selecting from the application repository 650 (e.g., a manual request, user input to a GUI of global management console 620 and/or a user input to a GUI for the application repository 650, etc.). In some examples, the request indicative of the selection of the one or more qualified ML or AI applications can be automatically generated at the edge compute unit 430, at the global management console 620, at the application repository 650, etc. For example, an automatic request for deployment of an AI or ML application from the application repository 650 to an edge compute unit 430 can be indicative of an automatically determined selection from the application repository 650. The automatic selection can be based on, in at least some examples, factors associated with the edge compute unit 430, such as the particular configuration, capabilities, deployment location (e.g., corresponding local edge site 402), deployment scenario or deployment objectives, configured or available edge assets 410, types of input or output data streams, existing model deployment instances 435, 433, 435 on the edge compute unit 430, etc. In some cases, the application repository 650 and/or global management console 620 can be used to manage the lifecycle of deployed AI/ML apps from the application repository 650 (e.g., can be used to manage the lifecycle of the deployed user and platform AI/ML applications 655). In some examples, the cloud-based application repository/marketplace 650 can be used to implement management of the AI/ML applications 655 on bare metal (e.g., on bare metal services 617 of an edge compute unit 430).

In some aspects, the platform services 602 can further include an application orchestration engine (not shown) that can be used for the deployment of Kubernetes on the edge compute units 430. For instance, in some embodiments, the application orchestration engine can be used to provide standalone Kubernetes clusters and Tanzu Kubernetes clusters on HCI. In some aspects, the application orchestration engine can be used to provide automated Kubernetes cluster lifecycle management using helm and ArgoCD.

SDN Network Configuration Provisioning, Management, Intelligent Routing

The platform services 602 can further include an SDN network configuration service 660, which may be used to provide management of networking functionality (e.g., SDN networking functionality) from the cloud. The SDN network configuration service 660 included in platform services 602 can correspond to or be associated with the SDN network provisioning and management engine 665 included in the edge compute unit services 605 implemented on each of the edge compute units 430. In one illustrative example, the SDN networking can be used to enable disparate connectivity options across different enterprise users' fleets of edge compute units 430 and/or across the constituent edge compute units 430 and local sites 402 of a single enterprise user's fleet of edge assets. For instance, a network configuration manager (e.g., the cloud-based SDN network configuration service 660 and/or edge-based SDN network provisioning and management engine 665) can be used to enable multiple different backhaul communication links to be established and configured for connection to a data network such as the internet. In particular, the network configuration manager can be used to enable multiple different backhauls to be configured to provide the internet backhaul link 440 depicted in FIG. 4. For instance, the multiple backhauls can use different communication modalities (e.g., such as wired connectivity, fiber connectivity, public or private 5G or other cellular network connectivity, satellite internet constellation connectivity, etc.). The multiple backhauls may be used individually or may be multiplexed together to provide internet backhaul communications over a plurality of backhaul links at the same time. The multiplexed backhaul links may be of the same modality (e.g., all fiber backhaul links, all wireless cellular links, all satellite internet constellation links) and/or may be of mixed modalities (e.g., internet backhaul traffic multiplexed over a combination of fiber, cellular, and/or satellite internet constellation communication links.

In some aspects, the network configuration manager can enable multiple internet backhauls to be configured between the edge compute units 430/local sites 402 and the platform services 602/cloud user environments 690/AI and ML training clusters 470. The multiple backhauls can be configured based on leveraging network virtualization and remote management of network assets to thereby expand the connectivity options at the edge (e.g., true edge). For instance, network virtualization and remote management of network assets can be configured or controlled through the global management console 620, to expand the connectivity options at the edge compute units 430 and corresponding local edge site locations 402 associated with an enterprise customer and/or the enterprise customer's fleet of managed edge assets registered to the platform services 602. In some aspects, the use of network virtualization can enable customer data traffic, log/metrics/telemetry traffic, and management/control plane traffic to be prioritized differently within one or more (or both) of the local edge network 420 at the local site 402 and within the one or more internet backhaul 440 networks between the local site 402/edge compute unit 430 and the platform services 602/cloud user environments 690.

In one illustrative example, the SDN network configuration service 660 can have a corresponding GUI that is presented in global management console 620, and can be used to perform SDN configuration and management for an SDN associated with one or more edge compute units 430, local sites 402, edge compute unit services 605, etc. As illustrated, the SDN network configuration service 660 of the platform services 602 can correspond to an SDN network provisioning and management engine 665 included in the edge compute unit services 605. In some examples, the SDN network configuration service 660 can receive one or more user inputs indicative of network configuration parameters, changes, updates, etc., and can transmit the SDN network configuration information to the SDN network provisioning and management engine 665 for application at the edge compute unit 430.

In some aspects, the SDN network configuration service 660 can be a cloud-based service of the platform services 602. The SDN network provisioning and management engine 665 of the edge compute unit services 605 can be a locally implemented edge service (e.g., implemented on edge compute unit 430) that utilizes cloud-based communication to receive configuration information to be applied to SDN networking for edge compute unit 430 and/or edge compute unit services 605. In some cases, SDN network provisioning management engine 665 can be responsible for network-level optimization and intelligent routing to/from edge compute unit 430.

In some cases, the SDN network provisioning and management engine 665 can be used to multiplex data transmission over multiple satellite internet constellation transceivers (e.g., uplink from edge compute unit 430 to the cloud can be multiplexed over a first satellite internet constellation link provided by a first satellite transceiver at the local site 402, a second satellite internet constellation link provided by a second satellite transceiver at the local site 402, a third satellite internet constellation link provided by a third satellite transceiver at the local site 402, . . . , etc.). In some cases, the SDN network provisioning and management engine 665 and/or the cloud-based SDN network configuration service 660 can be used to generate, collect, and/or display associated metrics for the SDN networking, satellite internet constellation connectivity and/or associated multiplexing, etc. In some aspects, the SDN network configuration service 660 and the SDN network provisioning and management engine 665 can support multiple data network modalities, including private 5G or other wireless cellular networks, wired fiber (e.g., fiber optic) connectivity, satellite internet constellation connectivity, etc.

Device Asset Lifecycle Management & Fleet Management Daemon

The platform services 602 are depicted in FIG. 6 as further including a device/asset lifecycle management (DLM) engine 670. The DLM engine 670 can be used to perform tasks and operations such as provisioning, adding/removing, and managing connected assets associated with the platform services 602. For instance, the DLM engine 670 can be used to perform asset management relating to the one or more edge compute units 430 provided at the plurality of local sites 402, . . . , 402-N of FIG. 4. Connected assets managed by the DLM engine 670 can additionally include various sensors and other assets, computing devices, etc., provided at the edge and/or otherwise associated with an edge compute unit 430. For instance, the DLM engine 670 can be used to perform asset management relating to the plurality of sensors or sensor packages that are provided at a local site 402 and/or associated with generating input sensor data used by an edge compute unit 430. For instance, the edge assets 410 of FIG. 4 (e.g., autonomous robots 416, local site cameras 414, environmental sensors 412, etc.) can each be managed by the DLM engine 670 of FIG. 6. In some examples, the DLM engine 670 can be a cloud-based component or module of the platform services 602. In one illustrative example, the DLM engine 670 can be associated with a corresponding GUI presented in the global management console 620. For example, the DLM engine 670 can correspond to a GUI that is the same as or similar to the 'Fleet Map' GUI illustrated in the example GUI 800 of FIG. 8. In some aspects, the DLM engine 670 can additionally (or alternatively) correspond to an 'Assets' GUI, shown as a selectable option in the left-hand sidebar menu of GUI 800 of FIG. 8 and GUI 900 of FIG. 9.

In some cases, the DLM engine 670 GUI can display a listing or visual depiction of the various assets that have been deployed, registered, provisioned, etc., for the enterprise user of platform services 602. For instance, the assets managed by DLM engine 670 can be separated, filtered, stored, etc., based on factors such as asset type, asset location, asset age, asset status, asset task or usage, etc. In some embodiments, the functionality of DLM engine 670 can be provided by a DLM asset service and a DLM provisioning service that are both included in DLM engine 670. For instance, the DLM asset service and the DLM provisioning service can be sub-services implemented by DLM engine 670 in the platform services 602. The DLM asset service and DLM provisioning service can both be cloud-based services. In some examples, the DLM asset service is a cloud-based service used to manage the assets (e.g., edge compute units 430, connected sensors, and/or other edge assets 410 provided at a local site 402 edge location, etc.) belonging to an organization. In some examples, the DLM asset service can be a cloud-based service configured to add assets to an organization, remove assets from an organization, list assets, manage additional properties like endpoints, etc. In some cases, the DLM asset service can have an expanded schema to include a satellite internet constellation internal representation within the scope of managed or monitored assets of the DLM asset service and/or DLM engine 670. In some cases, the satellite internet constellation internal representation can be implemented based at least in part on the satellite edge connectivity management engine 680 included in the platform services 602 (as will be described in greater detail below).

The DLM provisioning service can be a separate cloud-based service that is used to recognize assets belonging to an organization and register them as such. For instance, when a new edge asset, connected sensor, or edge compute unit, etc. is provided at a local site 402, the new edge asset, connected sensor, or edge compute unit can initially connect to and communicate with the DLM provisioning service of the DLM engine 670 (e.g., via the internet backhaul communication link 440 of FIG. 4). Based on the initial connection between the new edge device and the DLM provisioning service of the DLM engine 670, provisioning can be performed such that the new edge device can be registered to and associated with the enterprise user or organization that operates the local site 402. In some embodiments, the DLM provisioning service can register or provision assets as belonging to an organization based on hardcoding HCl assets as belonging to the particular organization. In some embodiments, the DLM provisioning service can provision assets using certificates (CA), if turned on or enabled at the local customer/enterprise site (e.g., local site 402 of FIG. 4). In some cases, the DLM provisioning service can hardcode satellite internet constellation assets as belonging to the organization. For instance, a satellite internet constellation transceiver coupled to or otherwise in communication with the edge compute unit 430 (e.g., a satellite internet constellation transceiver provided at or near the local site 402) can be hardcoded as belonging to the organization using the DLM provisioning service of the DLM engine 670. The satellite internet constellation transceiver(s) may be the same as or similar to one or more of the satellite transceivers 312, 314, 316, 321, 323, 325 of FIG. 3, etc.

In some embodiments, the DLM engine 670 can further include a DLM cloud control plane service (not shown). The DLM cloud control plane service can be used to implement a cloud component for the control plane responsible for device management. For instance, the DLM cloud control plane service can be used to deploy workloads, grab (e.g., retrieve or obtain) the live state of various HCl hosts (e.g., edge compute units 430 or compute hardware/HCl hosts running thereon). In some embodiments, the DLM cloud control plane service can be used to send curated commands and control indications to an edge compute unit 430, where the commands may be user-initiated, automatically or system initiated, or a combination of the two. For instance, a user input or configuration action provided to a GUI of the global management console 620 corresponding to the DLM engine 670 (or other component of platform services 602) can be automatically translated into control plane signaling by the DLM cloud control plane service, and can be pushed to the appropriate services of the edge compute unit 430 (e.g., translated and pushed from the cloud-based DLM cloud control plane service within platform services 602, to the appropriate or corresponding one(s) of the edge compute unit services 605 running on the edge compute unit 430). In some aspects, the DLM cloud control plane service can be implemented based on a scalable design for control plane and additional management APIs.

In some examples, DLM engine 670 can further include or otherwise be associated with an edge compute unit cloud control plane service (not shown). The edge compute unit cloud control plane service can be implemented at the edge compute unit 430 (e.g., can be included in the edge compute unit services 605) and may provide a resident control plane that provides an interface into a given edge compute unit 430 from the cloud. For instance, the edge compute unit cloud control plane service can provide an interface from the global management console 620 (and/or other platform services 602) into a given edge compute unit 430. The interface into a given edge compute unit 430 can be mediated by the DLM cloud control plane service (on the cloud side) and the edge compute unit cloud control plane service (on the edge side). In some aspects, the edge compute unit cloud control plane service can be used to implement REST endpoints for deploying applications (e.g., the user and platform applications 655, deployed to the edge from the cloud-based application repository 650), servicing curated commands, etc.

In some aspects, the DLM engine 670 of platform services 602 can correspond to or otherwise be associated with an edge-based fleet management daemon 673 that is included in the edge compute unit services 605 and/or deployed on the edge compute unit(s) 430. For instance, the edge-based fleet management daemon 673 can be configured to provide node-level data and metrics (where the node-level corresponds to the level of individual edge compute units 430). More generally, the edge-based fleet management daemon 673 can be configured to perform collection of vital statistics and data related to nodes/edge compute units 430 registered with the platform services 602 and needed for display, management, monitoring, or other interaction through the global management console 620. In some cases, the edge-based fleet management daemon 673 can additionally, or alternatively, be used to implement a coredump collector that is in communication with the cloud-based DLM engine 670.

As illustrated in FIG. 6, the edge compute unit services 605 can further include connector services 677, which may also be referred to as cloud connector services 677. For instance, the cloud connector services 677 can include a plurality of different cloud connectors for various cloud platforms associated with the cloud user environments 690. The cloud user environments 690 can be public or private clouds that are used to implement some (or all) of the platform services 602 of FIG. 6, the platform software stack 502 of FIG. 5, the AI/ML training clusters 470 of FIG. 4, etc. In some embodiments, the cloud connector services 677 can include a first cloud connector corresponding to a first public cloud infrastructure, a second cloud connector corresponding to a second public cloud infrastructure, a third cloud connector corresponding to a first private cloud infrastructure, a fourth cloud connector corresponding to a second private cloud infrastructure, etc. The cloud connector services 677 can be used to route or bridge traffic appropriately between the edge compute unit 430 and edge compute unit services 605 to the appropriate one of the cloud user environments 690 where the platform services 602 are implemented, provided, or located, etc. In some cases, the cloud connector services 677 can be used to connect nodes of the edge compute unit 430/the edge compute unit 430 itself to the appropriate user-specified cloud user environments 690. In some cases, the cloud connector services 677 can be configured to upload logs related to platform AI/ML applications included in the user and platform applications 655 running on the edge compute unit 430. In some cases, the cloud connector services 677 can be configured to provide mechanisms for data plane interaction with the various third-party or private cloud providers associated with the cloud user environments 690.

Observer Telemetry and Monitoring

The platform services 602 can further include the telemetry and monitoring observer engine 630, which can correspond to the telemetry and monitoring stack 635 implemented on the edge compute unit 430 among the edge compute unit services 605. In some aspects, the observer can be used to provide hardware and critical environment observability designed to be part of a comprehensive and unified software solution to simplify and streamline the management of a customer' fleet of edge compute units 430 and associated edge assets 410. For instance, the telemetry and monitoring observer engine 630 and/or the telemetry and monitoring stack 635 can enable system-wide visibility, command, and control of the fleet's hardware systems (e.g., the hardware systems of the edge compute units 430 and/or the hardware systems of the connected edge assets 410). The fleet's hardware systems that may be associated with, viewed, commanded, controlled, etc., by telemetry and monitoring observer engine 630 and/or telemetry and monitoring stack 635 can include, but are not limited to: power distribution systems or sub-systems, thermal management functionality, internal environmental control systems and functionalities, data connectivity (e.g., both backhaul and device), physical security systems (e.g., at local site 402, associated with edge compute unit 430, associated with connected edge assets 410, etc.).

In some aspects, the telemetry and monitoring stack 635 implemented on the edge compute unit 430 (e.g., included in the edge compute unit services 605) can include one or more cloud-based services or sub-services. In some aspects, the telemetry and monitoring stack 635 can comprise a plurality of sub-services each running from the cloud, with telemetry and monitoring stack 635 itself running from edge compute unit 430. In some embodiments, telemetry and monitoring stack 635 can run at the edge and can include cloud-based services or sub-services configured to upload host-level and satellite internet constellation metrics for an observation view of telemetry and monitoring info from cloud-based global management console 620.

For instance, the telemetry and monitoring stack 635 can include a network telemetry and monitoring service that runs in the cloud (e.g., is a cloud-based service) and is configured to provide network usage statistics corresponding to one or more of a local network 420 associated with the edge compute unit 430, SDN networking associated with the edge compute unit 430 (e.g., SDN networking implemented based on the SDN network configuration service 660 and SDN network provisioning and management engine 665), and/or internet backhaul 440 associated with the edge compute unit 430 and cloud user environments 690. In some cases, the cloud-based network telemetry and monitoring service can be included in, associated with, etc., one or more of the cloud-based SDN network configuration service 660 included in the platform services 602 and/or the edge-based SDN network provisioning and management engine 665 included in the edge compute unit services 605 deployed on the edge compute unit 430.

In some embodiments, the telemetry and monitoring stack 635 can include a satellite internet constellation telemetry and monitoring service that runs in the cloud (e.g., is a cloud-based service) and is configured to provide network usage statistics and satellite internet constellation metrics corresponding to connectivity between the local site 402/edge compute unit 430 and one or more bird (e.g., satellites) of the satellite internet constellation. In some aspects, the cloud-based satellite internet constellation telemetry and monitoring service can be included in, associated with, etc., the satellite edge connectivity management engine 680 included in the platform services 602.

In some cases, the telemetry and monitoring stack 635 can further include a critical environment telemetry and monitoring service running locally at the edge (e.g., on the edge compute unit 430/included in the edge compute unit services 605). The critical environment telemetry and monitoring service can display data from one or more APIs associated with or provided with the containerized data center used to implement the edge compute unit 430, and corresponding to telemetry and monitoring information for components within the edge compute unit 430 (e.g., including ambient environmental parameters such as temperature or humidity, power consumption, etc.; including monitoring parameters for various compute hardware included in the HPC engine 434 of edge compute unit 430; etc.). In some aspects, the critical environment telemetry and monitoring service can upload HCI/satellite internet constellation metrics to the cloud (e.g., platform services 602 and/or cloud user environments 690) for display in the global management console 620. In some embodiments, the telemetry and monitoring stack 635 can further include a host level telemetry and monitoring (compute and storage) service running locally at the edge (e.g., on the edge compute unit 430/included in the edge compute unit services 605). The host-level telemetry and monitoring (compute and storage) service can be used to collect and/or display data from local edge hosts (e.g., edge compute units 430) and/or Kubernetes clusters associated with the local edge compute host units 430. The host-level telemetry and monitoring (compute and storage) service can upload HCl level host, virtual machine (VM), and/or Kubernetes data and metrics to the cloud (e.g., platform services 602 and/or cloud user environments 690) for display in the global management console 620.

In some aspects, the telemetry and monitoring stack 635 can further include a network telemetry and monitoring service running locally at the edge (e.g., on the edge compute unit 430/included in the edge compute unit services 605) and configured to provide combined network and satellite internet constellation connectivity metrics, network usage statistics, etc. The network telemetry and monitoring service can upload satellite internet constellation metrics, HCl network utilization metrics, etc., to the cloud (e.g., platform services 602 and/or cloud user environments 690) for display in the global management console 620.

Satellite Internet Constellation Edge Connectivity Management

In one illustrative example, the platform services 602 can include a satellite edge connectivity management engine 680. The satellite edge connectivity management engine 680 can be a cloud-based service or engine, and may correspond to a satellite internet constellation connectivity module (e.g., edge module included in edge compute unit 430 or deployed at the local site 402 and in communication with edge compute unit 430). In some cases, the satellite internet constellation connectivity management engine 680 can comprise bundled software associated with the satellite internet constellation edge module (e.g., satellite internet constellation transceiver provided at the local site 402/edge compute unit 430). In some embodiments, the satellite edge connectivity management engine 680 can be associated with a corresponding GUI of the global management console 620, where the corresponding GUI runs or presents the bundled software associated with the satellite internet constellation edge hardware module and/or presents an interface or portal for management of the satellite internet constellation internet connectivity. In some cases, the corresponding GUI of global management console 620 for satellite internet constellation connectivity management engine 680 can display some (or all) of the satellite internet constellation metrics collected by telemetry and monitoring stack 635. In some cases, the satellite internet constellation metrics collected by telemetry and monitoring stack 635 may be presented in global management console 620 in the dedicated GUI corresponding to satellite internet constellation edge connectivity management engine 680, can be presented in global management console 620 in a different dedicated GUI corresponding to telemetry and monitoring observer engine 630, and/or can be presented across both/multiple GUIs of global management console 620.

In some aspects, platform services 602 can further include a satellite internet constellation service backend module (not shown), either as a standalone engine/service and/or as a sub-engine/sub-service of the satellite edge connectivity management engine 680 included in platform services 602. For example, the satellite internet constellation service backend module can be used to provide management and/or monitoring of the service backend associated with using the satellite internet constellation to implement internet backhaul (e.g., internet backhaul link 440 of FIG. 4) between cloud user environments 690/platform services 602 and edge compute device 430/local site 402. In some cases, the satellite internet constellation service backend module can include or provide a support ticket creation backend, and/or may additionally provide satellite internet constellation management and/or connectivity management using one or more enterprise APIs associated with or configured for use with the satellite internet constellation. In some aspects, the satellite internet constellation service backend module can include the support ticket creation backend, and can additionally include satellite internet constellation management functionalities (e.g., such as pause service, move service, change plans, etc.) using corresponding appropriate enterprise APIs for the satellite internet constellation.

Figure 7:
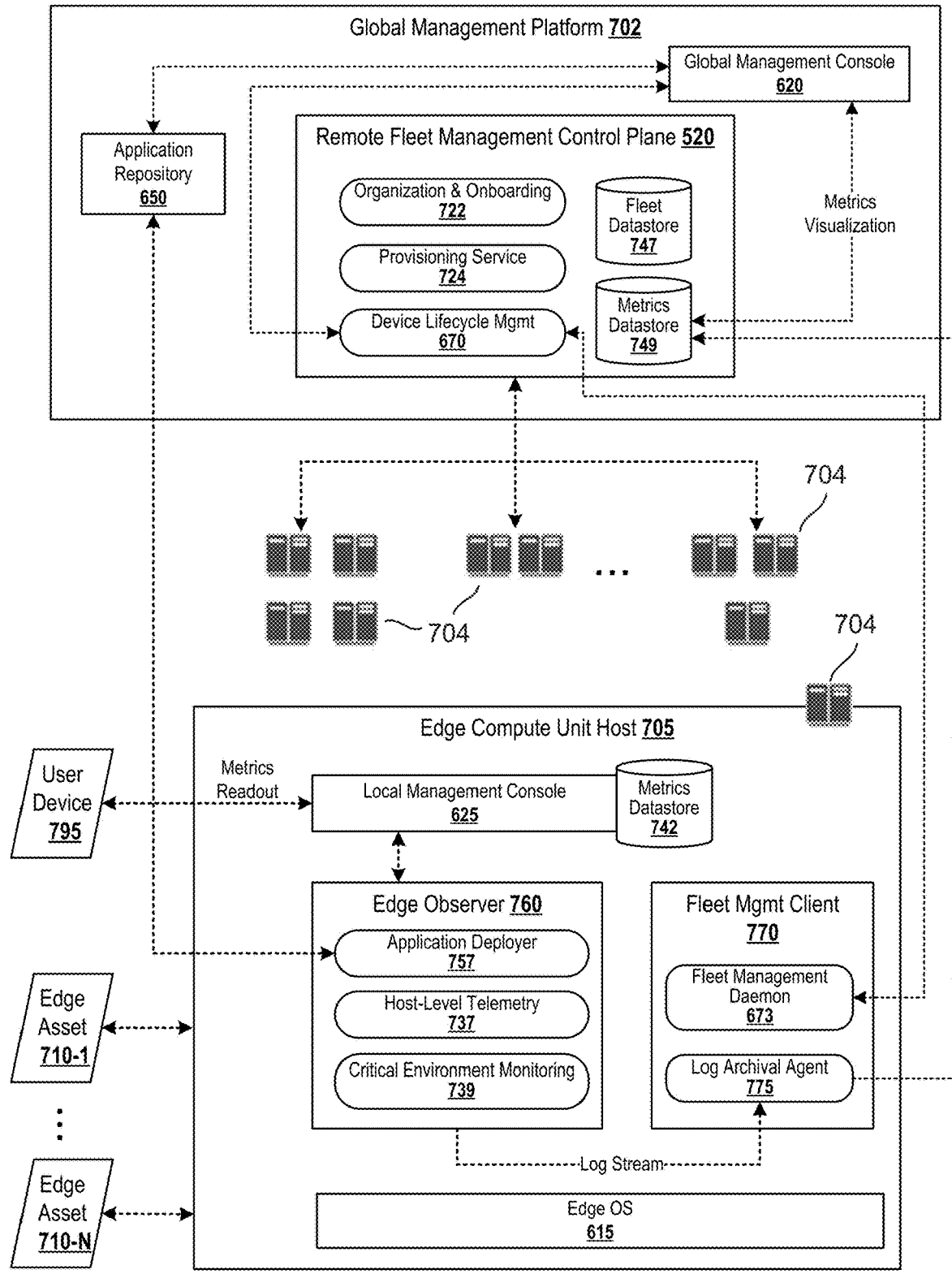
FIG. 7 is a diagram illustrating an example infrastructure and architecture for implementing an edge compute unit of an edge computing system for ML and/or AI workloads, in accordance with some examples.

FIG. 7 is a diagram illustrating an example infrastructure and architecture 700 for implementing an edge computing system for ML and/or AI workloads, according to aspects of the present disclosure. For instance, FIG. 7 includes a global management platform 702 that can be a cloud-based platform that can include one or more components that are the same as or similar to corresponding components within the platform services 602 of FIG. 6 and/or within the platform software stack 502 of FIG. 5. FIG. 7 additionally includes a plurality of edge compute units 704 (e.g., a fleet of edge compute units 704), each of which may be the same as or similar to the edge compute unit 430 of FIG. 4 and/or can include one or more components that are the same as or similar to corresponding components within the edge compute unit services 605 of FIG. 6. In particular, each edge compute unit 704 of the plurality of edge compute units can implement, include, or comprise an edge compute unit host 705, which can be the same as or similar to the edge compute unit services 605 of FIG. 6.

For instance, a global management platform 702 can include the application repository 650 and global management console 620 of FIG. 6, in addition to the remote fleet management control plane 520 of FIG. 5. The global management platform 702 can be a cloud-hosted and/or on-premises computing system that is remote from the respective local edge sites associated with various edge compute units 704 of the fleet (e.g., plurality) of edge compute units 704. For instance, global management platform 702 of FIG.

7 can be associated with one or more of cloud-based AI/ML training clusters 470 of FIG. 4, the cloud user environments 690 of FIG. 6, etc.

The remote fleet management control plane 520 can include an organization and onboarding service 722 that can be used to perform organization-specific tasks corresponding to an enterprise organization (e.g., enterprise user) of the global management platform 702 and/or the infrastructure and architecture 700 for edge computing of ML and AI workloads. For example, the onboarding service 722 can be used to onboard users for the enterprise organization, based on creating one or more user accounts for the global management console 602 and/or the local management console 625 of FIG. 7. The remote fleet management control plane 520 can additionally include a provisioning service 724 that can be used to provision various edge assets associated with (e.g., deployed by) the enterprise user. For instance, the provisioning service 724 can be associated with provisioning satellite internet constellation transceivers or connectivity units for the edge compute units 704, can be associated with provisioning the edge compute units 704, can be associated with provisioning one or more user devices (e.g., such as the user device 795), can be associated with provisioning one or more connected edge assets 710-1, . . . , 710-N (e.g., which can be the same as or similar to the connected edge assets 410 of FIG. 4), etc.

The remote fleet management control plane can include and/or can be associated with one or more databases, such as a fleet datastore 747 and a metrics datastore 749. In some aspects, the fleet datastore 747 can store data or information associated with the fleet of deployed edge compute units 704. For instance, fleet datastore 747 can communicate with one or more (or all) of the organization and onboarding service 722, the provisioning service 724, the device lifecycle management service 670, etc. In some aspects, the fleet datastore 747 and/or the metrics datastore 749 can communicate with and be accessed by the global management console 620. For instance, global management console 620 can access and communicate with the metrics datastore 749 for metrics visualization corresponding to one or more of the deployed edge compute units 704 of the fleet (e.g., plurality) of deployed edge compute units 704. In some embodiments, the fleet datastore 747 can include the local knowledge base/datastore 545 of FIG. 5, described previously above.

As mentioned previously, the global management platform 702 can be associated with and used to manage the deployment of a fleet of edge compute units 704. The various edge compute units 704 can be deployed to different edge locations. For instance, one or more edge compute units 704 can be deployed to each respective edge location that is associated with (e.g., is managed by and communicates with) the global management platform 702. As illustrated in the example of FIG. 7, a first edge location may have four edge compute units deployed (e.g., left-most deployment shown in FIG. 7), a second edge location may have two edge compute units deployed (e.g., center deployment shown in FIG. 7), a third edge location may have three edge compute units deployed (e.g., right-most deployment shown in FIG. 7), etc. A greater or lesser number of edge site locations can be utilized, each with a greater or lesser number of edge compute units 704, without departing from the scope of the present disclosure.

Each edge compute unit can be associated with an edge compute unit host 705, which is shown in the illustrative example of FIG. 7 as corresponding to a single one of the plurality of edge compute units 704. In particular, each edge compute unit 704 of the plurality of edge compute units can implement, include, or comprise an edge compute unit host 705, which can be the same as or similar to the edge compute unit services 605 of FIG. 6, and/or can include or implement one or more of the components of edge compute unit 430 of FIG. 4, etc. The edge compute unit host 705 can include the local management console 625 of FIG. 6, which may be associated with a metrics datastore 742. The metrics datastore 742 can be used to collect and store local telemetry and other metrics information generated and/or received at the edge compute unit host 705 and/or corresponding local edge site of the edge compute unit host 705. In some aspects, information included in the local metrics datastore 742 can be the same as or similar to at least a portion of the information included in the global management platform 702 metrics datastore 749. In some cases, information included in the local metrics datastore 742 can be separate or disjoint from at least a portion of the information included in the global management platform 702 metrics datastore 749.

In some examples, the local management console 625 can be communicatively coupled with the local metrics datastore 742, and can be configured to provide metrics readout information and/or visualization to one or more user devices 795 that are local to the same edge location as the edge compute unit host 705 and that are authorized to access and interface with the local management console 625 (e.g., access control and authorization may be implemented based on the organization and onboarding service 722 of the global management platform 702). The user devices 795 can include various computing devices, including but not limited to, desktop computers, laptop computers, tablet computers, smartphones, wearable computing devices, output devices or equipment, display devices or equipment, personal computing devices, mobile computing devices, portable hand units or terminals, display monitors, etc.) that may be present within or otherwise associated with the local edge site of the edge compute unit host 705.

The local management console 625 can additionally communicate with an edge observer engine 760, which can correspond to the telemetry and monitoring stack 635 of the edge compute unit services 605 of FIG. 6. In some embodiments, the edge observer engine 760 can be the same as or similar to the telemetry and monitoring stack 635 of FIG. 6. The edge observer engine 760 can include a host-level telemetry service 737 and a critical environment monitoring service 739 (one or more, or both, of which can be included in the telemetry and monitoring stack 635 of FIG. 6). The critical environment monitoring service 739 can be used to monitor environmental parameters of the edge compute unit 704/edge compute unit host 705, such as temperature, humidity, airflow, vibrations, energy consumption, etc. The critical environment monitoring service 739 can ingest, obtain, or otherwise access corresponding sensor data or sensor data streams from environmental monitoring sensors, which can include one or more (or all) of the environmental sensors 412 of FIG. 4. In some aspects, the edge observer engine 760 can additionally include an application deployer 757, which can communicate with the cloud-based application repository 650 of the global management platform 702 (e.g., the cloud-based application repository 650 of FIG. 6). In some embodiments, log data from the edge observer engine 760 can be transmitted (e.g., as a log stream) from the edge observer engine 760 to a log archival agent 775 of a fleet management client 770 included in the edge compute unit host 705. The log archival agent 775 can, in some aspects, parse and/or archive (e.g., store or transmit for storage) some or all of the log stream data received from and/or generated by the edge observer engine 760. For instance, the log archival agent 775 of the fleet management client 770 can transmit the log stream data received from and/or generated by edge observer engine 760 to the cloud-based metrics datastore 749 of the global management platform 702, where the transmitted log stream data from the cloud-based metrics datastore 749 can be used for metrics visualization at or using the global management console 620 (also of the global management platform 702).

In some aspects, the fleet management client 770 included in or deployed on the edge compute unit host 705 can be associated with the fleet of deployed edge compute units 704. For instance, the fleet management client 770 can associate the particular edge compute unit host 705 with the corresponding additional edge compute unit hosts 705 that are also included in the same fleet. In some aspects, the fleet management client 770 can be used to coordinate and implement distributed operations (e.g., computational operations, such as finetuning, retraining, etc., of one or more AI/ML models) across multiple edge compute units 704 of the fleet. For instance, in one illustrative example, distributed finetuning or retraining of an AI/ML model across multiple edge compute units 704 be orchestrated by a respective fleet management client 770 that is implemented at or by each of the multiple edge compute units 704. As illustrated, the fleet management client 770 can include the fleet management daemon 673 described above with respect to FIG. 6. The fleet management daemon 673 of the fleet management client 770 provided on each edge compute unit host 705 can communicate with the device lifecycle management service 670 of the remote fleet management control plane 520 implemented in the global management platform 702. In some aspects, the fleet management daemon 673 of the fleet management client 770 provided on each edge compute unit host 705 can communicate with the remote fleet management control plane 520, the global management console 620, and/or various other component and services within the global management platform 702 of FIG. 7.

In some aspects, the edge compute unit host 705 can communicate with a plurality of connected edge assets 710-1, . . . , 710-N. As noted previously, the connected edge assets 710-1, . . . , 710-N can be the same as or similar to the connected edge assets 410 of FIG. 4, and can include various sensors, computing devices, etc., that are associated with an edge deployment location of the edge compute unit host 705. For instance, the connected edge assets 710-1, . . . , 710-N in communication with the edge compute unit host 705 can include, but are not limited to, one or more of sensors such as cameras, thermal imagers, lidars, radars, gyroscopes, accelerometers, vibrometers, acoustic sensors or acoustic sensor arrays, sonar sensors or sonar sensor arrays, pressure sensors, temperature sensors, X-ray units, magnetic resonance imaging (MRI) units, electroencephalogram (EEG) units, electrocardiogram (ECG) units, inertial navigation system (INS) units, inertial measurement units (IMUs), GPS modules, positioning system modules, compass sensors, directional sensors, magnetic field sensors, robotic platforms, robotic units, robotic devices, etc., among various others. In some aspects, the connected edge assets 710-1, . . . , 710-N associated with the edge compute unit host 705 can include all devices connected to edge compute units that have local ingress and egress of data.

Edge AI/ML Monitoring and Management Platform Management Console GUI Examples

FIG. 8 is a diagram illustrating an example graphical user interface (GUI) 800 of a global management console associated with asset management and telemetry observation for a fleet of edge compute units of an edge computing system for ML and/or AI workloads, in accordance with some examples. For instance, the GUI 800 can correspond to a "Remote Fleet Management" GUI of the global management platform 702 of FIG. 7. In some aspects, the Remote Fleet Management GUI 800 of FIG. 8 can be presented using the Global Management Console 620 of FIG. 6 and FIG. 7. In some cases, Remote Fleet Management GUI 800 of FIG. 8 can additionally, or alternatively, be associated with the remote fleet management control plane 520 of FIG. 5 and FIG. 7.

The Remote Fleet Management GUI 800 can include user interface elements corresponding to different platform services. For instance, the user interface elements (e.g., presented in the left-hand column of the Remote Fleet Management GUI 800) can include, but are not limited to, an owned assets 852 UI element (e.g., corresponding to a display of the owned assets associated with or registered to an enterprise user's fleet); an edge compute units 852 UI element (e.g., corresponding to a display of the edge compute units 810, . . . , 810-N associated with or registered to an enterprise user's fleet); a deployed AI/ML applications 856 UI element (e.g., corresponding to a display of the selection of AI/ML applications deployed to the enterprise user's fleet of edge compute units); a deployable AI/ML application repository 858 UI element (e.g., corresponding to a display of available AI/ML applications that can be deployed from the repository 550 of FIG. 5 or the repository 650 of FIGS. 6 and 7); users and roles 862 UI element (e.g., corresponding to a display of registered users and roles for interacting with the remote fleet management system and/or the global management console 620 of FIGS. 6 and 7); a remote monitoring 864 UI element (e.g., corresponding to a display of remote monitoring and telemetry data, such as data from the edge observer 760 of FIG. 7 and deployed on each edge compute unit of the enterprise user's fleet); and a security 866 UI element (e.g., corresponding to a display of security information, alerts, monitoring information, etc.).

A plurality of user interface elements presented in the horizontal row at the top of the example Remote Fleet Management GUI 800 can be used to filter a display of the fleet map 802 information within the GUI 800. For instance, the edge compute units UI element 810 can be used to select for display the plurality (e.g., fleet) of edge compute units 810-1, . . . , 810-N included in the fleet map 802. The satellites UI element 832 can be used to select for display the satellite transceiver units 822 included in the fleet map 802 and associated with particular ones of the edge compute units 810-1, . . . , 810-N. The cameras UI element 834 can be used to select for display the cameras 824 included in the fleet map 802 and associated with particular ones of the edge compute units 810-1, . . . , 810-N. The sensors UI element 836 can be used to select for display the sensors 826 included in the fleet map 802 and associated with particular ones of the edge compute units 810-1, . . . , 810-N. The robots UI element 838 can be used to select for display the robotic units 828 included in the fleet map 802 and associated with particular ones of the edge compute units 810-1, . . . , 810-N. The drones UI element 839 can be used to select for display drone units 829 included in the fleet map 802 and associated with particular ones of the edge compute units 810-1, . . . , 810-N. The vehicles UI element 837 can be used to select for display vehicle units 827 included in the fleet map 802 and associated with particular ones of edge compute units 810-1, . . . , 810-N.

In some aspects, the cameras 824, satellite transceivers 822, sensors 826, robotic units 828, drones 829, and vehicles 827 can be included in a set of connected assets 820 of the fleet map 802. The connected assets 820 of FIG. 8 can be the same as or similar to one or more of the connected assets 410 of FIG. 4 and/or the connected assets 710-1, . . . , 710-N of FIG. 7. In some aspects, each connected assets 820 instance (e.g., each individual asset) may be associated with a respective one of edge compute units 810-1, . . . , 810-N. In some embodiments, one or more connected assets 820 instances (e.g., one or more individual assets within fleet map 802) may be provided at an edge location without being associated with a respective one of edge compute units 810-01, . . . , 810-N. For instance, an edge location may include a satellite transceiver 822 and one or more connected sensors 826, without including an edge compute unit 810 at the edge location. In another example, an edge location may include one or more satellite transceivers 822 configured to act as a communications relay for other edge locations and edge compute units 810, without include an edge compute unit 810 at the edge location of the relay satellite transceiver(s) 822, etc.

In some aspects, each asset of the connected assets 820 included within the fleet map 802 can be associated with a corresponding health status information, as shown in the example Remote Fleet Management GUI 800 of FIG. 8. For instance, the corresponding health status information for each respective asset of the plurality of connected assets 820 can include a selection between one of a 'Healthy' status, an 'Attention' status, or a 'Critical' status. In some aspects, the corresponding health status information for each respective asset of the plurality of connected assets 820 can be selected for display within the GUI 800 using the corresponding health status selection UI elements 835-1, 835-2, and 835-3. For instance, the healthy assets UI selection element 835-1 can trigger display of the subset of assets within the plurality of connected assets 820 that are currently associated with the 'Healthy' status. The attention assets UI selection element 835-2 can trigger display of the subset of assets within the plurality of connected assets 820 that are currently associated with the 'Attention' status. The critical assets UI selection element 835-3 can trigger display of the subset of assets within the plurality of connected assets 820 that are currently associated with the 'Critical' status.

FIG. 9 is a diagram illustrating another example GUI 900 of a global management console associated with asset management and telemetry observation for a fleet of edge compute units of an edge computing system for ML and/or AI workloads, in accordance with some examples. In one illustrative example, the GUI 900 of FIG. 9 can correspond to selection of the edge compute units UI element 854 of the Remote Fleet Management GUI 800 of FIG. 8 (e.g., and the GUI 800 of FIG. 8 can correspond to selection of the owned assets UI element 852). The GUI 900 of FIG. 9 can be indicative of drill-down or detailed information corresponding to a selected edge compute unit of the plurality of edge compute units 810-1, . . . , 810-N of the fleet map 802 of FIG. 8. For instance, the selected edge compute unit can correspond to a specific location (e.g., Houston, TX) of the edge site deployment location and/or can be identified in the GUI 900 based on a unique name or identifier of the selected edge compute unit (e.g., GAL-TX-R76A). The GUI 900 can include a UI element 910 for displaying host metrics information of the selected edge compute unit; a UI element 912 for displaying power and environmental metrics information of the selected edge compute unit; and a UI element 914 for displaying app metrics information of the selected edge compute unit. In some aspects, app metrics UI element 914 can correspond to application metrics associated with a subset of AI/ML applications 856 of FIG. 8, where the subset comprises the particular AI/ML applications that are deployed on the selected edge compute unit.

In one illustrative example, the GUI 900 of FIG. 9 can correspond to the selection of the host metrics UI element 910. The host metrics display of GUI 900 can include a CPU utilization information 920, which can be indicative of CPU utilization information (e.g., a percentage) of the selected edge compute unit relative to a total CPU cores available 925 for the selected edge compute unit. The host metrics display of GUI 900 can include a memory utilization information 930, which can be indicative of memory utilization information (e.g., a percentage) of the selected edge compute unit relative to a total memory available 935 for the selected edge compute unit. The host metrics display of GUI 900 can include a storage utilization information 940, which can be indicative of storage utilization information (e.g., a percentage) of the selected edge compute unit relative to a total storage available 935 for the selected edge compute unit. The host metrics display of GUI 900 can include a GPU utilization information 970, which can be indicative of GPU utilization information (e.g., a percentage) of the selected edge compute unit relative to a total GPU TFLOPS available 975 for the selected edge compute unit.

In some embodiments, some (or all) of the host utilization information 920, 930, 940, 970 can be displayed within GUI 900 in combination with a corresponding utilization graph and/or historical utilization information at the selected edge compute unit. For instance, the CPU utilization information 920 can correspond to a CPU utilization graph 928 and/or other time-based or historical CPU utilization information at the selected edge compute unit. The memory utilization information 930 can correspond to a memory utilization graph 938 and/or other time-based or historical memory utilization information at the selected edge compute unit. The storage utilization information 940 can correspond to a storage utilization graph 948 and/or other time-based or historical storage utilization information at the selected edge compute unit. The GPU utilization information 970 can correspond to a GPU utilization graph 978 and/or other time-based or historical GPU utilization information at the selected edge compute unit.

Fleet Map—Real-time, Dynamic, and Scalable Collection, Aggregation, Transfer, and Analysis of Streaming Data from a Fleet of Connected Devices Systems, apparatuses, methods (also referred to as processes), and computer-readable media (collectively referred to herein as "systems and techniques") are described herein for fleet and asset management, including interfaces thereof (e.g., user interfaces (UIs), graphical user interfaces (GUIs), etc.). For example, the systems and techniques can be used to provide a fleet map for the collection, aggregation, transfer, and/or analysis of data and other information obtained from a plurality of connected edge assets deployed across various sites or edge locations.

In some aspects, one or more (or both) of the example GUIs 800 of FIGS. 8 and/or 900 of FIG. 9 can be fleet map GUIs. For instance, the example GUIs 800 and/or 900 may be implemented by a same or similar fleet map system or apparatus used to provide the example fleet map GUIs of FIGS. 10A-14, each of which are described in greater depth below. In some embodiments, one or more (or all) of the example fleet map GUIs of FIGS. 10A-14 can correspond to a "Remote Fleet Management" GUI and/or a "Fleet Map" GUI of the global management platform 702 of FIG. 7. In some aspects, one or more (or all) of the example fleet map GUIs of FIGS. 10A-14 can be presented using the Global Management Console 620 of FIG. 6 and FIG. 7. In some cases, one or more (or all) of the example fleet map GUIs of FIGS. 10A-14 can additionally, or alternatively, be associated with the remote fleet management control plane 520 of FIG. 5 and FIG. 7.

As noted above, the example fleet map GUIs of FIGS. 10A-14 can be the same as or similar to the example GUIs 800 and/or 900 of FIG. 8 and FIG. 9, respectively. For instance, the example fleet map GUI 1000a of FIG. 10A can include a set of user interface elements 1005 (e.g., presented in the left-hand column of the fleet map GUI 1000a) that are the same as or similar to one or more corresponding user interface elements in GUIS 800 and/or 900 (e.g., one or more corresponding user interface elements depicted in the left-hand column of each of GUI 800 or GUI 900).

Figure 10A:
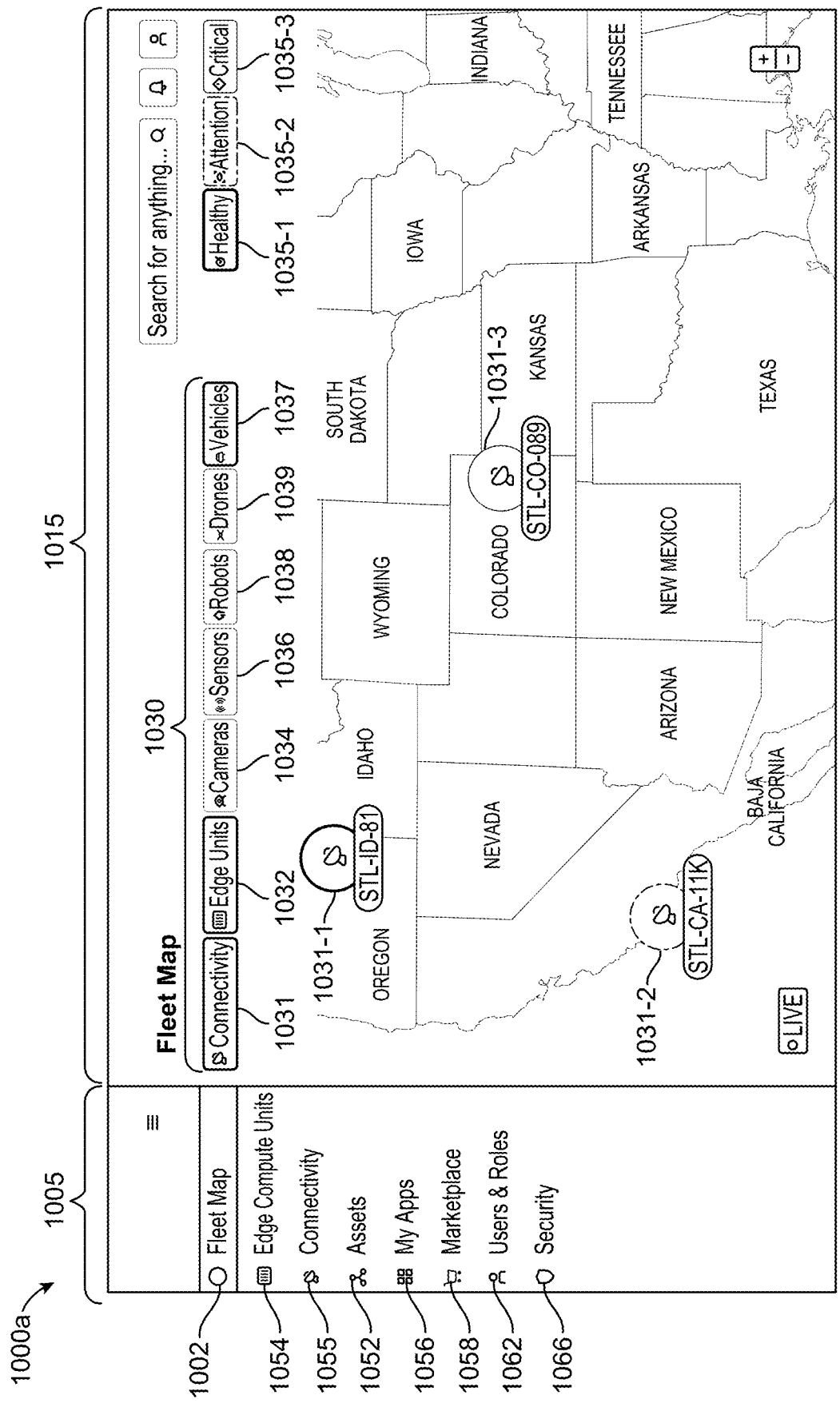
FIG. 10A is a diagram illustrating an example fleet map GUI for fleet and/or asset management, in accordance with some examples.

In some aspects, the 'Edge Compute Units' 1054 UI element of FIG. 10A can be the same as or similar to the edge compute units UI element 852 of FIG. 8; the 'Assets' UI element 1052 of FIG. 10A can be the same as or similar to the owned assets UI element 852 of FIG. 8; the 'My Apps' UI element 1056 of FIG. 10A can be the same as or similar to the deployed AI/ML applications UI element 856 of FIG. 8; the 'Marketplace' UI element 1058 of FIG. 10A can be the same as or similar to the deployable AI/ML application repository UI element 858 of FIG. 8; the 'Users & Roles' UI element 1062 of FIG. 10A can be the same as or similar to the users and roles UI element 862 of FIG. 8; and/or the 'Security' UI element 1066 of FIG. 10A can be the same as or similar to the security UI element 866 of FIG. 8; etc.

As illustrated in the example fleet map GUI 1000a of FIG. 10A, a fleet map interface element 1002 can correspond to presentation of a fleet map within a primary interface or display area 1015 of the GUI 1000a. In some embodiments, the fleet map display area 1015 can correspond to (e.g., may be the same as, similar to, include one or more elements of, etc.) the fleet map display area of the example fleet map GUI 800 of FIG. 8. For instance, the fleet map 1000a of FIG. 10A can include a plurality of connected device filter options/elements 1030 for filtering the display of connected devices or assets within the fleet map main display area 1015. The connected device filter elements 1030 can be the same as or similar to the plurality of filtering UI elements 810, 832, . . . , 835-3 of FIG. 8.

For instance, a connectivity filter element 1031 can be the same as or similar to the satellites filter element 832 of FIG. 8; an edge units filter element 1032 can be the same as or similar to the edge compute units filter element 810 of FIG. 8; a cameras filter element 1034 can be the same as or similar to the cameras filter element 834 of FIG. 8; a sensors filter element 1036 can be the same as or similar to the sensors filter element 836 of FIG. 8; a robots filter element 1038 can be the same as or similar to the robots filter element 838 of FIG. 8; a drones filter element 1039 can be the same as or similar to the drones filter element 839 of FIG. 8; a vehicles filter element 1037 can be the same as or similar to the vehicles filter element 837 of FIG. 8; etc.

In some embodiments, the fleet map GUI 1000a of FIG. 10A includes health status information that is the same as or similar to the health status information of the fleet map GUI 800 of FIG. 8. For instance, the healthy status element 1035-1 can be the same as or similar to the healthy status element 835-1 of FIG. 8; the attention status element 1035-2 can be the same as or similar to the attention status element 835-2; the critical status element 1035-3 can be the same as or similar to the critical status element 835-3 of FIG. 8; etc.

Figure 10B:
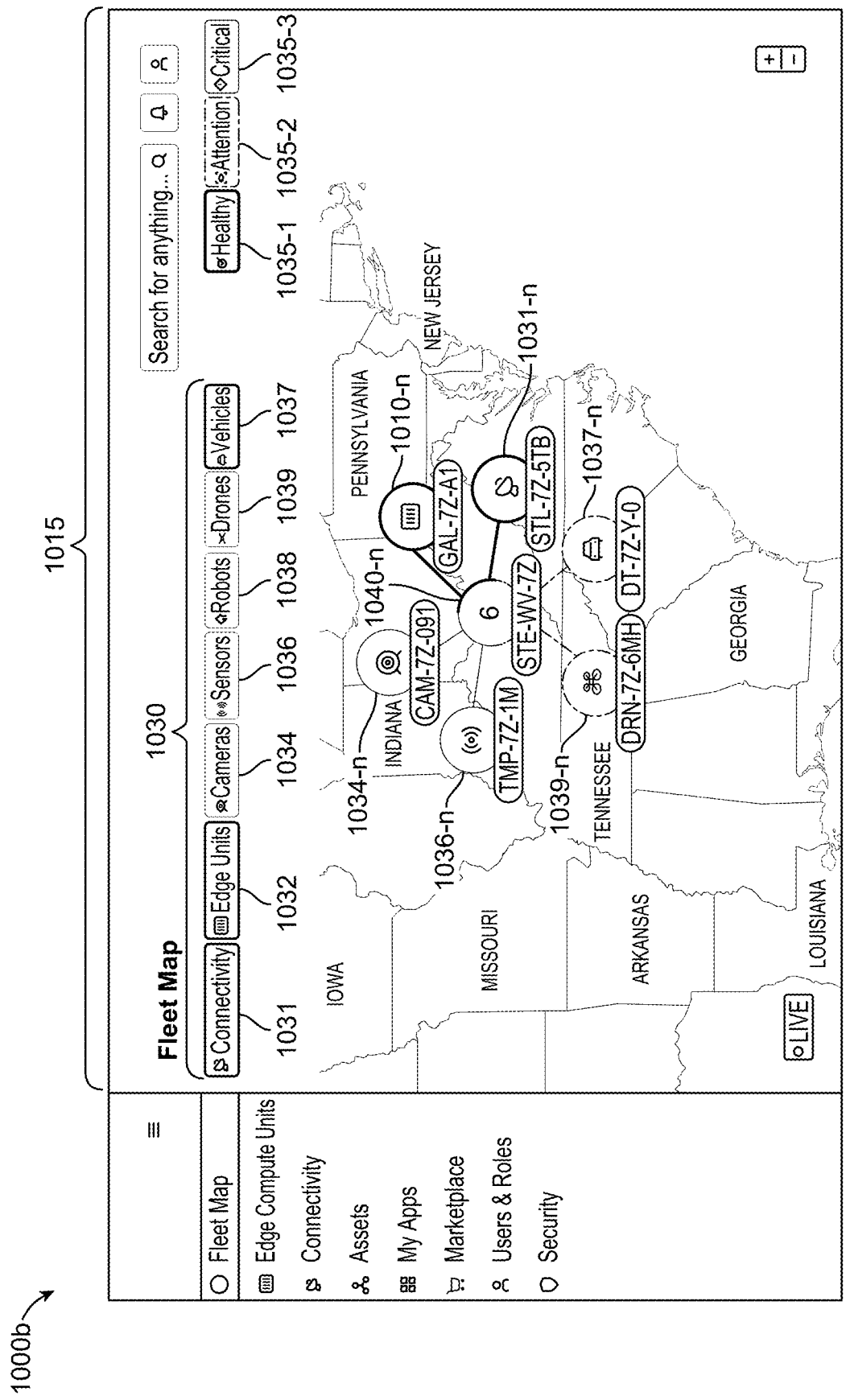
FIG. 10B is a diagram illustrating an example fleet map GUI that includes one or more edge site GUI elements indicative of a group of connected assets of an edge deployment, in accordance with some examples.
Figure 11A:
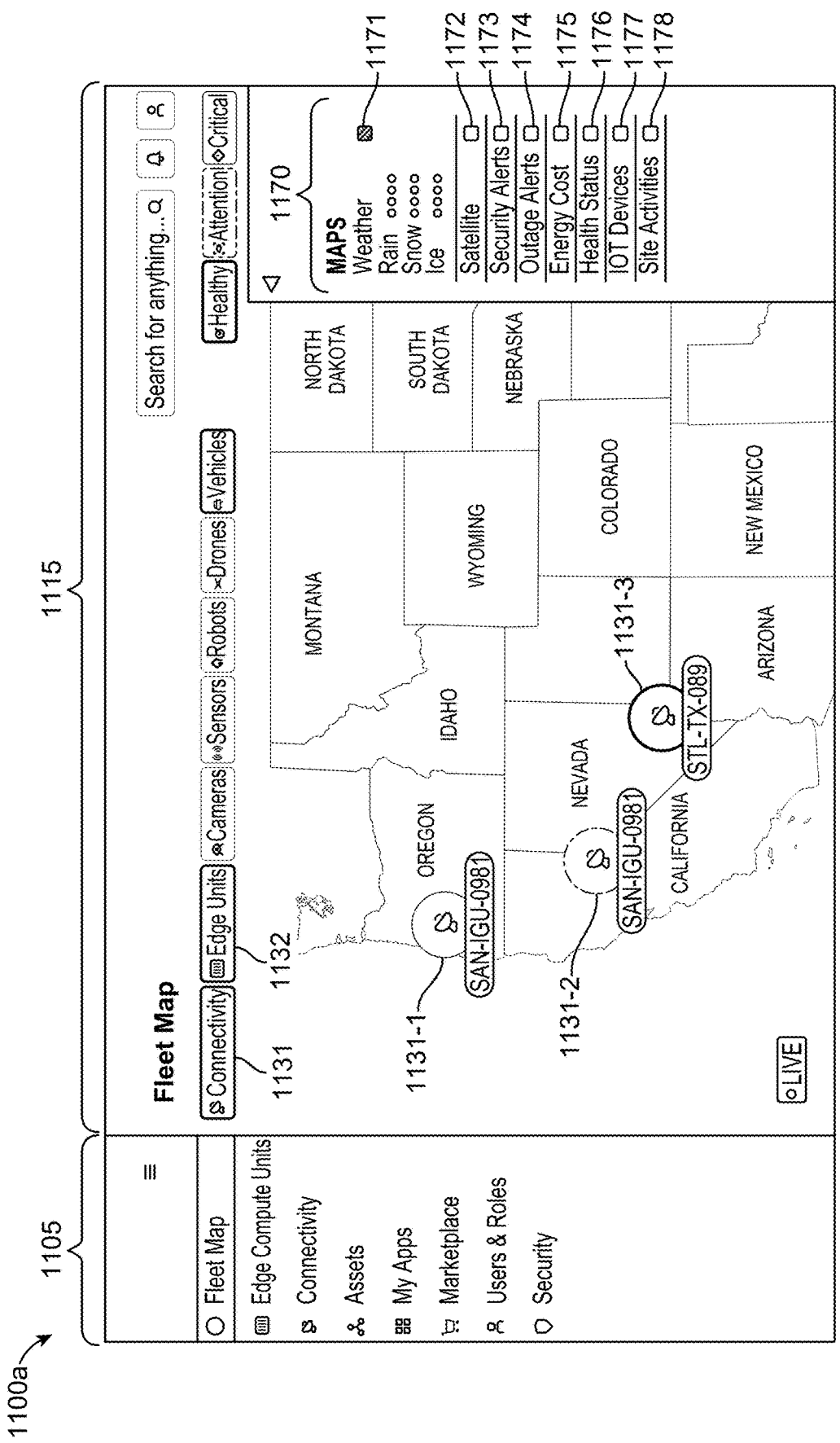
FIG. 11A is a diagram illustrating an example fleet map GUI configured with an overlay layer indicative of weather information corresponding to one or more locations of edge deployed assets, in accordance with some examples.
Figure 11B:
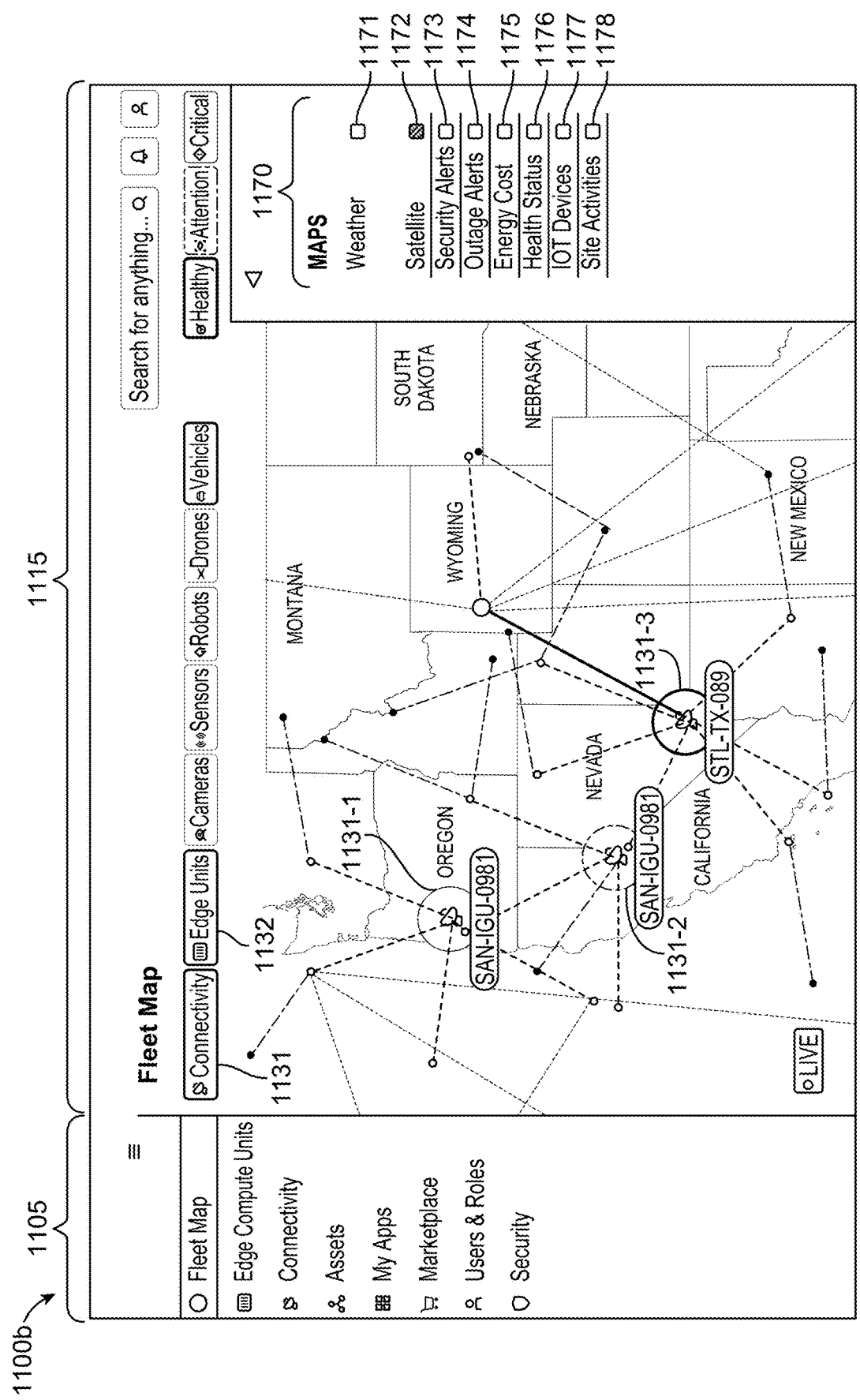
FIG. 11B is a diagram illustrating an example fleet map GUI configured with an overlay layer indicative of satellite connectivity information corresponding to one or more locations of edge deployed assets, in accordance with some examples.
Figure 11C:
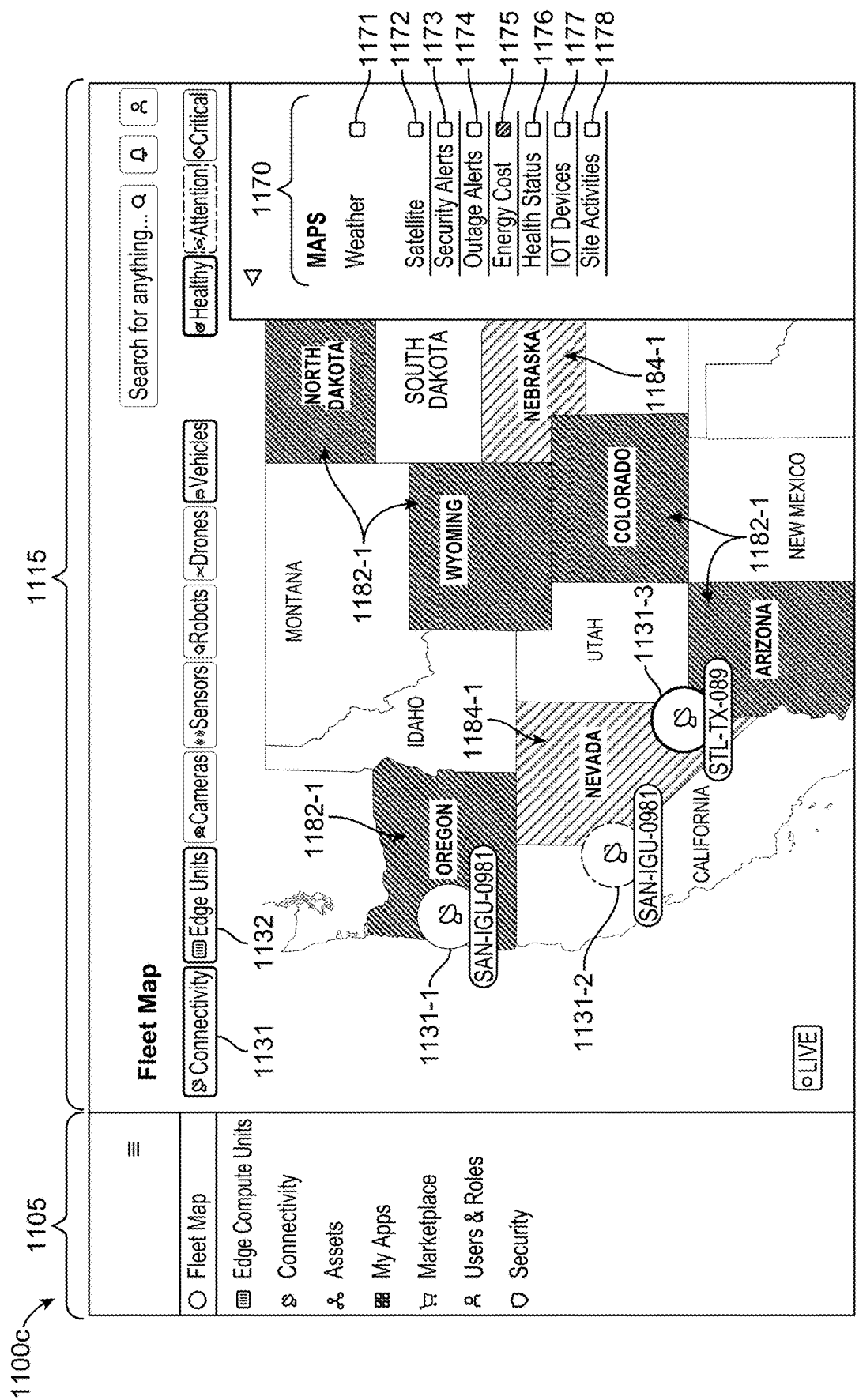
FIG. 11C is a diagram illustrating an example fleet map GUI configured with an overlay layer indicative of energy cost information corresponding to one or more locations of edge deployed assets, in accordance with some examples.
Figure 12A:
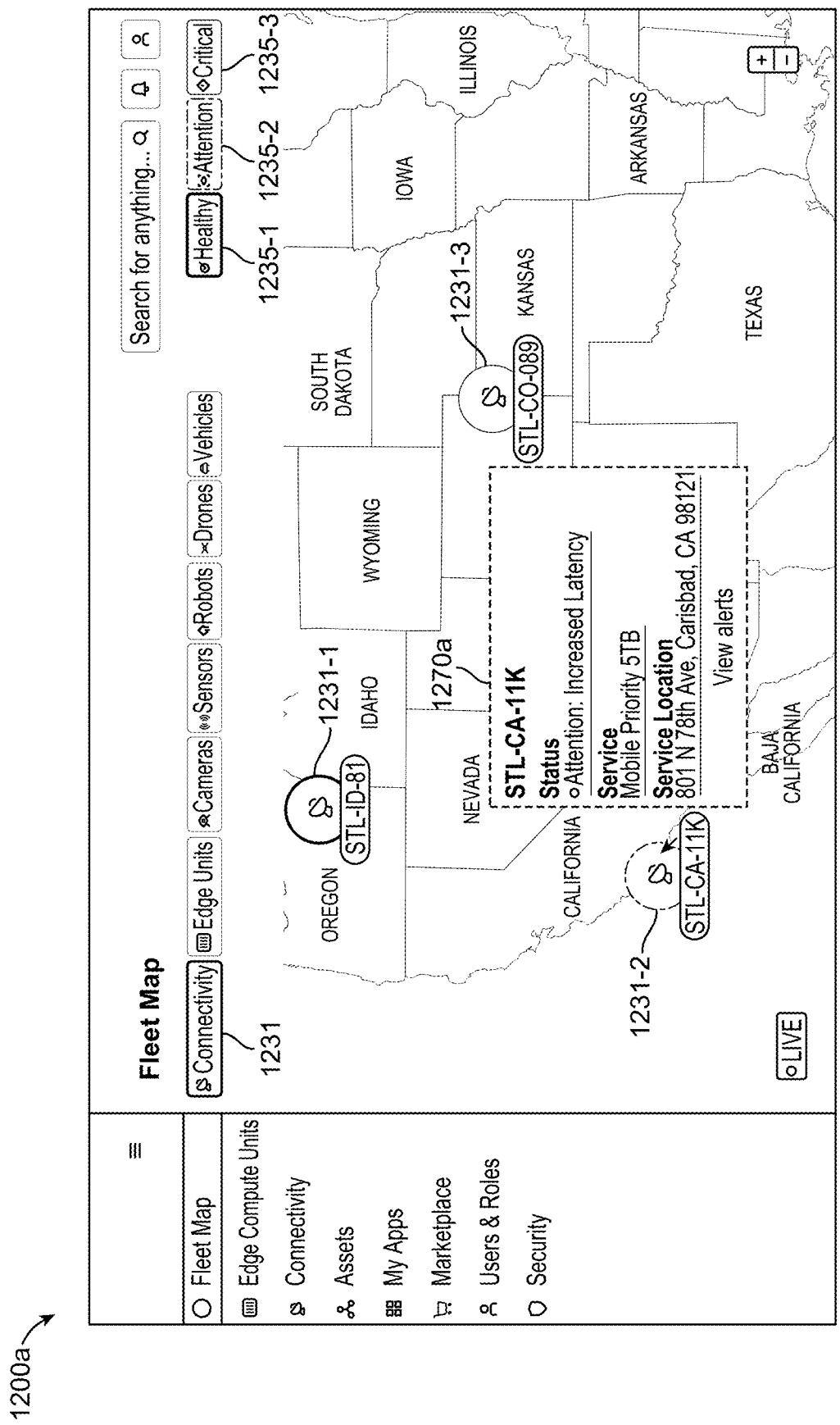
FIG. 12A is a diagram illustrating an example fleet map GUI including summary card information for a selected edge asset or group of connected edge assets, corresponding to summary information of a satellite internet constellation terminal, in accordance with some examples.
Figure 12B:
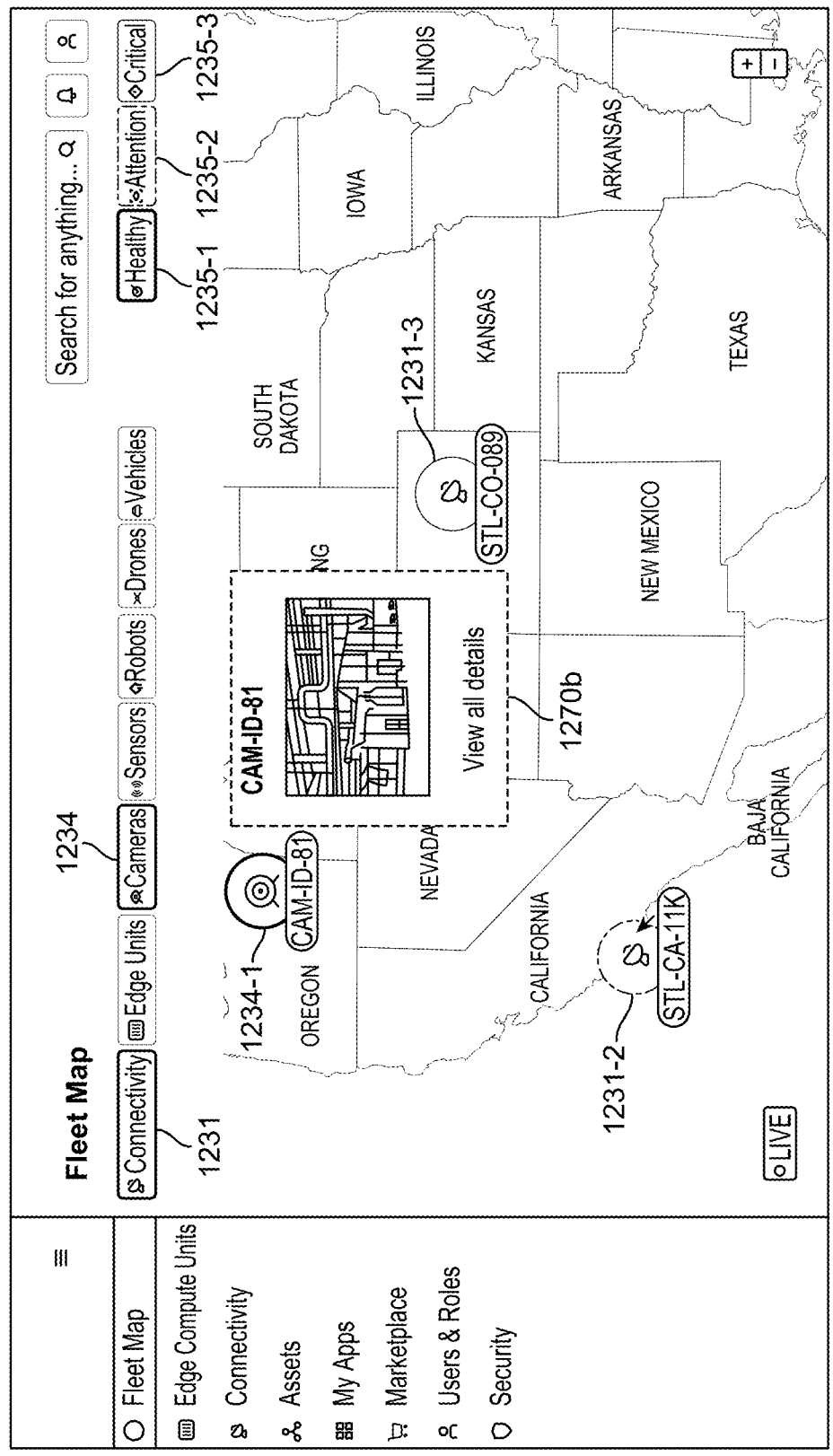
FIG. 12B is a diagram illustrating an example fleet map GUI including summary card information for a connected asset, including a live or real-time streaming data feed from the connected asset, in accordance with some examples.
Figure 12C:
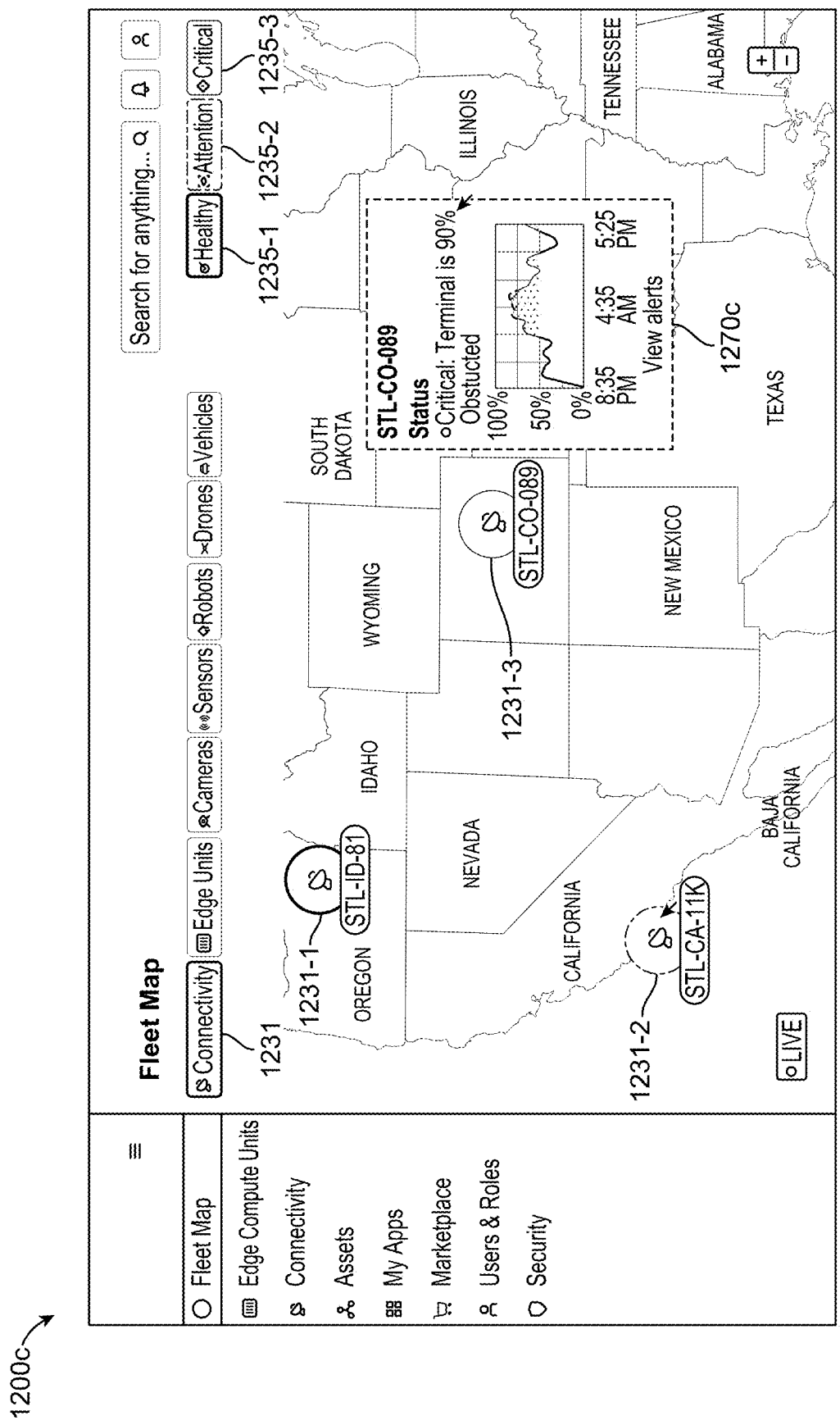
FIG. 12C is a diagram illustrating an example fleet map GUI including summary card information for a satellite connectivity terminal experiencing critical obstruction and depicting corresponding obstruction level information, in accordance with some examples.
Figure 14:
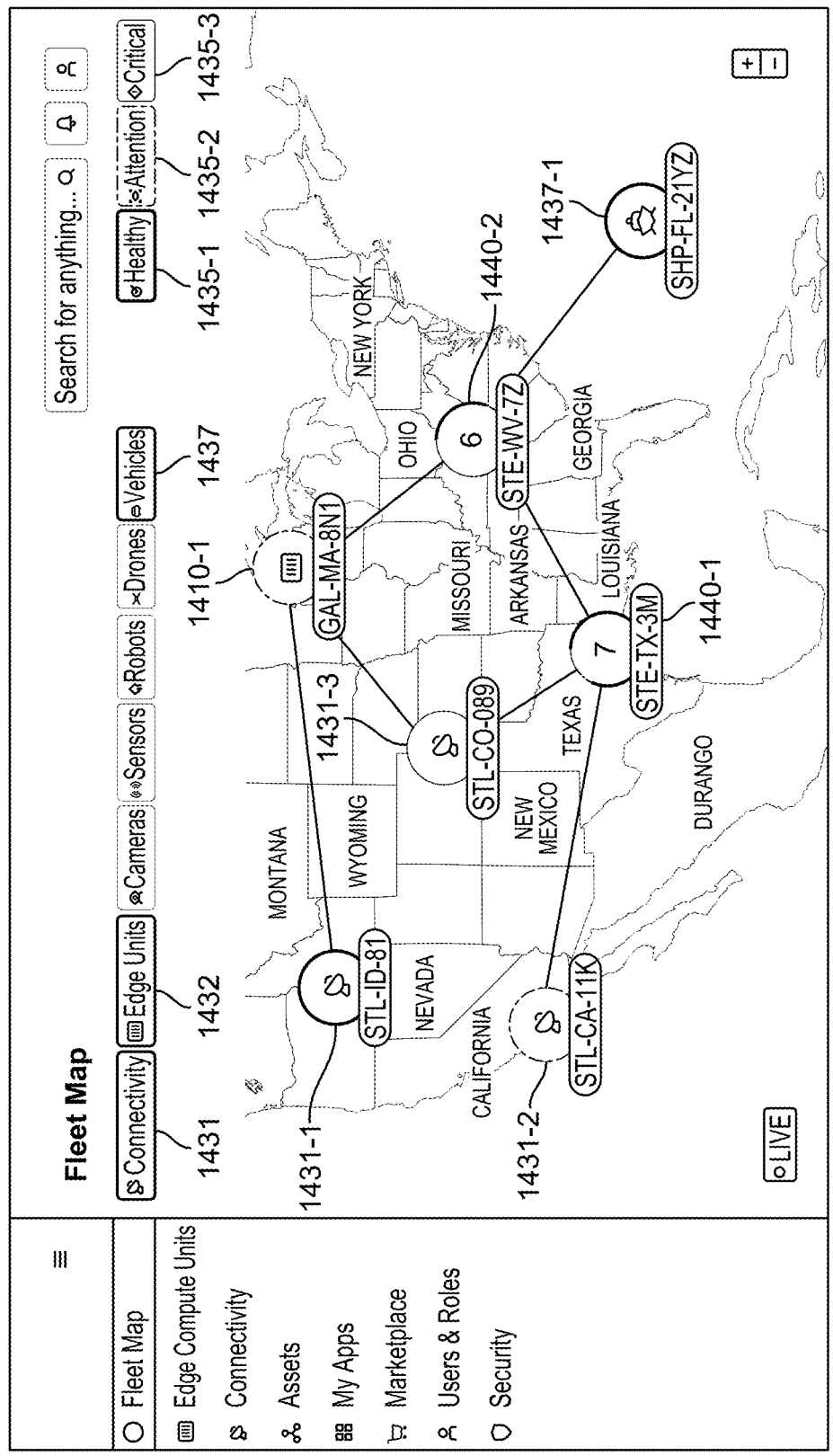
FIG. 14 is a diagram illustrating an example fleet map GUI depicting various forms of connections between deployed edge assets and groups or sites of connected edge assets, in accordance with some examples.

As contemplated herein, the fleet map GUIs 800 of FIG. 8, 900 of FIG. 9, 1000a of FIG. 10A, 1000b of FIG. 10B, 1100a of FIG. 11A, 1100b of FIG. 11B, 1100c of FIG. 11C, 1200a of FIG. 12A, 1200b of FIG. 12B, 1200c of FIG. 12C, 1300 of FIG. 13, 1400 of FIG. 14, etc., may be different fleet map GUIs that are rendered, output, or otherwise presented by the same underlying fleet map system or fleet map engine. Same or similar UI elements across the example GUIs of FIGS. 8-14 may be indicated using like or similar reference numerals, and description made with reference to a reference numeral of a particular figure may be applied equally to the corresponding reference numeral(s) and associated elements thereof in the remaining fleet map GUI figures.

For instance, each of the example fleet map GUIs of FIGS. 10A-14 may include the same or similar interface elements 1005 shown in the left-hand column of each respective fleet map GUI. Each of the example fleet map GUIs of FIGS. 10A-14 can include a same or similar 'Connectivity' filter element such as the connectivity filter element 1031 of FIG. 10A. For example, the connectivity filter element 1031 shown in FIG. 10A is the same as the connectivity filter element 1031 shown in FIG. 10B, etc. Moreover, the connectivity filter element 1031 of FIGS. 10A and 10B can be the same as or similar to the corresponding connectivity filter element 1131 of FIGS. 11A, 11B, 11C; can be the same as or similar to the corresponding connectivity filter element 1231 of FIGS. 12A, 12B, 12C, 13; can be the same as or similar to the corresponding connectivity filter element 1431 of FIG. 14; etc.

As will be described in greater depth below, the presently disclosed fleet maps (e.g., the example fleet map GUIs 1000a-1400 of FIGS. 10A-14, respectively) can be used to provide real-time, dynamic, and flexible user interfaces that allow enterprise users with large deployments of remote operations and assets to observe, manage and control these remote operations and assets from a single-pane-of-glass representation accessible through the cloud (e.g., the fleet map). In particular, the presently disclosed fleet maps 1000a-1400 can be used to observe, manage, and control, etc., one or more of an enterprise user's assets, resources, personnel, etc.; moreover, the fleet map can be used to gain immediate and actionable insights into the physical, operational, environmental, and/or security conditions and status of the globally-distributed assets and operations represented in the one or more fleet map GUIs.

The fleet map can be generated, rendered, displayed, presented, updated, etc., in real-time (e.g., as a live fleet map). For instance, the fleet map can be configured to continuously update with data streaming from millions of different sources (e.g., including, but not limited to: Internet-of-Things (IoT) devices; Industrial IoT (IIoT) devices; sensors; cameras or other imaging devices; machines and equipment; ML or AI-generated inputs; ML or AI-augmented inputs; ML/AI and/or human-augmented inputs; data aggregation sources/layers; data batching sources/layers; data streaming sources/layers; data processing sources/layers; etc.)

The fleet map can be rendered and presented dynamically, such that a user of the fleet map interface (e.g., UI, GUI, etc.) can dynamically zoom in or out on different geographic regions of interest, can interact with map markers and/or overlay layers to gain additional insights into the status of assets, personnel, and/or operations, etc. The fleet map can be rendered and presented in a flexible manner that is based at least in part on one or more user-configured preferences (e.g., configured in advance) and/or one or more user-indicated preference (e.g., configured in substantially real-time via an input to the fleet map GUI, etc.). The user preference configuration of the fleet map can drive the adjustment of the presented fleet map content to be relevant to the user in real-time. Fleet map content and/or overlays, for example, can respond automatically to various different triggers, conditions, events or scenarios, etc. The fleet map content and overlays can be configured to provide information in various different levels of granularity, from individual asset-level details, to increasingly greater degrees of aggregation and summarization corresponding to groupings and/or relationships of or between (respectively) multiple connected assets within the fleet (e.g., multiple assets can be grouped under a representation of one machine, multiple machines can be grouped under a representation of one process, multiple processes can be grouped under a representation of one site, multiple sites can be grouped under a representation of a region, etc.).

As used herein, the term "asset(s)" may be used to refer to devices, personnel, machines, hardware, and software including databases and applications that emit, transfer, and transform data. As used herein, the term "operation(s)" may be used to refer to the various processes, workflows, and other activities (and/or combinations thereof) that are carried out in service of a business objective. Assets and operations can be described with characteristics such as health, status, condition, and can be measured with appropriate units, for example degrees Celsius from a temperature sensor, or daily yield in tons from a precious metals mine, etc.

The discussion of the example fleet map GUIs 1000a-1400 of FIGS. 10A-14, respectively, is organized into the following sections: (i) Data sources; (ii) Data flow; (iii) Data types and presentation; (iv) Data volume and data freshness; (v) Data zoom and aggregation; (vi) Filtering, grouping, and overlays; (vii) Summary cards; (viii) Live alerts; (ix) Connections for assets and sites. These features and more are discussed in turn below.

Fleet Map: Data Sources—Physical, logical, derived, and augmented data points

Various fleet map views (e.g., including the fleet map GUI views 1000a-1400 of FIGS. 10A-14, respectively) can be generated and/or rendered based on ingesting data from a variety of different sources. The data ingestion sources can be streaming or real-time data sources; can be static databases, repositories, sources, etc.; can be derived, processed, analyzed, generated data sources; etc. In general, a fleet map engine (e.g., used to generate and output the fleet map GUI view(s), also referred to as a fleet map rendering engine, etc.) can be configured to obtain and utilize data that originated from a variety of sources, including one or more (of all) of: physical assets, online resources and databases, private/intranet-hosted resources and databases, applications and analytics, human inputs, transformation layers (e.g., data aggregators, compilers, summarizers, etc.), digital and/or hardware infrastructure components such as networks and servers, etc. In one illustrative example, various components and elements described previously herein, with respect to FIGS. 1-9, may be utilized as data sources for generating or rendering a fleet map GUI (e.g., including fleet map GUIs 1000a-1400, etc.).

Various example data sources for rendering the fleet map GUI views are described below:

Physical Assets: Physical asset data sources for feeding the fleet map generation engine can include various different IoT devices, IIOT devices, sensors, machines, vehicles with sensing capabilities, etc. The physical asset data sources associated with the fleet map may comprise an arbitrarily large array, based on the dynamic scalability of the presently disclosed fleet map generation. The spectrum of physical assets can include granular and/or single-purpose devices such as sensors (e.g., temperature sensors, pressure sensors, flow0rate sensors, vibration sensors, humidity sensors, luminosity sensors, etc.), as well as any other sensor(s) described or otherwise contemplated herein. For instance, the physical asset data sources used to feed fleet map generation may include one or more of: the autonomous robots 416, local site cameras 414, environmental sensors 412, and/or edge assets 410 of FIG. 4; the edge assets 710-1, . . . , 710-N of FIG. 7; the user device 795 of FIG. 7; the various connected assets 820 of FIG. 8; the various connected assets associated with the connected asset filter UI elements 1030 of FIGS. 10A and 10B; etc. The spectrum of physical asset data sources can further include multi-modal and higher-level devices that produce more complex data or house multiple sensing devices and modalities (e.g., such as vehicles 1037, drones 1039, robots 1038, industrial machines and equipment, etc.).

Digital and Infrastructure Components: Hardware and software components can report their own operational metrics and status. For example, network gear such as satellite terminals (e.g., satellite terminals 1031-1, 1031-2, 1031-3, etc.), switches and routers, hardware appliances such as datacenters (including Armada's Galleons), power management units, servers, storage disks, operating systems, applications, and/or application runtimes such as container and orchestration engines (e.g. Docker, Kubernetes, etc.) can be configured as self-reporting data sources for transmitting their respective operational metrics and status information to a fleet map generation/rendering engine. In some aspects, the digital and infrastructure component operational metrics and status information can be obtained from the local database 436 of FIG. 4; the telemetry and monitoring observer engine 530 of FIG. 5; the remote fleet management control plane 520 and/or secure edge OS 510 of FIG. 5; the telemetry and monitoring observer engine 630 of FIG. 6; the device/asset lifecycle management service 670 of FIG. 6; the edge OS 615 of FIG. 6; bare metal services 617 of FIG. 6; the telemetry and monitoring stack 635 of FIG. 6; the fleet management daemon 673 of FIG. 6; the SDN network configuration service 660 and/or SDN network provisioning and management engine 665 of FIG. 6; etc.

Online Resources and Databases: The fleet map can be fed with data obtained from online resources and databases, APIs, databases or data warehouses, various other resources that can be queried on demand, various other resources that can push data and updates over various internet protocols, etc. For instance, information obtained from online resources and databases, and displayed in the fleet map GUI view(s) can include, but is not limited to: weather information (e.g., such as weather information associated with the weather overlay fleet map GUI 1100a of FIG. 11A); seismic activity information; satellite location and condition information (e.g., such as the satellite overlay information associated with the satellite overlay fleet map GUI 1100b of FIG. 11B); energy cost or pricing information (e.g., such as energy cost information associated with the energy cost overlay 1100c of FIG. 11C); and/or various other data exchanges and platforms, etc. In examples where network gear such as the satellite terminals 1031-1, 1031-2, 1031-3 report operational metrics and status information to the fleet map, the corresponding data source can be provided as the satellite edge connectivity management engine 680 of FIG. 6, etc. In some embodiments, the online resources and databases data source inputs for the fleet map can include one or more of the data center 340 of FIG. 3, the local database 436 of edge compute unit 430 of FIG. 4, and/or the knowledge base and local datastore 545 of FIG. 5, etc. In some cases, the online resources and databases source inputs for the fleet map can additionally, or alternatively, include one or more of the fleet datastore 747, metrics datastore 749, metrics datastore 742, etc., of FIG. 7.

Applications and Analytics: The fleet map can be fed with data obtained from various applications, analytics engines or services, and/or various other software services. For instance, the applications and analytics data sources for feeding the fleet map can be software data sources that can produce derived and computed data based on various inputs, including data from other sources listed or described herein. For instance, the applications and analytics data sources can comprise software applications and/or analytics pipelines that are configured to transform multiple inputs to compute a derived value, for example an application that takes inputs from hundreds of sensors aboard a vehicle to determine whether the vehicle is operable or is inoperable due to critical conditions in physical components and control units, etc. In some aspects, the applications and analytics data sources for feeding the fleet map can include, but are not limited to, one or more of: the application repository 650 and/or user and platform applications 655 of FIG. 6; the cloud services 432 of FIG. 4; the AI/ML training clusters 470 of FIG. 4; the domain-specific application services 560 of FIG. 5; the native/platform applications 540 of FIG. 5; the cloud user environments 690 of FIG. 6; etc. In further examples, the applications and analytics data sources for feeding the fleet map can include one or more of the provisioning service 724, device lifecycle management service 670, edge observer 760, host-level telemetry 737, critical environment monitoring 739, fleet management daemon 673, log archival agent 775, fleet management client 770, etc., that are each depicted in FIG. 7.

Human Inputs: The fleet map can be fed with data obtained from various human input sources. For instance, human input data sources can provide data points that are manually contributed by the personnel associated with an organization or any of its operations. For example, an operator in the field can provide information (e.g., data points, etc.) indicative of one or more identified physical security threats at a site (e.g., a local edge site 402, etc.). In another example, a technician can evaluate that a machine in a factory is unsafe to operate. In another example, an IT specialist can indicate a cyber-security attack on the networking infrastructure at one or more sites, etc.

Data Aggregators, Processors, Transformers: The fleet map can be fed with data obtained from various data aggregators, data processors, and/or data transformers. For instance, the data aggregators, processors, transformers data source types can include, but are not limited to, various hardware and software components that control the flow and content of data along a path from the data creation point to the data presentation on the fleet map GUI view(s). The data transformers can be simple or advanced data transformers. For instance, the data transformers can include one or more ML/AI models that are configured to classify vehicles in a video stream, and to transform the video stream by rendering the automatically identified or detected bounding boxes and corresponding labels around each detected object (e.g., vehicle) within the video stream frames. In another example, an efficiency-oriented hardware device can collect data from an attached flow-rate sensor every second, and may be configured to cache the collected data for 24 hours before subsequently compressing and uploading the data at a once daily interval (e.g., thereby saving on power consumption and bandwidth usage in constrained environments). In some aspects, the data aggregators, processors, transformers data sources for feeding the fleet map may include one or more of: the HPC engine 434 of FIG. 4; the ML/AI model inference instance 435-1, . . . , 435-N of FIG. 4; the ML/AI model retraining instance 433-1, . . . , 433-K of FIG. 4; the ML/AI model finetuning instance 434-1, . . . , 434-M of FIG. 4; the domain-specific application services 560 of FIG. 5; the connector services 677 of FIG. 6; etc.

Fleet Map: Data Flow

The presently disclosed systems and techniques for providing the various fleet map GUI views can be configured to ingest and process large volumes of data (e.g., based at least in part on factors such as the size of the fleet of connected devices/assets being depicted in the fleet map GUI views, the data generation rate(s) and reporting frequency of the various connected devices/assets, etc.). A vast volume of data, and a variety of different data types, may be included in the plurality of data points that are ingested and used to enable the fleet map GUI views to be generated and rendered for display. The collective data volume associated with the fleet map can be referred to herein as the "ingested data," "underlying data," "source data," "fleet map data catalog" or "data catalog," etc.

The source data for the fleet map may be collected, transmitted, processed, stored, and presented using a wide range of different connected devices/assets, protocols, media, processes, etc. Provided below is a description of how the systems and techniques described herein can be configured to collect, aggregate, store, analyze, and/or query massive amounts of data to enable various fleet map experiences and/or various fleet map GUI views.

Data Collection: In general, it is contemplated that thousands of types of sensors and machines (e.g., included in a fleet of connected devices or assets underlying the fleet map depiction and/or providing the source data thereof) emit various types of data-structured and unstructured, high- and low-resolutions and frequencies, and representing various details and characteristics, etc. In some embodiments, the presently disclosed fleet map can support the representation of all physical and digital assets of the various types and/or data types, given that a known interface for communicating with a given physical or digital asset is available or can otherwise be developed to interact with and/or receive data/send commands to the appliance (e.g., the given physical or digital asset being configured for data ingestion to the fleet map).

In some examples, simple sensors within the fleet of connected devices/assets underlying the fleet map may emit scalar data, while more complex systems produce unstructured payloads. By serializing the data emitted by either a simple sensor/scalar data source or by a complex system/unstructured payload source, both types and formats of input data can be serialized into a transmissible digital protocol and are therefore eligible for inclusion in the fleet map data catalog (e.g., underlying source data for generating the various fleet map GUI views).

In some embodiments, it is contemplated that one or more connected assets or devices (e.g., data sources associated with the fleet map data catalog, including any one of the various data sources described above in the "Fleet Map: Data Sources" section) can be directly connectable using an available network media or protocol. For instance, one or more connected assets or devices can provide data points for the fleet map data catalog based on directly connecting with an available network media such as Ethernet, 5G NR or 4G LTE cellular, WiFi, Bluetooth, etc., among various other network media and/or communication protocols.

In some aspects, one or more sensors or other connected assets/devices may be embedded within a larger system that brokers the data communication for transmitting data points for inclusion in the fleet map data catalog. In some embodiments, near field communications (NFC) can be used for the transmission of data points for the fleet map data catalog, for instance based on considerations or requirements such as power constraints at a local edge site 402, edge compute unit 410, etc., as shown in FIG. 4.

In some examples, one or more sensors or other connected assets/devices (e.g., one or more fleet map data catalog data sources) can be configured to continuously sense and emit (e.g., transmit) data points for inclusion in the fleet map data catalog, while other ones of the fleet map data catalog data sources may periodically sample data, periodically transmit data, compress the data, cache and batch transmit the data, and/or perform various other steps or operations before emitting (e.g., transmitting) their respective sensed data. In some examples, data can be sensed continuously, but periodically transmitted, cached and batched, compressed, etc.

In some embodiments, some (or all) of the sensed data and data points of the fleet map data catalog may be timestamped. For instance, at least a portion of the fleet map data catalog data points may include native timestamp information that is generated and appended to the data point by the sensor or other data source that generated or measured the respective data point. In another example, a portion of the fleet map data catalog data points may lack native timestamp information, in which case the fleet map ingestion engine(s) or ingestion agent(s) can be configured to generate a synthetic timestamp for each data point received without native timestamp information. A synthetic timestamp may be a timestamp value indicative of the time the data point was received or ingested. In some embodiments, the synthetic timestamp may be an automatically generated value indicative of a predicted time at which the corresponding non-natively timestamped data point was first measured or generated at its respective source sensor or connected device/asset. In some embodiments, where timestamps of data collection vs. transmission are available and distinct, the systems and techniques described herein for implementing the fleet map GUI views can correctly account for data capture vs. data transmission temporal gaps to analyze and display metrics and alerts based on the actual time of data capture.

In some aspects, it is contemplated that—in addition to the various sensors, machines, and other physical or infrastructure data sources described above-one or more virtual and digital appliances may also generate and emit data that is relevant for inclusion in the fleet map data catalog and/or for inclusion or display in a fleet map GUI view. For example, operating systems collect data corresponding to the respective host hardware (including CPU, GPU, memory, storage and networking metrics), as well as virtual concepts such as virtual machines, containers, applications, and application orchestrators. This virtual or digital appliance-originated data can also be collected via agent and agentless mechanisms for inclusion in the fleet map data catalog and/or fleet map GUI views described herein, for instance being used to render notions such as capacity and utilization on the fleet map GUI views, etc. (e.g., the utilization UI elements 920, 928, 930, 938, 940, 948, 970, 978, etc. depicted in the example fleet map GUI 900 of FIG. 9; etc.).

Data Aggregation: As noted previously above, one or more portions of the ingested data points comprising the fleet map data catalog can be obtained from data aggregators or other data aggregation sources. For instance, in certain industrial deployments, data may be ported through existing Supervisory Control and Data Acquisition (SCADA) systems that are used to aggregate and prepare datasets from a plurality of input data points or input data streams, etc. In another example, one or more assets, devices, sensors, etc., can be connected to an edge computing device or containerized edge data center unit as have been previously described herein—in such examples, the edge computing device can be configured to act as an aggregation point that generates one or more aggregate data sets or data streams corresponding to the individual data points or data streams generated by each connected device.

For instance, in one illustrative example, the edge compute unit 430 of FIG. 4 can be configured to act as an aggregation point for generating aggregate fleet map data catalog data. In particular, the edge compute unit 430 can act as an aggregation point for data points or data streams generated by various edge assets 410 that are provided at the same local edge site 402 as the edge compute unit 430 and/or that are otherwise connected to the edge compute unit 430 via the local network 420 provided by the edge compute unit 430. For example, the edge compute unit 430 of FIG. 4 can act as an aggregation point for data generated by the autonomous robots 416 (e.g., onboard camera feed data or streams), the local site cameras 414 (e.g., local camera frames or feeds), the environmental sensors 412 (e.g., sensor data streams), etc.

In some aspects, different edge sites (e.g., such as the local edge site 402 of FIG. 4) may utilize different SCADA systems and/or may utilize different combinations of SCADA systems. As contemplated herein, the presently disclosed fleet map systems and techniques can be configured to integrate into the fleet map data catalog information obtained from across various data aggregators, aggregation points, and configurations thereof, into a unified backend implementation for the fleet map GUI view generation and fleet map data catalog generation, maintenance, updating, etc.

Data Transfer: In some embodiments, the fleet of connected assets/devices used to feed the fleet map GUI view generation and/or used to populate the fleet map data catalog can include one or more connected assets/devices that are provided at an edge location that includes one or more on-site edge computing devices (e.g., such as the on-site edge compute unit 430 associated with the local edge site 402 of FIG. 4). In such embodiments, where one or more edge compute units are present on-site at the edge, sensor data can be transferred directly from SCADA systems onto the edge compute unit for processing and model inferencing.

For instance, sensor data can be transferred directly from SCADA systems associated with one or more of the edge assets 410 and onto the edge compute unit 430 for processing and model inferencing (e.g., associated with and/or implemented using one or more of the HPC engine 434 or ML/AI model inferencing instances 435-1, . . . , 435-N of the edge compute unit 430 of FIG. 4).

As contemplated herein, in at least some examples, much of the operational value of sensor data at the edge can be extracted effectively and efficiently at the local edge sites 402 that are associated with particular edge compute unit 430 deployments. In these instances, the edge compute unit 430 can be configured to ingress, analyze, and react/respond to ingested or derived data from thousands of connected assets (e.g., data from thousands of connected edge assets 410 on the local network 420 of the edge compute unit 430 of FIG. 4).

Ingested data at the edge compute unit 430 can additionally be stored (e.g., stored locally on the local database 436 of the edge compute unit 430) and/or can be forwarded to fleet map back-end systems for presentation on the fleet map GUI view(s) described herein (e.g., forwarded on the internet backhaul 440, etc.). In one illustrative example, the edge compute unit 430 can be configured to intelligently determine an optimal amount and cadence of data transfer from each one of the connected edge assets 410 that are used to feed the fleet map data catalog. For instance, the edge compute unit 430 can determine the optimal amount and cadence of data transfer based on factors that can include, but are not limited to, one or more of nature, size, and frequency of data ingestion, local analytics corresponding to or indicative of health and status information of assets and operations, availability of bandwidth for the transfer or uplink, and/or various other network prioritization considerations, etc.

In some aspects, a particular asset displayed on a fleet map GUI view can be selected (e.g., by a user or viewer of the fleet map GUI view) for more detailed expansion or inspection. In some embodiments, the asset being scrutinized on the fleet map GUI view can provide live connectivity to stream its respective data for presentation in the detailed expansion or inspection view of the fleet map GUI. For instance, when an asset 410 is being scrutinized on the fleet map, notification messages may be brokered between the fleet map backend, the local edge compute unit (e.g., edge compute unit 430) associated with the selected asset 410, and the selected asset 410 itself. Based on brokering the notification messages between these three entities, live (e.g., real-time) connectivity can be established for continuous data streaming for output or presentation of the streaming asset data within the fleet map GUI view.

For instance, the example fleet map GUI view 1200b of FIG. 12B presents an example of a detailed inspection view 1270 for a selected camera asset 1234-1 (e.g., configured for display on the fleet map GUI view based on the camera filtering UI element 1234). Based on brokering notification messages between the fleet map backend used to generate the fleet map GUI view 1200b, the edge compute unit associated with the selected camera asset 1234-1, and the selected camera asset 1234-1 itself, data connectivity can be established for continuous data streaming of the captured camera frames obtained by the camera asset 1234-1. In particular, the captured image frames from camera asset 1234-1 can be transmitted (e.g., streamed in real-time) from the camera asset 1234-1 to the fleet map GUI backend for rendering a live view of the camera feed within the fleet map GUI view 1200b detailed inspection view element 1270.

In examples where a sensor, connected asset/device, or other data source is present at a deployment site (e.g., local edge site 402 of FIG. 4, or other site) where an edge compute unit 430 is either not provided or is not available, the systems and techniques can be configured to ingest the corresponding sensor data from a local aggregation point or other storage unit/device. For instance, the data can be uploaded to the fleet map backend from a local aggregation point associated with (and available to) the sensor, connected asset/device, or other data source in question. In some embodiments, the data can be uploaded from the local aggregation point through an available network connectivity (e.g., such as satellite internet constellation connectivity, provided by a satellite transceiver or satellite terminal).

The data may be uploaded via the available network connectivity (e.g., satellite internet constellation) directly from the local aggregation point to a fleet map backend server, to a cloud storage associated with the data aggregator, to a customer's own cloud premises, and/or various combinations thereof, etc. In some examples, when data is uploaded without intermediation provided by an edge compute unit (e.g., edge compute unit 430), the fleet map can communicate with the same device or storage location that provides the entry point for the uploaded data into the network associated with the fleet map backend. For instance, the fleet map backend can communicate with a local edge aggregation point to obtain the sensor data, can communicate with a cloud aggregation and storage unit, etc., in order to populate and present the data within a fleet map GUI view and/or to populate the data into the fleet map data catalog.

In some aspects, the data transfer can be optimized for remote edge deployments and with regard to various connectivity constraints thereof. For example, data transfer optimizations for ingestion to the fleet map data catalog and/or fleet map backend can be implemented based on: batching data in times of low connectivity and/or high latency, for later transmission of the batch(es); prioritizing streaming of mission critical data (e.g., data from emergency management or physical integrity sensors, such as those associated with the critical environment monitoring 739 of FIG. 7, etc.); using one or more ML/AI models to synthesize missing data in weak connectivity scenarios; using a live channel to stream data from a specific (e.g., selected or configured) asset in response to a user clicking into the specific asset on the fleet map GUI view; etc.

Data Transformation: At least a portion of the sensors, connected assets/devices, and/or other data sources included in the fleet of devices underlying the fleet map and fleet map data catalog may emit raw (e.g., unprocessed) data. For example, the momentary reading from a temperature sensor constitutes raw data. In some embodiments, raw data can be augmented with device and time metadata (e.g., device ID and timestamp information) and transmitted to the fleet map backend for ingestion to the fleet map data catalog as is. In other examples, data can be transformed based on applying one or more data transformation operations prior to (or concurrent with) the transmission and ingestion of the data to the fleet map backend and/or fleet map data catalog.

For example, data transformation operations applied to data for ingestion to the fleet map backend or fleet map data catalog can include unit conversions for downstream compatibility, averaging for removal of jitter, down-sampling for increasing transmission speed and efficiency, etc. More complex data transformation operations applied to data for ingestion to the fleet map backend or fleet map data catalog can include various degrees of analytics, augmentation, summarization, computation, or changes in data format, type, structure, etc. For instance, example data transformation operations can include, but are not limited to, one or more of the transformation of video frames into a time-stamped list of detected known objects and persons using an ML/AI object detection and classification model, converting hyperspectral images into a distribution of elements and materials represented in the hyperspectral information of the image, etc.

In some embodiments, the one or more data transformation operations can be performed in response to receiving the real-time data from the local site and corresponding data source at the local site. For instance, the data transformation operations may be data transformations that are performed independent of the ingestion of the data to the fleet map backend/fleet map data catalog (e.g., the transformed data is available at the local edge regardless of whether ingestion to the fleet map backend/data catalog is planned). Examples may include transformations performed to generate or implement a response to the real-time data at the local edge site, such as ML/AI inferencing, guiding autonomous vehicles or drones, updating operational parameters of a machine or process, etc.

In some embodiments, the one or more data transformation operations can be performed by first-party ML/AI applications, including the native/platform applications 540 of FIG. 5; can be performed by third-party ML/AI applications, including the qualified application repository 550 ML/AI applications also of FIG. 5; etc. In some aspects, the one or more data transformation operations can be performed using a combination of first-party and third-party ML/AI applications and/or services, including the various ML/AI applications and services described previously above with respect to any of FIGS. 4-9.

In one illustrative example, one or more first-party ML/AI applications (e.g., included in the native/platform applications 540 of FIG. 5, running on a containerized edge compute unit 430 of FIG. 4, running at a data aggregation point, running in the cloud, and/or running in the fleet map backend, etc.) can be used to optimize the aggregation of data for the fleet map data catalog. Additionally, one or more first-party ML/AI applications can be used to generate one or more data insights for presentation or alerting in the various fleet map GUI views, and/or to improve the presentation itself.

For instance, one or more backend ML/AI models can be used to optimize the transmission and reception of data for remote edge environments where one or more data sources are located or otherwise deployed, while also prioritizing any streaming mission-critical data streams. In some embodiments, the backend ML/AI model can optimize data transmission and reception based on batching ingested data at the local edge for later transmission, in response to determining that the current connectivity fails to meet a stream-specific reliability threshold for the transmission. In some cases, throughput can be constrained for non-mission critical data streams, for instance when approaching tier limits for connectivity providers (e.g., satellite internet constellation providers, internet backhaul link 440 of FIG. 4 providers, etc.) in order to avoid data plan overage fees to the user, etc.

Fleet Map: Data Types & Presentation

In at least some embodiments, it is contemplated that data that originates, transforms, and eventually presents upon the various fleet map GUI views (and/or is ingested to the fleet map data catalog) may be of any arbitrary type. Basic sensors emit structured scalar data such as temperature or pressure in simple numeric formats. Other devices, such as cameras and microphones, emit unstructured data representing image and waveform content. Applications and systems can produce other structured and schematized data payloads, such as columnar lists and key-value pairs. Sensors, typically, convert analog inputs to digital signals, while applications convert and transform digital data.

In one illustrative example, the fleet map described herein can represent data that originates from physical devices, logical computations, and other signals and indicators that communicate information about the nature, condition, status, or other characteristics of assets and operations. For instance, the fleet map can represent informative data such as: readings from sensors; images or video streams from cameras (e.g., as in the example camera live stream 1270b shown in the fleet map GUI view 1200b of FIG. 12B); telematics from a vehicle; coordinates from a GPS device; physical security alerts provided by field personnel; cost of energy from different suppliers at different times and in different regions (e.g., as in the example energy cost overlay shown in the fleet map GUI view 1100c of FIG. 11C); location of connectivity satellites (e.g., as in the example satellite location overlay shown in the fleet map GUI view 1100b of FIG. 11B); network status information and/or status alerts (e.g., as in the example increased latency alert 1270a shown in the fleet map GUI view 1200a of FIG. 12A, or in the example terminal obstruction status history 1270c shown in the fleet map GUI view 1100c of FIG. 11C); alerts generated by AI for predictive maintenance of an industrial equipment (e.g., as in the example AI-based predictive alert 1350 shown in the fleet map GUI view 1300 of FIG. 13); etc.

Notably, and as contemplated herein, the disclosed fleet map systems and can be used to represent data with a diversity in nature, volume, frequency, format, and/or content of the data that is displayed on the fleet map GUI views as is desired or configured by the user (e.g., viewer) of the fleet map GUI. Additionally, the fleet map systems and techniques described herein can be seen to supports various asset types and data formats natively. For example, simple sensor readings are displayed as text, while images from a camera are displayed as images. Furthermore, users can extend the fleet map GUI views with new data definitions that describe the origin of the data, the data shape/type, the way the data is collected and transmitted, how the data is to appear on one or more fleet map GUI views, and/or how the data interacts with various features of the fleet map and fleet map GUI views (e.g., such as filters, groups, aggregations, and/or alerts, etc.). For example, the Fleet Map can be extended to display autonomous haulage vehicles (AHVs), with corresponding glyph and label (populated with identifying information received from the vehicle), at the correct location (fed from GPS coordinates from the vehicle), with information such as load weight, speed, telematics, and a live view of the front, side, and rear facing cameras mounted on the vehicle. When an asset is defined as "mobile," the mobile asset's corresponding location depicted in the map view of the fleet map GUI is continuously updated with real-time GPS coordinates provided either by the mobile asset itself, or by proxy, through an accompanying asset (or a combination of the two).

In some embodiments, the fleet map systems and techniques described herein can be used to render an expansive yet optimized visual experience (e.g., in rendering the various example fleet map GUI views 1000a-1400 of FIGS. 10A-14, respectively; etc.), representing the entire fleet of users' assets and operations in a single pane of glass. The single-pane representation of a user's entire fleet of assets and operations, with dynamic and real-time updating and/or streaming of relevant data, can be achieved at the time of presentation (e.g., at the time of display in the fleet map GUI view(s)) based on sourcing the underlying data for display from both cloud storage and databases where edge data has been synchronized (e.g., as part of the process of generating and maintaining the fleet map data catalog), augmented with one or more external sources as needed or desired (e.g., other databases, knowledge bases, APIs, etc.). As needed, one or more live channels can be created or otherwise established between the fleet map backend and individual assets selected for detailed inspection and/or a presentation of corresponding live stream views of real-time data streamed from the selected assets and displayed in the fleet map GUI view(s).

As a user of the fleet map GUI changes their view settings (such as pan and zoom the map, change and pivot filters and groups, interact with sites and assets, etc.) and as data from the assets and operations changes (e.g., changes in the environment, health, status, metrics, telemetry, analytics, computations and transformation, human inputs, etc.), the fleet map GUI view is dynamically updated and refreshed to render the appropriate experience in the most focused and efficient manner. The user of the fleet map GUI views disclosed herein is able to observe and manage their distributed operations with global granularity, with tighter geographical granularity, and/or with any combination of the two, while the Fleet Map automatically organizes the backend resources and data flow channels to surface the most relevant and useful records of data.

Fleet Map: Data Volume & Data Freshness

In some aspects, the large variety and volume of data sources used to feed or populate the fleet map data catalog (and the variety, volume, and diversity of the data formats and data points/data objects thereof) can present a challenge in terms of the volume of data that is ingested on a repeated, hourly, daily, weekly, etc., basis. For example, a single industrial user/entity associated with a fleet represented by the fleet map GUI described herein may have numerous remote operations (e.g. mining, oil and gas, manufacturing, logistics, etc.). Such a customer will have tens of thousands of assets in a single site (e.g., a single edge deployment or edge site location, such as the local site 402 of FIG. 4). Some of these assets will generate low-resolution, low-frequency data (e.g., a humidity sensor with 1 reading per minute), while other assets (often at the same site) will produce high-resolution and high-frequency content (e.g., hyperspectral images or RGB frames from a 4K video camera). Other assets might upload complex payloads, such as a drone generating continuous stream of video and avionics data. The following numbers are provided for illustration, representative of an example volume of data that a single customer might generate:

Terabytes of structured data from 1 billion readings from 1,000 assets per site per day 10s of Terabytes of unstructured data from 100 cameras per site per day Terabytes of data produced from various applications and analytics pipelines (including AI and ML processes)

Accordingly, when an enterprise user scales across multiple sites, the data volume quickly grows to hundreds of terabytes (or greater) being generated on a daily, or near-daily basis. For instance, the example of the single industrial entity provided above corresponds to 10s of terabytes of data generated per site, per day. Scaled across a relatively moderately sized deployment of 10 sites, the single industrial entity may be dealing with hundreds (or thousands) or terabytes of data being generated across their operations on a daily basis. In one illustrative example, the fleet map systems and techniques described herein can be used to present data and analytics in a visual manner that is digestible, actionable, and scalable across systems and networks by automatically identifying and prioritizing the content that can inform the operations and/or that can inform operations of interest.

It is additionally contemplated that data freshness can be essential to successful global operations enabled by centralized observability, monitoring, and control. As such, the presently disclosed fleet map systems and techniques can achieve effective representation of large volumes of data through the two main facilities described below.

At the presentation layer of the fleet map backend/the systems and techniques described herein, data is grouped, aggregated, filtered, and overlaid according to the user's current needs and priorities. A continuous synchronization process adjusts the data pipeline that feeds the fleet map with live data (e.g., streamed from the relevant live/real-time data sources, sensors, connected assets/devices, edge compute units, data aggregators, etc.), according to current user selections and/or configurations within (or corresponding to aspects of) the currently displayed fleet map GUI view (e.g., such as geographic regions, zoom, selected layers, groups and filters, etc.).

At the data aggregation and transmission layer of the fleet map backend/the systems and techniques described herein, various processing and batching steps are utilized in order to collect, batch, process, and transmit data efficiently and effectively. For example, when the user interacts with an individual asset, a live data feed is established in real-time between the fleet map and the selected individual asset for rapid updates. For instance, by choosing a camera asset depicted or represented within a fleet map GUI view, the user can see a live feed from the camera (e.g., as in the live camera feed display element 1270*b* shown in the example fleet map GUI view 1200*b* of FIG. 12B). When the user dismisses the individual asset view, the live pipeline for streaming data transfer from the selected asset is closed, and regular data collection, processing, batching, and transmission for the selected asset resumes.

Fleet Map: Data Zoom & Aggregation

In some aspects, the presently disclosed fleet map systems and techniques can be configured to continuously and automatically update the fleet map GUI view based on the user's needs, choices, inputs, preferences, etc. For instance, users of the fleet map GUI can pan to different geographies where assets of their fleet are deployed, and can zoom in and out to different levels of geographical scale representations within the map view of the fleet map GUI. At each zoom level, the fleet map GUI is generated and/or dynamically updated to offer the most digestible view of the assets and operations in the selected geography to deliver the intended outcome for the user. For example, if the user is interested to see critical alerts and is zoomed in to the individual asset level (e.g., generally the highest/greatest level of zoom within the fleet map GUI), detailed status information can be rendered on the map view of the fleet map GUI to show the respective conditions of each one of the individual assets in view.

For instance, the example fleet map GUI view 1000*b* of FIG. 10B corresponds to an example wherein the map view area 1015 of the GUI 1000*b* is zoomed in to a sufficient zoom level within the map to allow detailed status information to be rendered for each individual asset associated with a particular asset site/deployment/group 1040-*n*.

As illustrated, the asset group 1040-*n* includes six individual assets: a camera 1034-*n* (with a critical status indication 1035-3); an edge compute unit 1010-*n* (with a healthy status indication 1035-1); a satellite terminal or transceiver 1031-*n* (with a healthy status indication 1035-1); a vehicle 1037-*n* (with an attention status indication 1035-2); a drone 1039-*n* (with an attention status indication 1035-2); and a sensor 1036-*n* (with a critical status indication 1035-3).

When the fleet map GUI view 1000*b* is zoomed out, insufficient space may remain to render the asset group 1040-*n* in the expanded, individual asset view that is shown in FIG. 10B. When the fleet map GUI is zoomed out, the six individual assets of the asset group 1040-*n* can be collapsed or rolled up into the central UI element/icon depicted for the asset group 1040-*n* (e.g., the circle icon with the value of '6' in the middle, and the corresponding proportions of healthy, attention, and critical status indications depicted using different colored indicator rings about the circumference of the circle icon for asset group 1040-*n*).

More generally, in at least some embodiments, as the user zooms out on the fleet map GUI view, individual asset views (e.g., 1034-*n*, 1010-*n*, 1031-*n*, 1037-*n*, 1039-*n*, 1036-*n*) and their corresponding status information (1035-1, 1035-2, 1035-3) can aggregate and roll-up to higher concepts (such as machines, facilities, buildings, sites, operations, regions) that offers the user a continuous and dynamic sense of the conditions of assets and operations, without excessive visual clutter within the fleet map GUI view.

For example, in a zoomed in view of the fleet map GUI, the user can see the status of a robot on a manufacturing line as "Critical due to mechanical failure." In some embodiments, the status information of the robot can be presented in a detailed status view UI element that is the same as or similar to the detailed status view UI element 1270*a* shown in FIG. 12A (which corresponds to an example in the context of a latency status update for a satellite internet constellation terminal 1231-2). By panning around in the rendered view of the fleet map GUI, the user can see that this robot (e.g., the example robot with the status of critical due to mechanical failure) is 1 of 15 of the same kind, and the other 14 robots are operating normally. As the user zooms out in the rendered view of the fleet map GUI, the user can be presented with a rolled-up view of a factory in which the robots are located. The status information for the rolled-up factory view can correspond to composite or aggregate status information from the individual assets and/or devices within the factory (e.g., including the 1 critical status robot and the 14× normal status robots in the example above). The aggregate status information for the rolled-up factory view or icon presented in the zoomed out view of the fleet map GUI can be indicative of or represented as an aggregate status information appearing as "Attention: yield is lower by 5%, repairs needed." The status of the factory, in this example, can be dynamically aggregated through a computation that involves one or more static rules (e.g. "if number of malfunctioning robots is less than 3, then factory operation is normal"), and/or involved one or more dynamic rules determined by one or more ML/AI models (e.g., dynamic ML/AI-based rules or implementations, such as analyzing speed and yield of the operations to forecast the corresponding downstream impact on shipping and inventory, etc.). In some aspects, these various inputs can be combined and computed to produce an aggregate-level condition, and a corresponding alert level, for the factory asset. A same or similar concept can be implemented across different zoom levels (e.g., and different aggregation levels, with different zoom levels having different aggregation levels within the rendered fleet map GUI view(s) described herein). For instance, every higher zoom level (e.g., when zooming in on the fleet map GUI view) can be seen to aggregate data and/or status information from increasingly granular content or assets/devices. Similarly, every lower zoom level (e.g., when zooming out on the fleet map GUI view) can be seen to aggregate data and/or status information from decreasingly granular content or assets/devices.

Fleet Map: Filters, Groupings, Overlays

In some aspects, the fleet map GUI views described herein can utilize or otherwise include one or more filters, groups, and/or overlays (e.g., overlay layers) to improve the navigation and functionality of the fleet map, as well as to make the navigation and functionality of the fleet map compatible with user preferences, needs, etc.

As mentioned previously, the fleet map GUI view(s) described herein (e.g., the fleet map GUI views 1000*a*-1400 of FIGS. 10A-14, respectively) can include a plurality of filter UI elements 1030 for filtering the display of connected assets/devices/data sources of the representative fleet underlying the fleet map. For instance, as shown in the example fleet map GUI view 1000*a* of FIG. 10A, a plurality of filter UI elements can include a connectivity filter element 1031 the selection of which is configured to adjust the display of connectivity assets such as satellite internet constellation terminals within the fleet map GUI view; an edge units filter element 1032 the selection of which is configured to adjust the display of containerized edge data center units (e.g., such as edge compute unit 430 of FIG. 4, etc.) within the fleet map GUI view; a cameras filter element 1034 the selection of which is configured to adjust the display of one or more cameras or imaging devices/sensors within the fleet map GUI view; a sensors filter element 1036 the selection of which is configured to adjust the display of various connected sensors/assets/devices within the fleet map GUI view; a robots filter element 1038 the selection of which is configured to adjust the display of one or more robots or robot types within the fleet map GUI view; a drones filter element the selection of which is configured to adjust the display of one or more drones or drone types within the fleet map GUI view; a vehicles filter element 1037 the selection of which is configured to adjust the display of one or more vehicles or vehicle types within the fleet map GUI view; etc.

Managing assets and operations (e.g., of or associated with a fleet underlying the fleet map GUI) across various sites can require or otherwise benefit from the ability of the enterprise user or entity to provide focused and targeted attention to particular aspects or operations where support is currently/urgently needed. In some embodiments, the fleet map GUIs disclosed herein can be used to enable an enterprise user to detect or distinguish the particular aspects or operations needing support, focused and target attention, etc. For example, by filtering the Fleet Map to display only "Critical" assets and operations (e.g., using the 'Critical' status filter UI element 1035-3 of FIGS. 10A and 10B, which may be the same as or similar to the 'Critical' status filter UI element shown in FIGS. 11A-11C, the 'Critical' status filter UI element 1235-3 of FIGS. 12A-12C, and/or the 'Critical' status filter UI element 1435-3 of FIG. 14, etc.), Information Technology (IT) and Operational Technology (OT) teams can use and configure the fleet map GUI view narrow down the view within the main map area 1015 of the GUI 1000*a* to depict only the locations or sites (and associated assets/devices etc.) where technical, mechanical, or operational help is needed, for example where various faults or degradations are occurring or predicted to occur. The various faults or degradations that may trigger a critical status 1035-3 can include, but are not limited to, one or more of an indication that the network is disconnected (e.g., the local network 420 created by the edge compute unit 430 at the site, the internet backhaul network 440, or both); that equipment is broken down or malfunctioning; that there are concerns with regard to personnel or process safety; etc., among various other triggering events and conditions. In another example, mechanical teams can filter the map 1015 of the fleet map GUI 1000*a* to view assets and operations that are in "Attention" status 1035-2 and schedule preemptive repairs and maintenance in response.

As illustrated in FIG. 10A, a first satellite terminal 1031-1 provided at a first site location or included in a first asset group has a Healthy status 1035-1; a second satellite terminal 1031-2 provided at a second site location or included in a second asset group has an Attention status 1035-2; and a third satellite terminal 1031-3 provided at a third site location or included in a third asset group has a Critical status 1035-3.

As illustrated in FIG. 10B, the single edge deployment site/location/asset group 1040-n includes or otherwise corresponds to the six different individual assets comprising: camera 1034-n (with a critical status indication 1035-3); edge compute unit 1010-n (with a healthy status indication 1035-1); satellite terminal or transceiver 1031-n (with a healthy status indication 1035-1); vehicle 1037-n (with an attention status indication 1035-2); drone 1039-n (with an attention status indication 1035-2); and sensor 1036-n (with a critical status indication 1035-3).

As illustrated in FIGS. 11A, 11B, and 11C, a first satellite terminal 1131-1 provided at a first site location or included in a first asset group has a Critical status; a second satellite terminal 1131-2 provided at a second site location or included in a second asset group has an Attention status; and a third satellite terminal provided at a third site location or included in a third asset group as a Healthy status.

As illustrated in FIGS. 12A, 12B, 12C, and 13 a first satellite terminal 1231-1 provided at a first location or included in a first asset group has a Healthy status 1235-1; a second satellite terminal 1231-2 provided at a second location or included in a second asset group has an Attention status 1235-2; and a third satellite terminal 1231-3 provided at a third location or included in a third asset group has a Critical status 1235-3.

As illustrated in FIG. 14, a first satellite terminal 1431-1 provided at a first location or included in a first asset group has a Healthy status 1435-1; a second satellite terminal 1431-2 provided at a second location or included in a second asset group has an Attention status 1435-2; a third satellite terminal 1431-3 provided at a third location or included in a third asset group has a Critical status 1435-3; a containerized edge data center unit 1410-1 provided at a fourth location or included in a fourth asset group has an Attention status 1435-2; and a vehicle (e.g., ship) 1437-1 provided at a fifth location or included in a fifth asset group has a Healthy status 1435-1. Also illustrated in the example of FIG. 14 is a first asset group 1440-1 comprising seven connected assets/devices shown in a rolled-up or aggregate view with circumferential rings corresponding to the proportion of the seven assets in group 1440-1 that are in the Healthy status 1435-1, the Attention status 1435-2, and the Critical status 1435-3 (respectively). Similarly, a second asset group 1440-2 comprises six connected assets/devices shown in a rolled-up or aggregate view with circumferential rings corresponding to the proportion of the six assets in group 1440-2 that are in the Healthy status 1435-1, the Attention status 1435-2, and the Critical status 1435-3 (respectively). The first asset group 1440-1 can be provided at a corresponding edge location/site/deployment that is different from the location associated with each of the individual assets or the second asset group 1440-2 shown in FIG. 14. Likewise, the second asset group 1440-2 can be provided at a corresponding edge location/site/deployment that is different from the location associated with each of the individual assets or the first asset group 1440-1 shown in FIG. 14.

In one illustrative example, the fleet map GUI can include or be configured to provide various different filter options (e.g., using corresponding filtering UI elements 1030 or other UI elements for the various different filter options. For instance, the filter options or filter UI elements can include, but are not limited to, one or more of: asset type filter options (e.g., various physical devices, such as pre-configured physical devices (e.g., sensors, vehicles, cameras, etc.), and extensions that are defined by the enterprise user (e.g., conveyor belts, cranes, processing plants, etc.). Sub-filters such as asset OEM information may also be implemented, and in general, sub-filters can be implemented by applying a filter in series or combination with one or more other filters.

Filter options or filter UI elements can additionally include asset status filter options (e.g., corresponding to information such as device health, indicating operating conditions reported from the device itself, for example a camera reporting low storage, or a vehicle reporting low tire pressure, etc.).

Filter options or filter UI elements can additionally include operational status filter options and/or information, such as: yield, efficiency, productivity, and/or various other metrics defined by enterprise users and computed using automated and manual data points aggregated from the fleet of assets and operations, etc.

Filter options or filter UI elements can further include safety and security status information and filtering options, corresponding to one or more of: cyber and/or physical threat or security information, including physical or network intrusion, attacks on operating systems, applications and databases, and other user-defined threats, such as personnel safety concerns due to exposure to chemicals, etc.

Filter options or filter UI elements may additionally include predicted impact filtering information or options, such as ML/AI-generated foresights or predictions indicative of adverse impact(s) on one or more particular assets and operations of, within, or otherwise associated with the user's fleet (e.g., for instance, adverse impact(s) due to forecasted inclement weather, expected mechanical failures due to fatigue, forecasted delays in production or transportation due to logistical disruptions, etc.).

In addition to the example set of filtering element options 1030 that may be included in the fleet map GUI implementations disclosed herein, in some embodiments the fleet map GUI views can be used to implement one or more grouping implementations, hierarchies, or association logic, etc., for generating or defining groups of connected assets that may be rolled-up or aggregated under a single view at certain lower zoom levels of the fleet map GUI view.

For instance, the grouping logic can include generating visual representations of asset groups of a fleet, with the asset groups defined at the site level (e.g., asset groups of different sites, which may be user-defined logical units of deployments for assets and operations of the fleet); defined at the region level (e.g., asset groups of different regions, which may be geographical regions or any other user-defined groups of sites); defined at a custom grouping level configured by the user (e.g., custom groups of assets defined by the user, such as factory-based groupings, warehouse-based groupings, railyard-based groupings, etc.). Asset groups can also be implemented as dynamic groups, which can be rules-based user-defined groupings of various assets of a fleet. For instance, a 'green operations' dynamic grouping can be implemented to include certain assets and/or sites that operate on renewable energy, which is a (dynamic) metric or determination that can change based on location, time of day, and/or energy grid dynamics. As mentioned previously, it is contemplated that the fleet map systems and techniques described herein can support user interactions to expand, collapses, and/or pivot the rendered map view 1015 based on groups and/or grouping information and logic, to achieve the desired presentation of the user's fleet assets and operations, etc.

FIG. 10B illustrates an example fleet map GUI view 1000b with a site-level asset grouping utilized for the asset group 1040-n. For instance, each of the six connected assets within the asset group 1040-n are deployed to, located in, or otherwise associated with the same edge deployment site location, and accordingly are included in the single asset group 1040-n defined for the edge deployment site location 1040-n.

FIGS. 11A, 11B, 11C illustrate various example fleet map GUI views 1100a, 1100b, 1100c (respectively) that each depict a different example overlay information layer rendered on top of or in combination with the underlaying or base fleet map GUI view of filtered connected assets of a fleet. In one illustrative example, the fleet map GUI can implement one or more optional or configurable (e.g., selectively enabled or disabled based on a user selection or input) overlay layers 1170. For instance, the overlay layers 1170 can include selectable options for one or more (or all) of:

- A weather overlay layer 1171 (e.g., depicted in the specific example of FIG. 11A; corresponding to example overlay information such as temperature, humidity, wind, rain, hurricanes, radar returns, etc.)
- A time-zone or time of day overlay layer (e.g., depicting global night/day segments as correspondingly darkened or brightened on the fleet map GUI view)
- A connectivity availability overlay layer, such as the satellite information overlay layer 1172 and/or corresponding to the specific example of FIG. 11B (e.g., in general, a connectivity availability overlay layer depicting connectivity information corresponding to a satellite internet constellation network, a cellular network, a fiber network, etc.)
- A connectivity health overlay layer (e.g., such as the health status overlayer layer 1176 and/or associated with or including the outage alerts overlay layer 1174; indicative of connectivity health information such as satellite internet constellation satellite status information on a per-bird basis, etc.)
- A topography overlay layer
- An energy cost overlayer layer, such as the energy cost overlay layer 1175 and/or corresponding to the specific example of FIG. 11C
- A value optimization status overlay layer (e.g., depicting efficiency metrics corresponding to reduction and savings in time/delays, cost, energy, emissions, accidents, etc., at a particular site; in some embodiments, the same as or similar to (or included in) the site activities overlay layer 1178)
- One or more custom overlay layers (e.g., enterprise users can define custom overlays by specifying a data source (e.g., static or dynamic, databases, APIs, etc.), a data presentation (e.g., including drawing modes, colors, legends, etc.), and one or more interactions between the custom overlay layers and various other capabilities and features of the fleet map GUI implementations described herein (e.g., including filters, groups, aggregation, etc.).

For instance, FIG. 11A illustrates an example fleet map GUI view 1100a in which the primary map view area 1115 includes a weather overlay layer 1171 that includes geographically correlated radar data for the different locations shown in the primary map view 1115. The weather overlay layer 1171 can be activated, selected, or configured as a particular selection made from a plurality of available overlay layer options 1170 (e.g., shown in FIGS. 11A-11C as include the weather overlay layer element 1171, satellite overlay element 1172, security alert overlay element 1173, outage alert overlay element 1174, energy cost overlay element 1175, health status overlay element 1176, IoT device overlay element 1177, and site activities overlay element 1178, etc.).

FIG. 11B illustrates an example fleet map GUI view 1100b in which the primary map view area 1115 includes a satellite connectivity overlay layer 1172, selected from and/or enabled from the plurality of available overlay layer options 1170. In some aspects, the satellite connectivity overlay map can illustrate respective satellite internet connectivity options or available birds at different geographic locations or sites (e.g., a first set of connectivity overlay information corresponding to the first site/first satellite terminal 1131-1; a second set of connectivity overlay information corresponding to the second site/second satellite terminal 1131-2; a third set of connectivity overlay information correspond to the third site/third satellite terminal 1131-3; etc.). In some embodiments, each dashed line segment represents an area or distance for which a particular satellite/bird of the overhead satellite internet constellation can provide communications. For instance, the point on each dashed line that originates at one of the satellite terminal locations 1131-1, 1131-2, 1131-3 can represent communications originated by a respective one of the satellite terminals. The point on the other distal end of each dashed line may represent the maximum extent or communication range that can currently be provided to the respective satellite terminal location by different birds of the satellite internet constellation (e.g., the dashed lines can represent communication links that may be enabled or provided by the current overhead configuration of the satellite internet constellation and its individual/respective birds).

FIG. 11C illustrates an example fleet map GUI view 1100c in which the primary map view area 1115 includes an energy cost overlay layer 1175, selected from and/or enabled from the plurality of available overlay options 1170. In some aspects, the energy cost overlay map shown in FIG. 11C can be indicative of current energy cost or pricing information at different geographical locations, areas, regions, etc., in which at least a portion of the fleet is currently deployed or is nearby to. For instance, a first set of geographical regions 1182-1 may currently be associated with relatively low energy costs (or energy costs/pricing below one or more configured threshold amounts), and are represented in the energy cost overlay 1175 using a first visual indication (e.g., a green shading, etc.). A second set of geographical regions 1184-1 may currently be associated with moderate or relatively high energy costs (or energy costs/pricing above one or more configured threshold low amounts, and optionally, below one or more configured threshold high amounts), and are represented in the energy cost overlay 1175 using a second visual indication that is different from the first, low-cost energy visual indication (e.g., a yellow shading, etc.). In some aspects, additional granularity can be introduced using a corresponding one or more additional visual indications within the energy cost overlay 1175. In some embodiments, the energy cost overlay information 1175 can represent historical energy cost/pricing information, current or real-time energy cost/pricing information, and/or predicted or projected energy cost/pricing information, configurable by a user in the overlay option selection panel 1170 included in the example fleet map GUI views 1100a-1100c of FIGS. 11A-11C, respectively.

Fleet Map: Summary Cards

In some embodiments, the fleet map systems and techniques described herein can include various asset and/or asset group summary card UI or interface elements configured to provide detailed information corresponding to a particular (e.g., selected) asset or asset group shown within the fleet map GUI view. For instance, user interaction with assets and/or groups on the fleet map can reveal summary card UI elements that display corresponding details for the asset or asset group that is currently in focus (e.g., currently selected by the user). Summary card UI elements can additionally, or alternatively, be used to display one or more available actions for the asset or asset group that may be performed remotely (e.g., triggered by a user input to the fleet map GUI and/or to the corresponding summary card UI for the asset or group). In some embodiments, the summary card UI element for a particular asset or asset group may additionally display any active or predicted alerts about the asset or asset group, respectively.

For example, FIG. 12A illustrates an example fleet map GUI view 1200a in which the primary map view area is updated to display or render a summary card UI element 1270a corresponding to the satellite terminal 1231-2 (e.g., which has an 'Attention' status indicator 1235-2 associated therewith). In particular, the satellite terminal summary card UI element 1270a can be used to display more detailed information corresponding to the Attention status 1235-2 and/or underlying issue causing or triggering the assignment of the Attention status 1235-2 (e.g., rather than the Healthy status 1235-1) to the satellite terminal 1231-2. As illustrated, the satellite terminal summary card UI element 1270a for satellite terminal 1231-2 can be indicative of detailed status information (e.g., "Attention: Increased Latency"), a corresponding service associated with the Attention status 1235-2 (e.g., "Mobile Priority 5 TB), and a corresponding service location (e.g., 801 N 78$^{th}$ Ave, Carlsbad, CA 98121). In some aspects, the satellite terminal summary card UI element 1270a is automatically displayed based on the user cursor or other user input mechanism being hovered or placed over the icon for the satellite terminal 1231-2.

In another example, FIG. 12B illustrates an example fleet map GUI view 1200b in which the primary map view area is updated to display or render a summary card UI element 1270b corresponding to the camera asset/device/sensor 1234-1 (e.g., which has a 'Healthy' status indicator 1235-1 associated therewith). In some embodiments, the summary card UI element 1270b of FIG. 12B can be similar to the summary card UI element 1270a of FIG. 12A, and for instanced may be displayed or rendered within the fleet map GUI view 1200b in response to the user cursor or other user input mechanism being hovered or placed over the corresponding icon for the camera 1234-1 associated with the summary card UI element 1270b. In particular, the camera summary card UI element 1270b can be used to display more detailed information and/or a live stream feed of the sensor data (e.g., image frames, video frames, video stream, etc.) captured by the camera 1234-1. For instance, a live channel can be created or opened between the camera 1234-1 and the fleet map backend to obtain or receive the real-time/live streaming video or image data from the camera 1234-1, as described previously above. In some aspects, the camera summary card UI element 1270b displays real-time live streaming camera data captured at the deployment site or location where the camera 1234-1 is located (e.g., shown in the example of FIG. 1270b as a factory interior).

In some aspects, the camera summary card UI element 1270b can include additional information, which may be rendered, presented, or revealed based on user selection of the 'View all details' option shown within the camera summary card UI element 1270b. For instance, a camera summary card UI element (e.g., such as the camera summary card UI element 1270b) can display information such as: basic metadata such as name of the asset/camera (e.g., 'CAM-ID-81' or other descriptive or user-configured name), the corresponding camera location, operational/health status; a live preview of the camera feed (or last received from if live-connection cannot be established); as well as additional contextual metrics offered by the asset/camera 1234-1, such as resolution and FPS, etc.). IN at least some embodiments, a camera asset (e.g., such as camera asset 1234-1) may support or otherwise allow for remote actions such as pan, zoom, tilt, which will be displayed on the Summary Card. In some embodiments, one or more user inputs indicative of a configured control action or control input to the camera asset (e.g., camera 1234-1) can be provided to and/or received by the camera summary card UI element 1270b, and transmitted from the fleet map GUI backend to the camera 1234-1 for effecting the desired control action.

FIG. 12C is a diagram illustrating another example fleet map GUI view 1200c in which the primary map view area is updated to display or render a summary card UI element 1270c corresponding to a 'Critical' status 1235-3 alert detail view. In some aspects, the summary card UI element 1270c corresponds to a 'Critical' status 1235-3 of a third satellite terminal 1231-3. The satellite terminal summary card UI element 1270c may be the same as or similar to one or more of the summary card UI element 1270a of FIG. 12A and/or the summary card UI element 1270b of FIG. 12B. In one illustrative example, the critical status summary card UI element 1270c can correspond to the satellite terminal 1231-3 experiencing a critical obstruction of its network connectivity to its associated satellite internet constellation. The critical status summary card UI element 1270c is shown to include a histogram depicting obstruction levels over the past several hours (e.g., obstruction level history information corresponding to the time at which the impact began, or some other pre-determined or configured time window).

The summary card UI elements 1270a-1270c of FIGS. 12A-12C (respectively) are provided for purposes of illustration and example and are not intended to be construed as limiting. Additional examples of summary card UI elements corresponding to particular types of connected assets/devices/data sources of the fleet map GUI view can include, but are not limited to, one or more of a sensor summary card UI element, a drone or vehicle summary card UI element, an edge site summary card UI element, a user-configured or customer summary card UI element, etc.

For instance, the summary card for a sensor can be configured to display: basic metadata about the sensor, the sensor's current or most recent reading (and associated units), and/or a histogram of the sensor readings over the past several hours/days (with toggles available for various durations), etc. In some aspects, a sensor may not offer any controls, in which case the sensor summary card does not include control options. In examples where a sensor does offer control, the sensor summary card can include one or more interface elements for receiving user inputs indicative of a control command for adjusting the controllable sensor. In some embodiments, an alert can be displayed in the sensor summary card UI element, for instance indicating that the sensor has been offline for an extended period of time, indicating power or connectivity disruption, etc.

In another example, a summary card for a drone or other vehicle/mobile/transportation asset can be configured to display basic metadata and detail information corresponding to the drone, vehicle, mobile or transportation asset, etc. For instance, the summary card can display a current location of the drone, past location information of the drone (in text form and/or visual or map-based form), an indication of whether the drone is currently in flight, flight status information and/or flight telemetry information, a live camera or sensor feed from onboard the drone or from a drone sensor payload, avionics information corresponding to the drone, etc. In some embodiments, a drone summary card UI element can display available actions corresponding to flight controls for the drone, and may receive one or more user inputs indicative of corresponding flight control commands for adjusting the flight parameters and/or flight path etc. of the drone.

In another example, a summary card UI element can be provided on the fleet map GUI view to correspond to an edge deployment site or location, such as the respective underlying edge deployment site/location corresponding to the first satellite terminal 1231-1, the second satellite terminal 1231-2, or the third satellite terminal 1231-3, etc. In some embodiments, the summary card UI element for an edge deployment site can be indicative of information such as the site name, the site location, the number of connected assets present or active at the site, aggregated "site health" information computed based on inputs from all associated assets at the site, and/or other unique details and actions such as "current operations manager," etc.

Custom summary card UI elements can also be supported or utilized, for instanced based on a user or enterprise entity defined one or more summary card UI elements for custom assets and/or asset groups of the user fleet (e.g., with the definition information for the custom summary card including information describing the metadata, metrics, and other presentation details, source of alerts, available actions, etc.).

Fleet Map: Live Alerts

In some aspects, data from all assets and operations associated with a user's fleet is continuously monitored and alerts are generated in real-time to indicate significant changes in status or impact to operations. In some embodiments, a first portion of the fleet map live alerts can be implemented as rules-based alerts that are configured to trigger based on set-points. A second portion of the fleet map live alerts can be implemented as dynamic alerts that are generated using one or more ML and/or AI agents (e.g., one or more trained ML and/or AI models configured to generate the dynamic alerts based on the available configuration or selection of input information for the model). For instance, the dynamic ML/AI-based alerts can be generated by ML/AI agents that implement deep-learning models to predict future impacts to the fleet assets or operations (or subsets thereof), using complex, multi-modal inputs that are not possible to codify in simple math or logic statements. Alerts may be configured and used to indicate transition of status for an asset or group (e.g., transition between the 'Healthy,' 'Attention,' and 'Critical' status levels shown in the examples of FIGS. 10-14; etc.). In some aspects, each alert can be generated to include details about the incident, possible causes, and potential remedies, etc.

For example, network connectivity alerts can be generated to indicate network disruption either at the local site (e.g., corresponding to local network 420 implemented at local site 402 by edge compute unit 430 of FIG. 4), between the site and the internet (e.g., corresponding to internet backhaul 440 in FIG. 4), or both. 'Attention' level connectivity alerts (e.g., corresponding to the 'Attention' status indication 1235-2 in FIGS. 12A-12C) can indicate network connectivity impacts such as slow-down, packet-loss, or partial blockage, whereas 'Critical' level connectivity alerts (e.g., corresponding to the 'Critical' status indication 1235-3 in FIGS. 12A-12C) can indicate network connectivity outages or deeper impact(s) to the status of operations.

In another illustrative example, maintenance alerts can be generated for vehicles and/or machines with mechanical parts, etc. In this example, 'Attention' alerts may indicate preemptive maintenance due to normal wear, whereas 'Critical' alerts can be generated/issued when the machine has broken down.

Custom alerts and alert types, triggers, rules, behaviors, etc., may also be configured and/or pre-defined by a user or enterprise entity associated with the fleet map. For example, a custom alert can be specified with one or more data sources and corresponding rules and computation needed to trigger and resolve the respective custom alert.

In some embodiments, the ML/AI generated alerts noted above can be generated for example scenarios (e.g., example alert events) such as 'impact on satellite connectivity' due to impending or predicted future stormy conditions; or 'possible production delay' in a mine environment due to significant wear in a conveyer system that has not been addressed or remediated in a timely manner; or 'risk of dam break' due to observed cracks in a drone video inspection that is analyzed in real-time by a computer-vision ML/AI model; etc.

FIG. 13 depicts an example fleet map GUI view 1300 that includes an ML/AI-generated dynamic alert panel 1350, corresponding to detailed information of a network connectivity alert determined by one or more ML/AI deep-learning agents. In some embodiments, the fleet map GUI view 1300 of FIG. 13 can be the same as or similar to the fleet map GUI view 1200a of FIG. 12A, with the addition of the ML/AI alert panel 1350 overlayed thereon. For instance, the ML/AI alert panel 1350 can correspond to ML/AI dynamic alert information for the satellite terminal 1231-2 with the 'Attention' status level indication 1235-2.

In some aspects, the ML/AI dynamic alert information within the ML/AI alert panel 1350 indicates alert description information 1352 for the alert type (e.g., 'Increased Latency' alert type). For instance, the ML/AI alert panel 1350 includes the alert description information 1352 "This terminal is experiencing sustained increased latency. Over the last 4 hours, the average latency has been 120 ms, which is 3× the typical latency (39 ms) at this location."

The ML/AI alert panel 1350 can further include a possible or predicted causes information 1354, shown in FIG. 13 as "Based on the telemetry from your terminal, network performance details, and weather conditions, you are most likely experiencing increased latency due to stormy weather in Southern California. Other common causes resulting in increased latency include: Network congestion. Satellites have limited bandwidth and work to serve all clients in a region equitably. Occasionally, this translates to increased latency for all customers in the region. Low signal quality due to weather or obstruction. If your terminal does not have clear line of sight to the sky, you may notice increased latency."

The ML/AI alert panel 1350 can further include suggested remedial actions 1356, shown in the example of FIG. 13 as "Check the vicinity of your satellite terminal and remove any debris. After the storm, check your terminal again and remove tree branches or other artifacts that might interfere with your terminal's normal operation."

Fleet Map: Connections Between Assets and Sites

FIG. 14 is a diagram illustrating an example fleet map GUI view 1400 depicting various forms of connections and/or interconnections between deployed edge assets and groups or sites of the edge assets, in accordance with some examples. For instance, the fleet map GUI view 1400 depicts a first satellite terminal 1431-1 provided at a first location and having a Healthy status 1435-1; a second satellite terminal 1431-2 provided at a second location and with an Attention status 1435-2; a third satellite terminal 1431-3 provided at a third and having a Critical status 1435-3; a containerized edge data center unit 1410-1 provided at a fourth location and having an Attention status 1435-2; and a vehicle (e.g., ship) 1437-1 provided at a fifth location and having a Healthy status 1435-1. In some embodiments, the deployed edge assets 1431-1, 1431-2, 1431-3, 1410-1, 1437-1 may be individual assets (e.g., not included in an asset group). In some embodiments, one or more of the deployed edge assets 1431-1, 1431-2, 1431-3, 1410-1, 1437-1 may be included in an asset group, but the configured filtering parameters for the fleet map GUI view 1400 are set to exclude the remaining asset types in the asset group (and therefore, although included in an asset group, the respective deployed edge asset is shown in the fleet map GUI view 1400 as an individual asset). For instance, the example of FIG. 14 shows the connectivity filtering element 1431, the edge units filtering element 1432, and the vehicles filtering element 1437 as being selected. Based on the cameras, sensors, robots, and drones filtering elements also shown in FIG. 14 not being selected, the fleet map GUI view 1400 may be configured to exclude any cameras, sensors, robots, or drones from presentation in the fleet map. For instance, the first satellite terminal 1431-1 may be associated with one or more cameras, sensors, robots, or drones at the same edge site or as part of the same asset group, but based on the selection of the filtering element options for the fleet map GUI view, first satellite terminal 1431-1 is shown as an individual asset rather than a grouped asset; etc.

Also illustrated in the example of FIG. 14 is a first asset group 1440-1 comprising seven connected assets/devices shown in a rolled-up or aggregate view with circumferential rings corresponding to the proportion of the seven assets in group 1440-1 that are in the Healthy status 1435-1, the Attention status 1435-2, and the Critical status 1435-3 (respectively). Similarly, a second asset group 1440-2 comprises six connected assets/devices shown in a rolled-up or aggregate view with circumferential rings corresponding to the proportion of the six assets in group 1440-2 that are in the Healthy status 1435-1, the Attention status 1435-2, and the Critical status 1435-3 (respectively). The first asset group 1440-1 can be provided at a corresponding edge location/site/deployment that is different from the location associated with each of the individual assets or the second asset group 1440-2 shown in FIG. 14. Likewise, the second asset group 1440-2 can be provided at a corresponding edge location/site/deployment that is different from the location associated with each of the individual assets or the first asset group 1440-1 shown in FIG. 14.

In some embodiments, the fleet map GUI view 1400 can be used to make various forms of connections between the assets and/or asset groups of a fleet. For example, a "site" can be considered a grouping of multiple assets. A site may have a dependency on one or more nearby sites for certain functionalities or behaviors. For instance, a first site may have a dependency on a nearby second site for connectivity back-up, disaster recovery scenarios, etc. Various forms of such relationships can be created and presented in the fleet maps disclosed herein, including, but not limited to, one or more of connectivity back-up, disaster recovery, data processing and archival, etc.

For example, the first asset group 1440-1 is shown in the fleet map GUI view 1400 as being located at an edge site deployment within Texas, and having connections to the second satellite terminal 1431-2, the third satellite terminal 1431-3, and the second asset group 1440-2. In this example, the first asset group 1440-1 can use the respective connections to the satellite terminals 1431-2 and 1431-3 to implement primary and backup network connectivity paths. For instance, the first asset group 1440-1 might not include a satellite terminal at the Texas edge site deployment location (e.g., might not include a satellite terminal within the 7 constituent devices/assets in the first asset group 1440-1), but may be connected to the satellite terminals 1431-2 and 1431-3 through fiber connectivity, internet backhaul, etc. Based on being connected to the satellite terminals 1431-2 and 1431-3, the first asset group 1440-1 may selectively utilize one (or both) of the two respective connections to perform satellite internet constellation data transmission and/or reception. For instance, the satellite terminal 1431-3 is experiencing a critical status 1431-3 indicative of unavailable or significantly degraded connectivity, and accordingly, the first asset group 1440-1 may switch to a backup connectivity path using the connection to satellite terminal 1431-2.

In another example, the connection between the first asset group 1440-1 and the second asset group 1440-2 may represent a data processing and archival relationship, a disaster recovery relationship, etc. For instance, disaster recovery, load balancing, etc., can be performed by using one or more components or assets of the first asset group 1440-1 to handle failover for critical status 1435-3 components/assets of the second asset group 1440-2 (e.g., as the second asset group 1440-2 is currently experiencing a greater percentage of critical status 1435-3 alerts for its constituent assets as compared to the first asset group 1440-1).

In some examples, the systems and techniques described herein can be implemented or otherwise performed by a computing device, apparatus, or system. In one example, the systems and techniques described herein can be implemented or performed by a computing device or system having the computing device architecture 1500 of FIG. 15. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Processes described herein can comprise a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
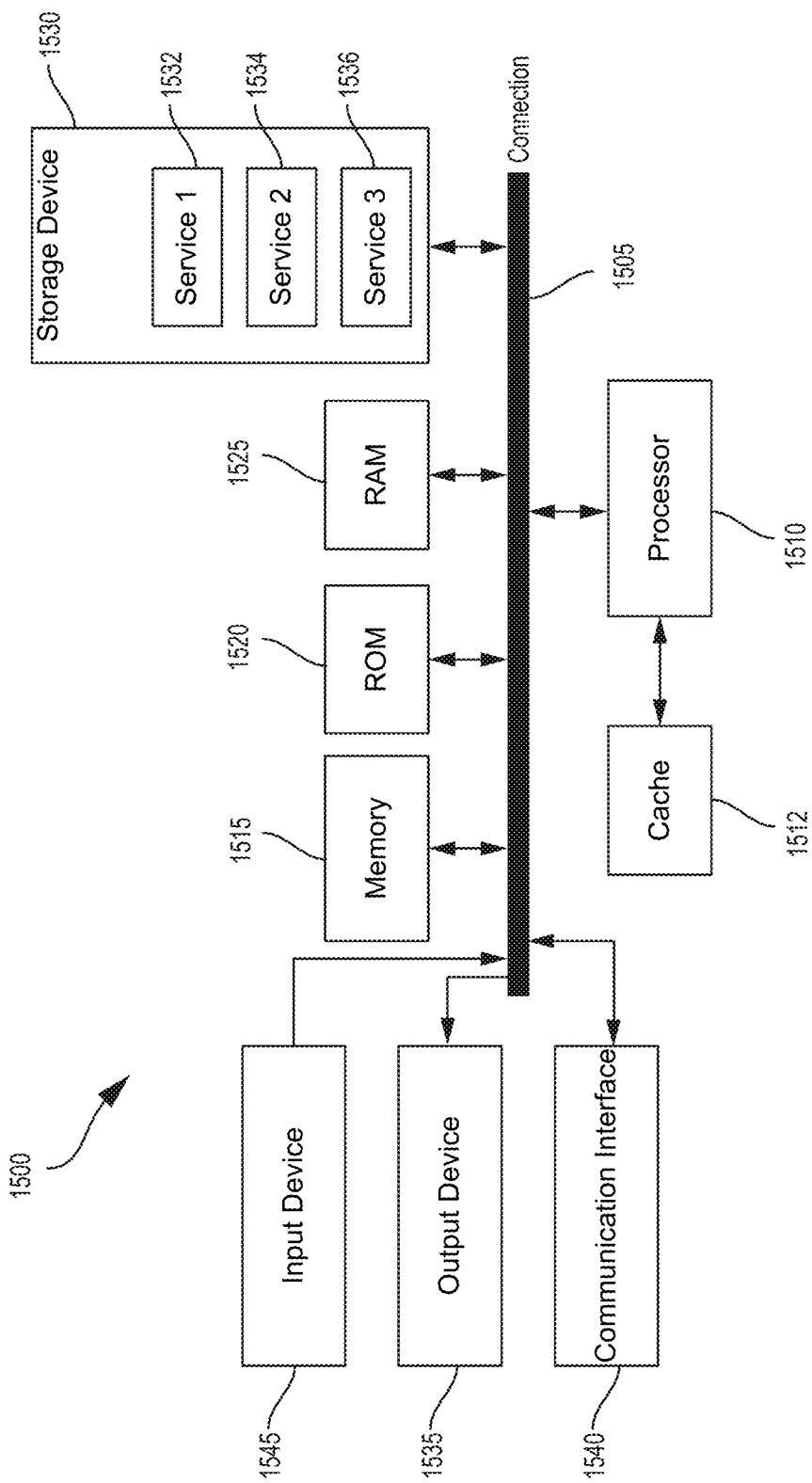
FIG. 15 is a block diagram illustrating an example of a computing system architecture that can be used to implement one or more aspects described herein, in accordance with some examples.

FIG. 15 illustrates an example computing device architecture 1500 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 1500 are shown in electrical communication with each other using connection 1505, such as a bus. The example computing device architecture 1500 includes a processing unit (CPU or processor) 1510 and computing device connection 1505 that couples various computing device components including computing device memory 1515, such as read only memory (ROM) 1520 and random-access memory (RAM) 1525, to processor 1510.

Computing device architecture 1500 can include a cache of high-speed memory connected directly with, in close proximity to, or integrated as part of processor 1510. Computing device architecture 1500 can copy data from memory 1515 and/or the storage device 1530 to cache 1512 for quick access by processor 1510. In this way, the cache can provide a performance boost that avoids processor 1510 delays while waiting for data. These and other engines can control or be configured to control processor 1510 to perform various actions. Other computing device memory 1515 may be available for use as well. Memory 1515 can include multiple different types of memory with different performance characteristics. Processor 1510 can include any general-purpose processor and a hardware or software service, such as service 1 1532, service 2 1534, and service 3 1536 stored in storage device 1530, configured to control processor 1510 as well as a special-purpose processor where software instructions are incorporated into the processor design. Processor 1510 may be a self-contained system, containing multiple cores or processors, a bus, memory controller, cache, etc. A multi-core processor may be symmetric or asymmetric.

To enable user interaction with the computing device architecture 1500, input device 1545 can represent any number of input mechanisms, such as a microphone for speech, a touch-sensitive screen for gesture or graphical input, keyboard, mouse, motion input, speech and so forth. Output device 1535 can also be one or more of a number of output mechanisms known to those of skill in the art, such as a display, projector, television, speaker device, etc. In some instances, multimodal computing devices can enable a user to provide multiple types of input to communicate with computing device architecture 1500. Communication interface 1540 can generally govern and manage the user input and computing device output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof. Storage device 1530 can include services 1532, 1534, 1536 for controlling processor 1510. Other hardware or software modules or engines are contemplated. Storage device 1530 can be connected to the computing device connection 1505. In one aspect, a hardware module that performs a particular function can include the software component stored in a computer-readable medium in connection with the necessary hardware components, such as processor 1510, connection 1505, output device 1535, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

The term "network entity" or "base station" may refer to a single physical Transmission-Reception Point (TRP) or to multiple physical Transmission-Reception Points (TRPs) that may or may not be co-located. For example, where the term "network entity" or "base station" refers to a single physical TRP, the physical TRP may be an antenna of a base station (e.g., satellite constellation ground station/internet gateway) corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Because a TRP is the point from which a base station transmits and receives wireless signals, as used herein, references to transmission from or reception at a base station are to be understood as referring to a particular TRP of the base station.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
    obtaining a plurality of data stream from one or more edge devices included in a fleet of a plurality of edge devices, wherein each respective edge device of the one or more edge devices is associated with one or more of a corresponding edge site location or a corresponding edge device asset group;
    storing at least a portion of the plurality of data stream as stored data objects within a fleet map data volume associated with the fleet of edge devices;
    receiving one or more user inputs indicative of a filtering selection for viewing a filtered subset of the fleet map data volume, wherein the filtering selection indicates a selected geographic view area;
    obtaining, from the fleet map data volume and based on the filtering selection, stored data objects corresponding to the filtered subset;
    generating a fleet map graphical user interface (GUI) view using the stored data objects corresponding to the filtered subset, wherein the fleet map GUI view comprises a converged geographic map of the selected geographic view area, and wherein the stored data objects corresponding to the filtered subset are rendered at corresponding locations within the converged geographic map; and
    outputting the fleet map GUI view for display to a user associated with the fleet of edge devices.

2. The method of claim 1, wherein generating the fleet map GUI view includes:
    receiving a user input indicative of a request to view real-time streaming data from a first edge device associated with the filtered subset;
    establishing a live channel using at least the first edge device and the fleet map GUI view;
    receiving continuous real-time streaming data of the first edge device over the live channel; and
    dynamically updating the fleet map GUI view to include a live view of the real-time streaming data of the first edge device.

3. The method of claim 2, wherein establishing the live channel is based on brokering notification messages with at least a containerized edge compute device connected to the first edge device over a local network.

4. The method of claim 1, wherein generating the fleet map GUI view includes:
   determining respective health status information for each respective edge device or edge device asset group associated with the stored data objects corresponding to the filtered subset; and
   generating the fleet map GUI view to include a rendered icon for each respective edge device or edge device asset group, wherein each of the rendered icons is indicative of respective health status information of a respective edge device or edge device asset group.

5. The method of claim 4, wherein the respective health status information is reported by the fleet of edge devices and obtained from the fleet map data volume.

6. The method of claim 4, wherein the respective health status information is determined based on analyzing metadata information or time-series historical information associated with the respective edge devices or edge device asset groups.

7. The method of claim 1, wherein a plurality of edge device asset groupings for the fleet of edge devices are based on one or more of:
   grouping edge devices deployed to a same edge site location;
   grouping edge devices deployed within a same geographic region;
   grouping edge devices based on a configured granularity level indicated by one or more user configuration inputs; or
   grouping edge devices based on one or more dynamic grouping rules, wherein an edge device is included in a first dynamic group based on comparing one or more dynamic parameter values for the edge device to one or more threshold values or rules configured for the first dynamic group.

8. The method of claim 7, wherein the configured granularity level corresponds to an organizational unit of an enterprise entity, and wherein the organizational unit comprises one or more of a factory, a warehouse, a distribution center, or a railyard.

9. The method of claim 7, wherein a renewable energy dynamic group is associated with a threshold value indicative of a minimum percentage of renewable energy operation, and wherein an edge device is included in the renewable energy dynamic group based on a real-time energy consumption of the edge device exceeding the minimum percentage of renewable energy operation.

10. The method of claim 1, wherein generating the fleet map GUI view comprises rendering one or more logical overlay GUIs in combination with the converged geographic map, wherein the one or more logical overlay GUIs are indicative of real-time or derived information corresponding to the selected geographic view area.

11. The method of claim 10, wherein the one or more logical overlay GUIs include one or more of:
   a weather information overlay GUI indicative of real-time weather data for the selected geographic view area;
   a connectivity availability information overlay GUI indicative of satellite internet constellation connection links or coverage within the selected geographic view area; or
   an energy cost information overlay GUI indicative of real-time energy cost information for different regions within the selected geographic view area.

12. The method of claim 1, wherein:
   each stored data object from the plurality of data streams is stored in the fleet map data volume with a corresponding timestamp value; and
   the corresponding timestamp value for a respective stored data object comprises a native timestamp value or a synthetic timestamp value estimated based on metadata information for the respective stored data object.

13. The method of claim 1, wherein:
   a first portion of the plurality of data streams is obtained from a satellite internet constellation communicatively coupled to a first subset of the plurality of edge devices;
   a second portion of the plurality of data streams is obtained from an internet backhaul network communicatively coupled to a second subset of the plurality of edge devices.

14. The method of claim 1, wherein the plurality of data streams includes one or more of:
   sensor data generated by the fleet of edge devices;
   operational metrics or status information associated with respective edge devices of the fleet of edge devices.

15. The method of claim 14, wherein the plurality of data streams further includes:
   inference predictions generated based on the sensor data or operational metrics information, using one or more edge-deployed machine learning (ML) or artificial intelligence (ML) models.

16. The method of claim 15, wherein:
   a first subset of sensor data is obtained using one or more sensors associated with a local network of a containerized edge compute unit; and
   inference predictions generated based on the first subset of sensor data are generated using one or more edge-deployed ML or AI models implemented on the same containerized edge compute unit.

17. The method of claim 1, wherein at least a portion of the plurality of data streams are obtained as aggregated or batched data corresponding to a subset of the plurality of edge devices of the fleet.

18. The method of claim 17, wherein:
   data aggregation is performed for a subset of edge devices associated with the same edge site location; or
   data aggregation is performed for a subset of edge devices associated with a same containerized edge compute unit, the containerized edge compute unit configured as an aggregation point.

19. An apparatus comprising:
at least one memory; and
at least one processor coupled to the at least one memory, the at least one processor configured to:
   obtain a plurality of data streams from one or more edge devices included in a fleet of a plurality of edge devices, wherein each respective edge device of the one or more edge devices is associated with one or more of a corresponding edge site location or a corresponding edge device asset group;
   store at least a portion of the plurality of data streams as stored data objects within a fleet map data volume associated with the fleet of receive one or more user inputs indicative of a filtering selection for edge devices;
   receiving one or more user inputs indicative of a filtering selection for viewing a filtered subset of the fleet map data volume, wherein the filtering selection indicates a selected geographic view area;
   obtain, from the fleet map data volume and based on the filtering selection, stored data objects corresponding to the filtered subset;

generate a fleet map graphical user interface (GUI) view using the stored data objects corresponding to the filtered subset, wherein the fleet map GUI view comprises a converged geographic map of the selected geographic view area, and wherein the stored data objects corresponding to the filtered subset are rendered at corresponding locations within the converged geographic map; and output the fleet map GUI view for display to a user associated with the fleet of edge devices.

20. The apparatus of claim 19, wherein, to generate the fleet map GUI view, the at least one processor is further configured to:

receive a user input indicative of a request to view real-time streaming data from a first edge device associated with the filtered subset;

establish a live channel with at least the first edge device and the fleet map GUI view;

receive continuous real-time streaming data of the first edge device over the live channel; and dynamically update the fleet map GUI view to include a live view of the real-time streaming data of the first edge device.

\* \* \* \* \*